United States Patent
Murakami et al.

(10) Patent No.: US 10,014,506 B2
(45) Date of Patent: *Jul. 3, 2018

(54) LAMINATED BODY, SEPARATOR, AND NONAQUEOUS SECONDARY BATTERY

(71) Applicant: Sumitomo Chemical Company, Limited, Chuo-Ku, Tokyo (JP)

(72) Inventors: Chikara Murakami, Osaka (JP); Toshihiko Ogata, Osaka (JP); Ichiro Arise, Osaka (JP); Kosuke Kurakane, Osaka (JP); Chikae Yoshimaru, Osaka (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/418,169

(22) Filed: Jan. 27, 2017

(65) Prior Publication Data
US 2017/0141373 A1    May 18, 2017

Related U.S. Application Data
(62) Division of application No. 14/781,791, filed as application No. PCT/JP2015/071260 on Jul. 27, 2015.

(30) Foreign Application Priority Data

Aug. 29, 2014 (JP) .................................. 2014-175488
Aug. 29, 2014 (JP) .................................. 2014-175489
(Continued)

(51) Int. Cl.
*H01M 2/16* (2006.01)
*H01M 10/0525* (2010.01)

(52) U.S. Cl.
CPC ....... *H01M 2/1686* (2013.01); *H01M 2/1653* (2013.01); *H01M 10/0525* (2013.01)

(58) Field of Classification Search
CPC ............. H01M 2/1686; H01M 2/1653; H01M 10/0525
See application file for complete search history.

(56) References Cited

U.S. PATENT DOCUMENTS

2004/0241550 A1  12/2004  Wensley et al.
2005/0100776 A1  5/2005  Brunk et al.
(Continued)

FOREIGN PATENT DOCUMENTS

CN     103890999 A    6/2014
JP     2000001561 A   1/2000
(Continued)

OTHER PUBLICATIONS

Office Action dated May 11, 2017 in U.S. Appl. No. 14/781,791 by Murakami.
(Continued)

*Primary Examiner* — Osei K Amponsah
(74) *Attorney, Agent, or Firm* — Panitch Schwarze Belisario & Nadel LLP

(57) ABSTRACT

A nonaqueous secondary battery separator, disposed between a cathode and an anode, includes: a porous base material containing a polyolefin as a main component; and a porous layer containing a polyvinylidene fluoride-based resin on at least one surface of the porous base material. The separator satisfies $(C)/(D) \leq 0.13$, where (C) represents the average pore diameter (μm) of the porous base material, and (D) represents the porosity of the porous base material, in the porous layer after being immersed for 24 hours in an electrolyte solution having a temperature of 25° C. in which electrolyte solution $LiPF_6$ having a concentration of 1.0
(Continued)

mole per liter is dissolved in a mixed solvent containing ethyl methyl carbonate, diethyl carbonate, and ethylene carbonate at a volume ratio of 50:20:30, the resin having absorbed the electrolyte solution having a volume of 0.05 to 5.00 cm$^3$ per square meter of the porous layer.

4 Claims, 3 Drawing Sheets

(30) Foreign Application Priority Data

Aug. 29, 2014 (JP) ................................ 2014-175490
Aug. 29, 2014 (JP) ................................ 2014-175491

(56) References Cited

U.S. PATENT DOCUMENTS

| | | | |
|---|---|---|---|
| 2007/0072069 A1* | 3/2007 | Yamada | B01D 69/02 429/145 |
| 2007/0134548 A1 | 6/2007 | Wensley et al. | |
| 2008/0032192 A1 | 2/2008 | Yokomizo et al. | |
| 2009/0117455 A1 | 5/2009 | Takita et al. | |
| 2009/0269672 A1 | 10/2009 | Takita et al. | |
| 2010/0099031 A1 | 4/2010 | Kato et al. | |
| 2010/0119956 A1 | 5/2010 | Tokuda et al. | |
| 2011/0003209 A1 | 1/2011 | Katayama et al. | |
| 2011/0171509 A1 | 7/2011 | Nakagiri et al. | |
| 2012/0264010 A1 | 10/2012 | Kato et al. | |
| 2012/0328929 A1 | 12/2012 | Matsumoto et al. | |
| 2013/0011728 A1 | 1/2013 | Tokuda et al. | |
| 2013/0089770 A1 | 4/2013 | Nishikawa | |
| 2013/0089771 A1 | 4/2013 | Nishikawa | |
| 2013/0095365 A1 | 4/2013 | Nishikawa | |
| 2013/0216918 A1 | 8/2013 | Tokuda et al. | |
| 2013/0337343 A1 | 12/2013 | Tokuda et al. | |
| 2014/0147726 A1 | 5/2014 | Toyoda | |
| 2014/0242444 A1 | 8/2014 | Nishikawa et al. | |
| 2014/0248525 A1 | 9/2014 | Iwai et al. | |
| 2014/0255754 A1 | 9/2014 | Nishikawa et al. | |
| 2014/0308567 A1 | 10/2014 | Nishikawa et al. | |
| 2014/0315068 A1 | 10/2014 | Nishikawa et al. | |
| 2014/0335405 A1 | 11/2014 | Kato et al. | |
| 2014/0363726 A1 | 12/2014 | Honda et al. | |
| 2015/0179997 A1 | 6/2015 | Iwai et al. | |
| 2015/0180002 A1 | 6/2015 | Nishikawa et al. | |
| 2015/0200387 A1 | 7/2015 | Nishikawa et al. | |
| 2015/0200388 A1 | 7/2015 | Yoshitomi | |
| 2015/0207122 A1 | 7/2015 | Yoshitomi | |

FOREIGN PATENT DOCUMENTS

| | | |
|---|---|---|
| JP | 2002240215 A | 8/2002 |
| JP | 2004241135 A | 8/2004 |
| JP | 2007042285 A | 2/2007 |
| JP | 2007053022 A | 3/2007 |
| JP | 2007504614 A | 3/2007 |
| JP | 2007118588 A | 5/2007 |
| JP | 2008258013 A | 10/2008 |
| JP | 2008269978 A | 11/2008 |
| JP | 2009076410 A | 4/2009 |
| JP | 2009205959 A | 9/2009 |
| JP | 2010218749 A | 9/2010 |
| JP | 2010232048 A | 10/2010 |
| JP | 2011119276 A | 6/2011 |
| JP | 2011198553 A | 10/2011 |
| JP | 2011204587 A | 10/2011 |
| JP | 2011243351 A | 12/2011 |
| JP | 2012004131 A | 1/2012 |
| JP | 2012049151 A | 3/2012 |
| JP | 4988973 B1 | 8/2012 |
| JP | 2012221889 A | 11/2012 |
| JP | 5129895 B2 | 1/2013 |
| JP | 2013028099 A | 2/2013 |
| JP | 2013073737 A | 4/2013 |
| JP | 5282179 B1 | 9/2013 |
| JP | 5282180 B1 | 9/2013 |
| JP | 5282181 B1 | 9/2013 |
| JP | 5342088 B1 | 11/2013 |
| JP | 5355821 B2 | 11/2013 |
| JP | 5355823 B1 | 11/2013 |
| JP | 5432417 B2 | 3/2014 |
| JP | 2015056263 A | 3/2015 |
| JP | 5774249 B2 | 9/2015 |
| WO | 2005049318 A1 | 6/2005 |
| WO | 2007037289 A1 | 4/2007 |
| WO | 2011013300 A1 | 2/2011 |
| WO | 2011129169 A1 | 10/2011 |
| WO | 2012137375 A1 | 10/2012 |
| WO | 2013005796 A1 | 1/2013 |
| WO | 2013058371 A1 | 4/2013 |
| WO | 2013125645 A1 | 8/2013 |
| WO | 2014021289 A1 | 2/2014 |
| WO | 2014021290 A1 | 2/2014 |
| WO | 2014021291 A1 | 2/2014 |
| WO | 2014021292 A1 | 2/2014 |
| WO | 2014021293 A1 | 2/2014 |
| WO | 2014126079 A1 | 8/2014 |

OTHER PUBLICATIONS

International Search Report dated Oct. 27, 2015 in International Application No. PCT/JP2015/071260.
Office Action dated Feb. 9, 2016 in JP Application No. 2015156336.
Ofice Action dated Jan. 19, 2016 in JP Application No. 2015539327.
Office Action dated Jan. 19, 2016 in JP Application No. 2015156335.
Office Action dated Jan. 19, 2016 in JP Application No. 2015156334.
Office Action dated May 10, 2016 in JP Application No. 2015156334.
Office Action dated May 10, 2016 in JP Application No. 2015156335.
Office Action dated Jun. 14, 2016 in JP Application No. 2015156336.
Decision to Grant dated Dec. 13, 2016 in JP Application No. 2015156336.
Office Action dated Mar. 21, 2017 in KR Application No. 10-2016-7018479.
Office Action dated Apr. 7, 2017 in CN Application No. 2015800004908.

* cited by examiner

ENLARGE

ENLARGE

LAMINATED BODY, SEPARATOR, AND NONAQUEOUS SECONDARY BATTERY

CROSS-REFERENCE TO RELATED APPLICATION

This application is a Divisional of co-pending U.S. patent application Ser. No. 14/781,791, filed Oct. 1, 2015, which was a Section 371 of International Application No. PCT/JP2015/071260, filed Jul. 27, 2015, which was published in the Japanese language on Mar. 3, 2016, under International Publication No. WO 2016/031466 A1 and the disclosures of which is incorporated herein by reference.

TECHNICAL FIELD

First, the present invention relates to a laminated body and a nonaqueous electrolyte secondary battery separator including the laminated body.

Second, the present invention relates to a laminated body, a nonaqueous electrolyte secondary battery member, and a nonaqueous electrolyte secondary battery.

Third, the present invention relates to a laminated body and a separator and to use of the laminated body and the separator. More specifically, the present invention relates to (i) a laminated body to be used for a nonaqueous electrolyte secondary battery separator, (ii) a separator including the laminated body, and (iii) a nonaqueous secondary battery including the separator.

Fourth, the present invention relates to a nonaqueous secondary battery separator, a laminated body, a method for producing a laminated body, and a nonaqueous secondary battery.

BACKGROUND ART

First, nonaqueous electrolyte secondary batteries such as a lithium secondary battery are currently in wide use as batteries for devices such as a personal computer, a mobile telephone, and a portable information terminal.

A nonaqueous electrolyte secondary battery, typified by a lithium secondary battery, has a high energy density and may thus let a large current flow and generate heat in a case where a breakage in the battery or in the device using that battery has caused an internal or external short circuit. This risk has created a demand that a nonaqueous electrolyte secondary battery should prevent more than a certain level of heat generation to ensure a high level of safety.

Safety of a nonaqueous electrolyte secondary battery is typically ensured by imparting to the nonaqueous electrolyte secondary battery a shutdown function, that is, a function of, in a case where there has been abnormal heat generation, blocking passage of ions between the cathode and the anode with use of a separator to prevent further heat generation. More specifically, a nonaqueous electrolyte secondary battery typically includes, between the cathode and the anode, a separator that has a function of, in a case where, for example, an internal short circuit between the cathode and the anode has caused an abnormal current to flow through the battery, block that current and prevent the flow of an excessively large current (shutdown) for prevention of further heat generation. The shutdown is performed such that in a case where a nonaqueous electrolyte secondary battery has been heated to a temperature over the normal operating temperature, the heat melts the separator, thereby clogging the pores present in the separator. The separator preferably (i) remains unbroken by heat even in a case where the temperature inside the battery has been raised to a high temperature after the shutdown and (ii) maintains the shutdown state.

The separator is typically a porous film that contains a polyolefin as a main component and that melts at, for example, approximately 80° C. to 180° C. in a case of abnormal heat generation. A porous film containing a polyolefin as a main component is, however, unable to maintain a film structure at high temperatures not lower than the melting point of the polyolefin, and thus breaks. This lets the cathode and the anode of the battery be in direct contact with each other, possibly leading to a short circuit. Further, a porous film containing a polyolefin as a main component adheres poorly to an electrode. This may eventually decrease the battery capacity and/or degrade the cycle characteristic.

There has been a separator that, in order to prevent a short circuit mentioned above, includes (i) a porous film containing a polyolefin as a main component and (ii) on at least one surface of the porous film, a heat-resistant layer including various resins and fillers.

There has also been a separator that, in order to improve the adhesiveness of the separator to an electrode, includes (i) a porous film containing a polyolefin as a main component and (ii) on at least one surface of the porous film, a porous layer (adhesive layer) containing a polyvinylidene fluoride-based resin.

There has been proposed a separator including (i) a porous film containing a polyolefin as a main component and (ii) a heat-resistant layer formed excellently as a result of adjusting the wettability (critical surface tension) of the porous film and the wettability (critical surface tension) of the heat-resistant layer (Patent Literature 1).

There has also been proposed a separator that, in order to improve the adhesiveness between a heat-resistant layer and a porous film containing a polyolefin as a main component and to improve the adhesiveness between fine particles included in the heat-resistant layer, contains an organic binder (for example, a polyvinylidene fluoride-based resin) in the heat-resistant layer (Patent Literature 1).

In addition, it has been publicly known that, for example, the surface wettability of a separator, that is, the liquid injection easiness for an electrolyte solution during battery assembly, is improved by performing a corona treatment on a surface of the separator, that is, a porous layer mentioned above containing a resin, to introduce a polar functional group into the surface of the porous layer containing a resin.

Second, nonaqueous electrolyte secondary batteries, typified by a lithium ion secondary battery, have a high energy density, and are thus currently in wide use as batteries for devices such as a personal computer, a mobile telephone, and a portable information terminal.

To improve characteristics such as safety of a nonaqueous electrolyte secondary battery, there have been tried various modifications to the separator disposed between the cathode and the anode. A porous film containing a polyolefin, in particular, excels in electrical insulation and exhibits good ion permeability. Such a porous film is in wide use as a separator for a nonaqueous electrolyte secondary battery. There have been made various proposals about such a separator.

Patent Literature 2 discloses a polyolefin-based resin cross-linked foamed product containing a polyolefin-based resin composition prepared by mixing alkenyl sulfonate metal salt and a foaming agent with a polyolefin-based resin. The polyolefin-based resin is crosslinked with electron beams, and has closed cells.

Patent Literature 3 discloses a laminated microporous film including (i) a first microporous film containing a first resin composition and (ii) a second microporous film containing a second resin composition having a melting point lower than that of the first resin composition. The laminated microporous film has a porosity of 50 to 70%.

If the separator is damaged during, for example, an operation of removing a coil wound core from an electrode group during the battery production, the battery will be unable to maintain electronic insulation between the cathode and the anode, which will cause a battery performance defect, with the result of a decrease in productivity of the battery assembly. To detect such defects in advance, battery production typically involves a current leak inspection before injection of an electrolyte solution.

Patent Literature 4 discloses a separator including (i) a heat-resistant porous film containing a heat-resistant resin for reducing the defect rate during the leak inspection, (ii) a first polyolefin porous film covering the entire surface of the heat-resistant porous film on the cathode side, and (iii) a second polyolefin porous film covering the entire surface of the heat-resistant porous film on the anode side. The heat-resistant resin has a melting point or heat distortion temperature higher than the melting point or heat distortion temperature of a polyolefin contained in the first and second polyolefin porous films.

Third, nonaqueous electrolyte secondary batteries such as a lithium secondary battery are currently in wide use as batteries for devices such as a personal computer, a mobile telephone, and a portable information terminal.

A nonaqueous electrolyte secondary battery, typified by a lithium secondary battery, has a high energy density and may thus let a large current flow and generate heat in a case where a breakage in the battery or in the device using the battery has caused an internal or external short circuit. This risk has created a demand that a nonaqueous electrolyte secondary battery should prevent more than a certain level of heat generation to ensure a high level of safety.

Safety of a nonaqueous electrolyte secondary battery is typically ensured by imparting to the nonaqueous electrolyte secondary battery a shutdown function, that is, a function of, in a case where there has been abnormal heat generation, preventing passage of ions between the cathode and the anode with use of a separator to prevent further heat generation. More specifically, a nonaqueous electrolyte secondary battery typically includes, between the cathode and the anode, a separator that has a function of, in a case where, for example, an internal short circuit between the cathode and the anode has caused an abnormal current to flow through the battery, prevent that current and prevent the flow of an excessively large current (shutdown) for prevention of further heat generation. The shutdown is performed such that in a case where a nonaqueous electrolyte secondary battery has been heated to a temperature over the normal operating temperature, the heat melts the separator, thereby clogging the pores present in the separator. The separator preferably (i) remains unbroken by heat even in a case where the temperature inside the battery has been raised to a high temperature after the shutdown and (ii) maintains the shutdown state.

The separator is typically a porous film that contains a polyolefin as a main component and that melts at, for example, approximately 80 to 180° C. in a case of abnormal heat generation. However, a separator, which is such a porous film, has insufficient shape stability at high temperatures. This poses a risk that even in a case where the shutdown function is performed, the occurrence of contraction, breakage or the like of the film may cause the cathode and the anode to be in direct or indirect contact with each other, leading to an internal short circuit. Specifically, a separator, which is such a porous film, may not be able to sufficiently prevent abnormal heat generation which is caused by an internal short circuit. This risk has created a demand for separators that are capable of ensuring a high level of safety.

Patent Literature 5 proposes, as a porous film having excellent heat resistance, a porous film configured by, for example, laminating, on a polyolefin microporous film, a heat-resistant porous layer which is made of aromatic polymer such as aromatic aramid.

Along with enlargement of lithium secondary batteries, curls of separators are becoming increasingly evident. In a case where a curl occurs to a separator, handling during production of a battery becomes poor. This may pose problems such as defective winding and assembling failure during the production of the battery. Patent Literature 6, for example, proposes, as a technique for solving the problem, a technique in which a multilayer porous film is prevented from thermal shrinkage and has curl-resistant properties even in a high-temperature environment, the multilayer porous film being obtained by use of a porous layer-forming coating liquid which contains a multilayer porous film copolymer composition and inorganic particles, the multilayer porous film copolymer composition containing a copolymer obtained by copolymerization of a monomer composition containing certain monomers, wherein: the monomer composition contains an unsaturated carboxylic acid monomer at a proportion of less than 1.0% by mass; and Tg of the copolymer, which Tg is calculated based on monomers other than a crosslinkable monomer, is −25° C. or lower.

Fourth, nonaqueous electrolyte secondary batteries (hereinafter referred to as "nonaqueous secondary battery") such as a lithium secondary battery are currently in wide use as batteries for devices such as a personal computer, a mobile telephone, and a portable information terminal.

A nonaqueous electrolyte secondary battery, typified by a lithium secondary battery, has a high energy density and may thus let a large current flow and generate heat in a case where a breakage in the battery or in the device using the battery has caused an internal or external short circuit. This risk has created a demand that a nonaqueous secondary battery should prevent more than a certain level of heat generation to ensure a high level of safety.

Safety of a nonaqueous secondary battery is typically ensured by imparting to the nonaqueous secondary battery a shutdown function, that is, a function of, in a case where there has been abnormal heat generation, preventing passage of ions between the cathode and the anode with use of a separator to prevent further heat generation. More specifically, a nonaqueous secondary battery typically includes, between the cathode and the anode, a separator that has a function of, in a case where, for example, an internal short circuit between the cathode and the anode has caused an abnormal current to flow through the battery, prevent that current and prevent the flow of an excessively large current (shutdown) for prevention of further heat generation. The shutdown is performed such that in a case where a nonaqueous secondary battery has been heated to a temperature over the normal, operating temperature, the heat melts the separator, thereby clogging the pores present in the separator. The separator preferably (i) remains unbroken by heat even in a case where the temperature inside the battery has been raised to a high temperature after the shutdown and (ii) maintains the shutdown state.

The separator is typically made of a filmy porous base material whose main component is, for example, a polyolefin which melts at approximately 80 to 180° C. when abnormal heat generation occurs. However, there is a possibility that the porous base material containing a polyolefin as a main component cannot maintain a film structure at a high temperature which is equal to or greater than the melting point of a polyolefin and is broken, resulting in direct contact between the cathode and the anode of a battery and so in short-circuit. Furthermore, there is a possibility that since the porous film containing a polyolefin as a main component has poor adhesion property with respect to electrodes, decrease in battery capacity and decrease in cycle characteristics occur.

In order to prevent occurrence of the short-circuit and to improve adhesion property of the separator with respect to the electrode, there has been developed a separator in which a porous layer (adhesive layer) containing polyvinylidene fluoride-based resin is laminated on at least one surface of a porous base material containing a polyolefin as a main component.

For example, Patent Literature 7 discloses that a porosity of a porous layer containing polyvinylidene fluoride-based resin is set to 30 through 60% in consideration of adhesion to electrodes and ion permeability.

CITATION LIST

Patent Literature 1

PCT International Publication No. 2011/129169 (Publication Date: Oct. 20, 2011)

Patent Literature 2

Japanese Patent Application Publication, Tokukai, No. 2000-1561 A (Publication Date: Jan. 7, 2000)

Patent Literature 3

Japanese Patent Application Publication, Tokukai, No. 2013-28099 A (Publication Date: Feb. 7, 2013)

Patent Literature 4

PCT International Publication No. 2011/013300 Pamphlet (Publication Date: Feb. 3, 2011)

Patent Literature 5

Japanese Patent Application Publication, Tokukai, No. 2009-205959 A

Patent Literature 6

Japanese Patent Application Publication, Tokukai, No. 2012-221889 A

Patent Literature 7

Japanese Patent No. 5432417 (Publication Date: Mar. 5, 2014)

SUMMARY OF INVENTION

Technical Problem

Regarding the first point about the background art described above, conventional separators have a large difference between (i) the critical surface tension of a porous layer mentioned above (that is, a heat-resistant layer or an adhesive layer) containing a resin and (ii) the critical surface tension of a base material (that is, a porous film mentioned above), and thus have a large difference between the above two layers in terms of the liquid injection resistance for an electrolyte solution. Conventional separators are therefore problematic in that the separator in its entirety has poor liquid injection easiness for an electrolyte solution during assembly of a nonaqueous electrolyte secondary battery.

This leads to such problems as a lengthened step of injecting an electrolyte solution into a battery during assembly of a nonaqueous electrolyte secondary battery.

Regarding the second point about the background art described above, there have been developed various separators as described above. These separators are, however, not perfect for the purpose of achieving good battery characteristics. In particular, it is necessary to further reduce the rate of defects such as a current leak. In view of this, the inventors of the present invention consider it necessary to produce a new secondary battery separator having a high dielectric strength, and are thus conducting research to produce a separator having a dielectric strength higher than conventional.

The present invention has been made as a result of such research. It is an object of the present invention to provide a laminated body having a higher dielectric strength and suitable as a separator.

Regarding the third point about the background technique, various separators have been developed as described above. However, such separators are inadequate for obtaining good battery characteristics. In particular, there is still room for improvement in the technique for prevention of curls.

The present invention is accomplished in view of the foregoing problem, and its object is to provide (i) a laminated body in which the occurrence of a curl is prevented and which is to be used for a separator and (ii) a technique for using the laminated body.

As regards the fourth point of the background art, in the technique of Patent Literature 7, only a hole ratio of the porous layer itself is considered, and a state where the porous layer is built in a nonaqueous secondary battery is not considered.

In a case where a porous layer containing polyvinylidene fluoride-based resin is built in a nonaqueous secondary battery, the porous layer is gelatinized by an electrolyte solution, so that the porous layer can have higher adhesion to electrodes. However, there is a possibility that gelatinization of the porous layer causes a decrease in mobility of ions, resulting in a decrease in cycle characteristics. Specifically, there is a possibility that the decrease in ion mobility causes an increase in charging time (particularly time for charging per constant voltage), resulting in inconvenience such as oxidation and decomposition of an electrolyte at the cathode and deposition of a metal at the anode, which leads to a decrease in capacitance.

The present invention was made in view of the foregoing problems. An object of the present invention is to provide: a nonaqueous secondary battery separator which subdues a decrease in cycle characteristics of a nonaqueous secondary battery while maintaining adhesion to electrodes; a laminated body; a method for producing the laminated body; and a nonaqueous secondary battery.

Solution to Problem

Aspect 1 of Present Invention

Regarding the first object above, the present invention has been accomplished to solve the above problem, and provides a laminated body including: a porous film containing a polyolefin as a main component; and a porous layer on at least one surface of the porous film, the porous layer containing a resin, the laminated body satisfying Formula (1) below, $$0 \leq (A)-(B) \leq 20 \text{ mN/m} \qquad (1),$$

where (A) represents a critical surface tension over an outermost surface of the porous layer, and (B) represents a critical surface tension that, in a case where the porous layer has been peeled from the laminated body at an interface with the porous film, the porous film has on a side of the interface.

The laminated body may preferably be arranged such that the laminated body satisfies Formula (2) below, $$(C)/(D) \leq 0.13 \qquad (2).$$

In Formula (2), (C) represents an average pore diameter of the porous film, and (D) represents a porosity of the porous film, the average pore diameter (C) having a value in μm indicative of a mean value of respective sizes of pores in the porous film, the porosity (D) having a value indicative of a volume proportion of void in the actual porous film with reference to a volume of the porous film assumed to have no void.

The laminated body may preferably be arranged such that the resin contained in the porous layer is a polyvinylidene fluoride-based resin.

The present invention, in order to solve the above problem, further provides a separator for a nonaqueous electrolyte secondary battery, the separator including the laminated body.

The present invention, in order to solve the above problem, further provides a nonaqueous electrolyte secondary battery including the separator for a nonaqueous electrolyte secondary battery.

Aspect 2 of Present Invention

Regarding the second object above, the inventors of the present invention have particularly studied the amount of an increase in the dielectric strength of each layer in a separator which increase occurs together with an increase in the content of resin per unit area of the layer. The inventors have thus discovered that in a case where a porous layer on one or both surfaces of a porous film contains a resin such that the amount of an increase in the dielectric strength of the porous layer is not smaller than the amount of an increase in the dielectric strength of the porous film, it is possible to produce a laminated body having a higher dielectric strength. The inventors have, as a, result, completed the present invention.

Specifically, in order to solve the above problem, a laminated body of the present invention is a laminated body including: a porous film containing a polyolefin as a main component; and a porous layer on one or both surfaces of the porous film, the porous layer containing a resin, the laminated body satisfying Formula (1) below, $$(A)>(B) \qquad (1),$$

where (A) represents an amount (V·m²/g) of an increase in a dielectric strength of the porous layer with respect to an amount of an increase in an amount (g/m²) of the resin contained per unit area of the porous layer, and (B) represents an amount (V·m²/g) of an increase in a dielectric strength of the porous film with respect to an amount of an increase in an amount (g/m²) of the polyolefin contained per unit area of the porous film, the laminated body satisfying Formula (2) below, $$(C)/(D) \leq 0.13 \qquad (2).$$

In Formula (2) above, (C) represents an average pore diameter of the porous film, and (D) represents a porosity of the porous film, the average pore diameter (C) having a value in μm indicative of a mean value of respective sizes of pores in the porous film, the porosity (D) having a value indicative of a volume proportion of void in the actual porous film with reference to a volume of the porous film assumed to have no void.

The laminated body of the present invention may preferably be arranged such that the laminated body further satisfies (A)>2×(B).

The laminated body of the present invention may preferably be arranged such that the resin is a polyvinylidene fluoride.

The laminated body of the present invention may preferably be arranged such that the resin is an aromatic polyamide.

A separator of the present invention for a nonaqueous electrolyte secondary battery includes the laminated body.

A member of the present invention for a nonaqueous electrolyte secondary battery includes in sequence: a cathode; the separator of the present invention for a nonaqueous electrolyte secondary battery; and an anode.

A nonaqueous electrolyte secondary battery of the present invention includes the separator of the present invention for a nonaqueous electrolyte secondary battery.

Aspect 3 of Present Invention

Regarding the third object above, the inventors of the present invention have diligently studied the object to discover that (A) in a laminated body for a separator, its moisture absorption property is closely related to occurrence of a curl, that (B) in a case where a laminated body has a moisture absorption property within a particular range, occurrence of a curl can be prevented, that (C) in a second porous layer of a laminated body for a separator, its shape is closely related to occurrence of a curl, and that (D) in a case where a second porous layer has a particular shape, occurrence of a curl can be prevented. The inventors have, as a result, completed the present invention. Specifically, the present invention may be construed as any of the following inventions:

(1) A laminated body including: a stack of (i) a first porous layer containing a polyolefin-based resin and (ii) a second porous layer, a difference being 1000 ppm or less between (A) a water content rate of the laminated body in an atmosphere having a dew point of 20° C. and (B) a water content rate of the laminated body in an atmosphere having a dew point of −30° C., respective openings of pores each having an area of 0.5 μm² or more occupying 30% or less of a surface of the second porous layer.

(2) The laminated body according to (1), wherein a difference between (C) a water content of the first porous layer and (D) a water content of the second porous layer both in an atmosphere having a dew point of 20° C. is 10 mg/m² or less.

(3) The laminated body according to (1) or (2), wherein the respective openings occupy 5% or less of the surface of the second porous layer.

(4) The laminated body according to any one of (1) to (3), wherein the second porous layer either (i) has a structure in which skeletons each having a diameter of 1 μm or less are connected to each other to form a three-dimensional network or (ii) contains a fine resin particle.

(5) The laminated body according to any one of (1) to (4), wherein the second porous layer contains a polyvinylidene fluoride-based resin.

(6) The laminated body according to (4), wherein the fine resin particle is of a resin having a structure unit derived from α-olefin having 2 to 4 carbon atoms.

(7) The laminated body according to any one of (1) to (6), wherein the difference is 100 ppm or more between the water content rate (A) and the water content rate (B).

(8) The laminated body according to any one of (1) to (7), wherein the difference between the water content (C) and the water content (D) is 1 mg/m$^2$ or more.

(9) A separator including a laminated body according to any one of (1) to (8).

(10) A nonaqueous secondary battery including a separator according to (9).

Aspect 4 of Present Invention

Regarding the fourth object above, in order to solve the above problem, a separator of the present invention for a nonaqueous secondary battery is a separator for a nonaqueous secondary battery which separator is disposed between a cathode and an anode both for a nonaqueous secondary battery, the separator including: a porous base material containing a polyolefin as a main component; and a porous layer on at least one surface of the porous base material, the porous layer containing a polyvinylidene fluoride-based resin, the separator satisfying $$(C)/(D) \leq 0.13,$$

where (C) represents an average pore diameter of the porous base material, the average pore diameter (C) having a value in μm indicative of a mean value of respective sizes of pores in the porous base material, and (D) represents a porosity of the porous base material, the porosity (D) having a value indicative of a volume proportion of void in the actual porous base material with reference to a volume of the porous base material assumed to have no void, in the porous layer after being immersed for 24 hours in an electrolyte solution having a temperature of 25° C. in which electrolyte solution LiPF$_6$ having a concentration of 1.0 mole per liter is dissolved in a mixed solvent containing ethyl methyl carbonate, diethyl carbonate, and ethylene carbonate at a volume ratio of 50:20:30, the resin having absorbed the electrolyte solution having a volume of 0.05 to 5.00 cm$^3$ per square meter of the porous layer.

The separator of the present invention for a nonaqueous secondary battery may preferably be arranged such that in the porous layer after being immersed for 24 hours in the electrolyte solution, the resin having absorbed the electrolyte solution has a volume of 0.25 to 1.50 cm$^3$ per square meter of the porous layer.

The separator of the present invention for a nonaqueous secondary battery may preferably be arranged such that the porous layer after being immersed for 24 hours in the electrolyte solution has a porosity of 0.005 to 0.55.

The separator of the present invention for a nonaqueous secondary battery may preferably be arranged such that the porous layer after being immersed for 24 hours in the electrolyte solution has an average pore diameter of 0.8 to 95.0 nm.

In order to solve the above problem, a laminated body of the present invention includes: the separator for a nonaqueous secondary battery; and an electrode sheet.

In order to solve the above problem, a method of the present invention for producing a laminated body includes the step of applying, to the porous base material or the electrode sheet, a solution in which the resin for the porous layer is dissolved and drying the solution applied.

In order to solve the above problem, a nonaqueous secondary battery of the present invention includes: the separator for a nonaqueous secondary battery; and an electrode sheet.

Advantageous Effects of Invention

Aspect 1 of Present Invention

Using the separator of the present invention advantageously improves the liquid injection easiness for an electrolyte solution during assembly of a nonaqueous electrolyte secondary battery.

Aspect 2 of Present Invention

The present invention advantageously provides a separator for a nonaqueous electrolyte secondary battery which separator has a higher dielectric strength.

Aspect 3 of Present Invention

The laminated body of the present invention, in a case where it is used as a separator for a battery, advantageously prevents occurrence of a curl. This allows a battery being built to be handled easily, and is also expected to improve the battery performance.

Aspect 4 of Present Invention

The present invention advantageously not only ensures adhesion between a separator and an electrode, but also prevents degradation of the cycle characteristic of a nonaqueous secondary battery.

DESCRIPTION OF EMBODIMENTS

Figure 1:
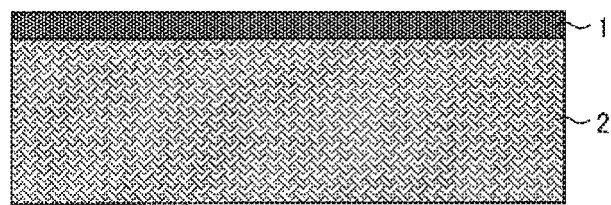
FIG. 1 is a diagram (Aspect 1 of the present invention) schematically illustrating a laminated body of the present invention.

First Embodiment: Aspect 1 of Present Invention

The inventors of the present invention have diligently conducted research and have discovered that in a case where a laminated body including: a porous film (which may hereinafter be referred to simply as "porous film") containing a polyolefin as a main component; and a porous layer on at least one surface of the porous film, the porous layer containing a resin, is arranged such that the difference between (A) the critical surface tension over the outermost surface of the porous layer and (B) the critical surface tension that, in a case where the porous layer has been peeled from the laminated body at an interface with the porous film, the porous film has on the side of the interface is small, specifically the above difference (A)–(B) is 0 mN/m or more and 20 mN/m or less, a nonaqueous electrolyte secondary battery separator including the laminated body has good wettability, and the separator has, during assembly of a nonaqueous electrolyte secondary battery, improved liquid injection easiness for an electrolyte solution over conventional separators. The inventors have, as a result, completed the present invention.

The critical surface tension that the porous film has on the side of the interface refers to the critical surface tension of the porous film (base material) remaining after the porous layer has been peeled from the laminated body which critical surface tension is over a surface of the porous film which surface is on the side on which the porous film had an interface with the porous layer.

The "electrolyte solution" for the present specification covers any electrolyte solution in general use for a nonaqueous electrolyte secondary battery.

Embodiment of Present Invention

The description below deals in detail with a first embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the present specification, any numerical range expressed as "A to B" means "not less than A and not greater than B" unless otherwise stated.

(Separator for Nonaqueous Electrolyte Secondary Battery)

One embodiment of the present invention is a laminated body including: a porous film; and a porous layer on at least one surface of the porous film, the porous layer containing a resin, the laminated body satisfying Formula (1) below, $$0 \leq (A)-(B) \leq 20 \text{ mN/m} \quad (1),$$

where (A) represents a critical surface tension over an outermost surface of the porous layer, and (B) represents a critical surface tension that, in a case where the porous layer has been peeled from the laminated body at an interface with the porous film, the porous film has on a side of the interface.

<Porous Film>

The porous film for the present invention serves as a base material of the separator. The porous film contains a polyolefin as a main component and has inside itself a large number of pores connected to one another. The porous film allows a gas, a liquid, or the like to pass therethrough from one surface to the other.

The porous film contains a polyolefin at a proportion of 50% or more by volume, preferably 90% or more by volume, more preferably 95% or more by volume, of the entire porous film. The polyolefin preferably contains a high molecular weight component having a weight-average molecular weight of $5\times10^5$ to $15\times10^6$. The polyolefin particularly preferably contains a high molecular weight component having a weight-average molecular weight of 1,000,000 or more because such a high molecular weight component increases (i) the strength of the porous film and (ii) that of the laminated body including the porous film.

Specific examples of a thermoplastic resin as the polyolefin include homopolymers (for example, polyethylene, polypropylene, and polybutene) and copolymers (for example, ethylene-propylene copolymer) produced through (co)polymerization of a monomer such as ethylene, propylene, 1-butene, 4-methyl-1-pentene, or 1-hexene. Among the above examples, polyethylene is preferable because it is able to prevent (shutdown) the flow of an excessively large current at a lower temperature. Examples of the polyethylene include a low-density polyethylene, a high-density polyethylene, a linear polyethylene (ethylene-α-olefin copolymer), and an ultra high molecular weight polyethylene having a weight-average molecular weight of 1,000,000 or more. Among these examples, an ultra high molecular weight polyethylene having a weight-average molecular weight of 1,000,000 or more is preferable.

The porous film may have a thickness selected as appropriate in view of the thickness of the laminated body. The porous film, however, preferably has a thickness of 4 to 40 μm, more preferably 7 to 30 μm, in a case where (i) a porous film is used as a base material and (ii) a porous layer is deposited on one or both surfaces of the porous film to produce a laminated body.

The porous film has a weight per unit area selected as appropriate in view of the strength, thickness, weight, and handling easiness of the laminated body. The weight per unit area is, however, normally preferably 4 to 20 g/m², more preferably 5 to 12 g/m², in order to increase the weight energy density and volume energy density of a nonaqueous electrolyte secondary battery including the laminated body as a separator.

The porous film has an air permeability of preferably 30 to 500 sec/100 mL, more preferably 50 to 300 sec/100 mL, in terms of Gurley values. A porous film having such an air permeability achieves sufficient ion permeability in a case where the laminated body is used as a separator.

The porous film has a porosity (D) of preferably 0.2 to 0.8 (20 to 80% by volume), more preferably 0.3 to 0.75 (30 to 75% by volume), in order to allow the separator to (i) retain a larger amount of electrolyte solution and (ii) achieve a function of reliably preventing (shutdown) the flow of an excessively large current at a lower temperature. The porous film has pores each having a pore size of preferably 3 μm or less, more preferably 1 μm or less, in order to, in a case where the laminated body is used as a separator, achieve sufficient ion permeability and prevent particles from entering the cathode, the anode, or the like. Further, the porous film has pores having an average pore size (hereinafter referred to also as "average pore diameter (C)"), the average pore diameter (C) and porosity (D) of the porous film preferably satisfying the relation $(C)/(D) \leq 0.13$, more preferably satisfying the relation $(C)/(D) \leq 0.10$. In the relation above, (C) represents the average pore diameter of the porous film, and (D) represents the porosity of the porous film, the average pore diameter (C) having a value in μm indicative of a mean value of respective sizes of pores in the porous film, the porosity (D) having a value indicative of a volume proportion of void in the actual porous film with reference to a volume of the porous film assumed to have no void.

The average pore diameter (C) of the porous film is measured with use of a palm porometer available from PMI Co., Ltd. (model: CFP-1500A). The measurement involves, as a test liquid, GalWick (product name) available from PMI Co., Ltd., and is made of the following curves (i) and (ii) for the porous film:

(i) Pressure-flow rate curve for the porous film as immersed in the test liquid (ii) Pressure-flow rate curve, which is half the flow rate measured for the dry porous film The average pore diameter (C) of the porous film is calculated by Formula (3) below on the basis of the value of a pressure P corresponding to the point of intersection of the curves (i) and (ii).

$$(C)=4\cos\theta r/P \tag{3}$$

In Formula (3) above, (C) represents the average pore diameter (μm), r represents the surface tension (N/nm) of the test liquid, P represents the above-mentioned pressure (Pa) corresponding to the point of intersection, and θ represents the angle (°) of contact between the porous film and the test liquid.

The porosity (D) of the porous film is measured through the following method: A square piece with a 10 cm side is cut out from the porous film. The weight W (g) and thickness E (cm) of the piece cut out are then measured. The porosity (D) of the porous film is calculated by Formula (4) below on the basis of (i) the weight (W) and thickness (E) measured above and (ii) the true specific gravity ρ (g/cm³) of the porous film.

$$\text{Porosity }(D)=1-\{(W/\rho)\}/(10\times10\times E) \tag{4}$$

The average pore diameter (C) of the porous film is controlled through, for example, a method of, in a case of reducing the pore diameter, (i) uniformizing the dispersion state of a pore forming agent such as an inorganic filler or of a phase separating agent during production of the porous film, (ii) using, as a pore forming agent, an in organic filler having smaller particle sizes, (iii) drawing the porous film in a state where the porous film contains a phase separating agent, or (iv) drawing the porous film at a low extension magnification. The porosity (D) of the porous film is controlled through, for example, a method of, in a case of producing a porous film having a high porosity, (i) increasing the amount of a pore forming agent such as an inorganic filler or of a phase separating agent relative to the resin such as a polyolefin, (ii) drawing the porous film after the phase separating agent has been removed, or (iii) drawing the porous film at a high extension magnification.

The above average pore diameter (C)/porosity (D) of the porous film should be a dominant factor in ease of infiltration of an electrolyte solution into the polyolefin base material of a nonaqueous electrolyte secondary battery separator including the porous film.

A decrease in the value of (C)/(D) means (i) a decrease in the average pore diameter (C) of the porous film and/or (ii) an increase in the porosity (D) of the porous film.

A decrease in the average pore diameter (C) of the porous film should increase the capillary force, which is presumed to serve as a driving force for introducing the electrolyte solution into pores inside the polyolefin base material. Further, an increase in the porosity (D) of the porous film should decrease the volume of a portion of the polyolefin base material which portion contains a polyolefin that cannot be permeated by the electrolyte solution. This should be the reason why a decrease in the value of (C)/(D) described above increases the ease of infiltration of an electrolyte solution into the polyolefin base material of a nonaqueous electrolyte secondary battery separator including the porous film.

Specifically, in a case where, as described above, (C)/(D)≤0.13, desirably (C)/(D)≤0.10, it can increase the ease of infiltration of an electrolyte solution into the polyolefin base material of a nonaqueous electrolyte secondary battery separator with the porous film so that the ease of infiltration is sufficiently high for the separator to be in actual use as a nonaqueous electrolyte secondary battery separator. This indicates that the above-described (C)/(D) is a factor that influences the above-mentioned critical surface tension (B), which in turn means that adjusting (C)/(D) can control the range of (A)-(B) mentioned above.

Since the porous film for the present invention has pores, the average pore diameter (C) of the porous film has a value of greater than 0, which also indicates that the above-described (C)/(D) returns a value of greater than 0.

The porous film may be produced through any method, and may be produced through, for example, a method of (i) adding a plasticizing agent to a resin such as a polyolefin to shape the polyolefin into a film and then removing the plasticizing agent with use of an appropriate solvent.

Specifically, in a case of, for example, producing a porous film with use of (i) a polyolefin resin containing an ultra high molecular weight polyethylene and (ii) a low molecular weight polyolefin having a weight-average molecular weight of 10,000 or less, such a porous film is, in terms of production cost, preferably produced through the method including steps of:

(1) kneading (i) 100 parts by weight of the ultra high molecular weight polyethylene, (ii) 5 to 200 parts by weight of the low molecular weight polyolefin having a weight-average molecular weight of 10,000 or less, and (iii) 100 to 400 parts by weight of an inorganic filler made of calcium carbonate and the like to produce a polyolefin resin composition, (2) shaping the polyolefin resin composition into a sheet, then either (3) removing the inorganic filler from the sheet produced in the step (2), and (4) drawing the sheet, from which the inorganic filler has been removed in the step (3), to produce a porous film, or (3') drawing the sheet produced in the step (2), and (4') removing the inorganic filler from the sheet drawn in the step (3') to produce a porous film.

The porous film may alternatively be a commercially available product having the above physical properties.

The porous film may be subjected to a hydrophilization treatment before a porous layer is formed thereon, that is, before a coating solution described below is applied thereto. Performing a hydrophilization treatment on the porous film allows the critical surface tension (B) to be adjusted. Specifically, in a case where the critical surface tension (B), which depends mainly on the porous film, is adjusted in correspondence with the critical surface tension (A) measured in advance of the outermost surface of the porous layer, a laminated body that satisfies the relation of Formula (1) above can be produced.

Specific examples of the hydrophilization, treatment include publicly known treatments such as (i) a chemical treatment involving an acid, an alkali, or the like, (ii) a corona treatment, and (iii) a plasma treatment. Among these hydrophilization treatments, a corona treatment is preferable because it can not only hydrophilize the porous film within a relatively short time period, but also hydrophilize only a surface and its vicinity of the porous film to leave the inside of the porous film unchanged in quality.

The porous film may include, as necessary, a porous layer other than the porous layer containing a resin. Examples of the other porous layer include publicly known porous layers such as a heat-resistant layer, an adhesive layer, and a protective layer. Specific examples include a porous layer identical in composition to a porous layer described below containing a resin.

<Porous Layer>

The porous layer for the present invention is preferably a heat-resistant layer or adhesive layer on one or both surfaces of the porous film. The porous layer contains a resin that is preferably (i) insoluble in the electrolyte solution of the battery and (ii) electrochemically stable when the battery is in normal use. In a case where the porous layer is disposed on one surface of the porous film, the porous layer is preferably on a surface of the porous film which surface faces a cathode of a nonaqueous electrolyte secondary battery to be produced, more preferably disposed on a surface of the porous film which surface comes into contact with the cathode.

Specific examples of the resin include polyolefins such as polyethylene, polypropylene, polybutene, and ethylene-propylene copolymer; fluorine-containing resins such as polyvinylidene fluoride (PVDF) and polytetrafluoroethylene; fluorine-containing rubbers such as vinylidene fluoride-hexafluoropropylene-tetrafluoroethylene copolymer and ethylene-tetrafluoroethylene copolymer; aromatic polyamides; fully aromatic polyamides (aramid resins); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of 180° C. or higher such as polyphenylene ether, polysulfone, polyether sulfone, polyphenylene sulfide, polyetherimide, polyamide imide, polyetheramide, and polyester; and water-soluble polymers such as polyvinyl alcohol, polyethyleneglycol, cellulose ether, sodium alginate, polyacrylic acid, polyacrylamide, and polymethacrylic acid.

Specific examples of the aromatic polyamides include poly(paraphenylene terephthalamide), poly(methaphenylene isophthalamide), poly(parabenzaimide), poly(methabenzamide), poly(4,4'-benzanilide terephthalamide), poly (paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these, poly(paraphenylene terephthalamide) is preferable.

Among the above resins, fluorine-containing resins and aromatic polyamides are preferable. Among the fluorine-containing resins, a polyvinylidene fluoride-based resin is more preferable such as polyvinylidene fluoride (PVDF) and a copolymer of vinylidene fluoride (VDF) and hexafluoropropylene (HFP). Of the two, PVDF is more preferable.

The porous layer may contain a filler.

The porous layer for the present invention may contain a filler made of organic matter or a filler made of inorganic matter. Specific examples of the filler made of organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl methacrylate, or (ii) a copolymer of two or more of such monomers; fluorine-containing resins such as polytetrafluoroethylene, ethylene tetrafluoride-propylene hexafluoride copolymer, tetrafluoroethylene-ethylene copolymer, and polyvinylidene fluoride; melamine resin; urea resin; polyethylene; polypropylene; and polyacrylic acid and polymethacrylic acid. Specific examples of the filler made of inorganic matter include fillers made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, titanium nitride, alumina (aluminum oxide), aluminum nitride, mica, zeolite, or glass. The porous layer may contain (i) only one kind of filler or (ii) two or more kinds of fillers in combination.

Among the above fillers, a filler made of inorganic matter (typically called "filling material") is suitable. A filler made of an inorganic oxide such as silica, calcium oxide, magnesium oxide, titanium oxide, alumina, mica, or zeolite is preferable. A filler made of at least one kind selected from the group consisting of silica, magnesium oxide, titanium oxide, and alumina is more preferable. A filler made of alumina is particularly preferable. While alumina has many crystal forms such as α-alumina, β-alumina, γ-alumina, and θ-alumina, any of the crystal forms can be used suitably. Among the above crystal forms, α-alumina is the most preferable because it is particularly high in thermal stability and chemical stability.

The present invention normally involves dissolving the resin in a solvent and dispersing the filler in the solution as necessary to prepare a coating solution for forming a porous layer.

The critical surface tension for the present invention has a value defined as indicative of a surface tension of a substance for a case in which a droplet has been dropped on a surface of the substance at a contact angle of 0°. The critical surface tension serves as an indicator of the wettability of the substance. A smaller value of the critical surface tension means greater wettability of the substance, normally indicating greater liquid absorbency. For a laminated body, the liquid absorption resistance between different layers greatly influences the liquid absorbency. The critical surface tension in the present specification is measured through a method conforming to JIS K 6768.

Specifically, the measurement is made at 25° C. of respective contact angles θ of pure water and propylene carbonate as solvents with respect to the outermost surface of the porous layer (coating layer) of a laminated body. The measurement involves use of Drop Master 500, a contact angle measuring device available from Kyowa Interface Science Co., Ltd. The critical surface tension (A) is calculated on the basis of a Zisman plot of the measurement results. Another calculation is made through a similar method of the critical surface tension (B) over a surface of the porous film (base material) remaining after the porous layer (coating layer) has been peeled from the laminated body from which surface the porous layer (coating layer) has been peeled.

In a case where (i) the absolute value is smaller of the difference between the critical surface tension (A) over the outermost surface of the porous layer and the critical surface tension (B) of the porous film that, in a case where the porous layer has been peeled from the laminated body at an interface with the porous film, the porous film has on the side of the interface and (ii) subtracting the value of the critical surface tension (B) from the value of the critical surface tension (A) returns a value of 0 or greater, the difference in liquid absorption resistance is reduced between the layer of the porous film and the porous layer, with the result of higher liquid absorbency for the entire separator. Specifically, 0 mN/m≤(A)−(B)≤20 mN/m, desirably 4 mN/m≤(A)−(B)≤19 mN/m, more desirably 4 mN/m≤(A)−(B)≤15 mN/m. Such a difference preferably achieves sufficiently high liquid absorbency of the entire separator for an electrolyte solution.

(Time Period of Permeation of Electrolyte Solution Through Porous Layer)

In order to reduce, to a practical level, the internal resistance of a nonaqueous electrolyte secondary battery produced to include the laminated body of the present invention as a nonaqueous electrolyte secondary battery separator, the present invention involves, during assembly of a nonaqueous electrolyte secondary battery, (i) a step of injecting an electrolyte solution into a group typically including a cathode, an anode, and a separator and (ii) an aging step of allowing the electrolyte solution to permeate through the inside of the separator. A method described below allows measurement of a time period of permeation of an electrolyte solution into a laminated body (nonaqueous electrolyte secondary battery separator), which time period is inversely correlated to a work time period (cycle time) of the above two steps. The time period of permeation of an electrolyte solution into the laminated body is thus presumed to serve as an indicator of the work speed for the above two steps, in particular a time period of permeation of an electrolyte solution through the inside of the separator.

The time period of permeation of an electrolyte solution into the laminated body is preferably shorter than 50 seconds, more preferably shorter than 30 seconds. In a case where the time period of permeation of an electrolyte solution into the laminated body is within the above range, it is possible to shorten, to a practical level, the work time period (cycle time) of a process of assembling a nonaqueous electrolyte secondary battery separator including the laminated body, in particular the aging step of allowing the electrolyte solution to permeate through the inside of the separator.

(Method for Producing Nonaqueous Electrolyte Secondary Battery Separator)

The laminated body of the present invention for use as a separator is produced by, as illustrated in FIG. 1, forming, on a surface of a porous film as a base material, a porous layer containing a resin through, for example, any one of methods (1) to (3) below.

(1) Method of (i) applying to a surface of the porous film a coating solution in which a resin for forming a porous layer is dissolved and then (ii) immersing the resulting film into a deposition solvent as a poor solvent for the resin to deposit a porous layer containing the resin (2) Method of (i) applying to a surface of the porous film a coating solution in which a resin for forming a porous layer is dissolved and then (ii) making the coating solution acidic with use of low-boiling proton acid to deposit a porous layer containing the resin (3) Method of (i) applying to a surface of the porous film a coating solution in which a resin for forming a porous layer is dissolved and then (ii) evaporating the solvent in the coating solution by far infrared heating or freeze drying to deposit a porous layer containing the resin The methods (1) and (2) may each further involve a step of, after a porous layer has been deposited, drying the laminated body produced.

The solvent (disperse medium) in which the resin is dissolved may be any solvent that does not adversely influence the porous film, that allows the resin to be dissolved uniformly and stably, and that allows the filler to be dispersed uniformly and stably. Specific examples of the solvent (disperse medium) include water; lower alcohols such as methyl alcohol, ethyl alcohol, n-propyl alcohol, isopropyl alcohol, and t-butyl alcohol; acetone, toluene, xylene, hexane, N-methylpyrrolidone, N,N-dimethylacetamide, and N,N-dimethylformamide. The present embodiment may use only one kind of solvent (disperse medium) or two or more kinds of solvents in combination. In a case where in any of the above methods, the resin for forming a porous layer is, for example, a PVDF-based resin, the solvent in which the resin is dissolved is preferably an amide-based solvent such as N-methylpyrrolidone, more preferably N-methylpyrrolidone.

The deposition solvent is, for example, a solvent (hereinafter referred to as "solvent X") other than the solvent (disperse medium) in the coating solution which solvent X is dissolvable in the solvent (disperse medium) in the coating solution and which solvent X does not dissolve the resin in the coating solution. The solvent (disperse medium) may be efficiently removed from the coating solution by (i) immersing into the solvent X a porous film to which, the coating solution has been applied to form a coating film, (ii) substituting the solvent X for the solvent (disperse medium) in the coating film on the porous film or a support, and then (iii) evaporating the solvent X. Specific examples of the deposition solvent include water; lower alcohols such as methyl alcohol, ethyl alcohol, n-propyl alcohol, isopropyl alcohol, and t-butyl alcohol; and acetone. The present embodiment may use only one kind of deposition solvent or two or more kinds of deposition solvents in combination. In a case where in the method (1), the resin for forming a porous layer is, for example, a PVDF-based resin, the solvent for depositing a porous layer is preferably isopropyl alcohol or t-butyl alcohol.

Combining the solvent for dissolving a resin with the deposition solvent allows adjustment of the difference between the critical surface tension (A) and the critical surface tension (B). Specifically, the properties of the above solvents influence and change the amount of the coating solution (that is, the resin) that enters the void in the porous film, which change in turn changes the critical surface tension (B), with the result of a change in the difference between the critical surface tension (A) and the critical surface tension (B).

In the method (2), the low-boiling proton acid is, for example, hydrochloric acid or acetic acid.

In the method (3), far infrared heating and freeze drying are advantageous over other drying methods (such as air drying) in that the respective shapes of holes in the porous layer are not easily changeable during the deposition.

The laminated body of the present invention for use as a separator may alternatively be produced by forming, on a surface of a porous film as a base material, a porous layer containing a resin through the method (4) below.

(4) Method of (i) applying to a base material a coating solution containing a disperse medium such as water and fine particles of the resin for forming a porous layer which fine particles are dispersed in the disperse medium and (ii) drying the disperse medium for removal to form a porous layer In the method (4), the disperse medium is preferably water. Further, the laminated body before the drying may be immersed in a lower alcohol to dilute or substitute the disperse medium such as water with the lower alcohol. In this case, the lower alcohol is preferably isopropyl alcohol or t-butyl alcohol.

In a case of producing a laminated body further including a heat-resistant layer, such a heat-resistant layer may be deposited through a method similar to the above method except that the resin for forming a porous layer is replaced with a resin for forming a heat-resistant layer.

To form a porous layer containing a filler, the filler may be dispersed in the coating solution in which the resin for forming a porous layer is dissolved.

There is no particular limit to how the coating solution is applied to the porous film, that is, how a porous layer is formed on a surface of a porous film that has been subjected to a hydrophilization treatment as necessary. In a case where a porous layer is deposited on each of both surfaces of the porous film, (i) a sequential deposition method may be used, which forms a porous layer on one surface of the porous film and then forms another porous layer on the other surface, or (ii) a, simultaneous deposition method may be used, which forms two porous layers simultaneously on respective surfaces of the porous film.

The thickness of the porous layer may be controlled by adjusting, for example, (i) the thickness of a coating film in a wet state after the coating, (ii) the weight ratio of the resin and the filler, and/or (iii) the solid content concentration of the coating solution (that is, the sum of the resin concentration and the filler concentration).

The coating solution is applied to the porous film through any method that allows the coating solution to be applied in a necessary weight per unit area with a necessary coating area. The coating solution may be applied through a conventionally publicly known method. Specific examples of the method include gravure coater method, small-diameter gravure coater method, reverse roll coater method, transfer roll coater method, kiss coater method, dip coater method, knife coater method, air doctor blade coater method, blade coater method, rod coater method, squeeze coater method, cast coater method, bar coater method, die coater method, screen printing method, and spray applying method.

The above drying may be performed with use of a normal drying device. The drying is performed at a drying temperature that does not decrease the air permeability of the porous film, specifically 10° C. to 120° C., preferably 20° C. to 80° C., to prevent pores in the porous film from contracting to decrease the air permeability of the porous film.

The thickness of the porous layer formed through the above method may be selected as appropriate in view of the thickness of the laminated body. In a case where (i) a porous film is used as a base material and (ii) a porous layer is deposited on one or both surfaces of the porous film to produce a laminated body, the thickness of the porous layer is preferably 0.1 to 20 µm (combined value in a case where a porous layer is deposited on each of both surfaces), more preferably 2 to 15 µm. If the thickness of the porous layer is larger than the above range, a nonaqueous electrolyte secondary battery including the laminated body as a separator may have a degraded load characteristic. If the thickness of the porous layer is smaller than the above range, heat generated in the battery by an accident or the like may let the porous layer break due to a failure to resist thermal shrinkage of the porous film, with the result of the separator being contracted.

The porous layer has a weight per unit area selected as appropriate in view of the strength, thickness, weight, and handling easiness of the laminated body. The weight per unit area is, however, normally preferably 0.1 to 5 g/m², more preferably 0.5 to 3 g/m², in order to increase the weight energy density and volume energy density of a nonaqueous electrolyte secondary battery including the laminated body as a separator. If the weight per unit area of the porous layer is larger than the above range, a nonaqueous electrolyte secondary battery including the laminated body as a separator will be heavy.

The porous layer has a porosity of preferably 0.1 to 0.9 (10 to 90% by volume), more preferably 0.3 to 0.8 (30 to 80% by volume), in order to achieve sufficient ion permeability. The porous layer has pores each having a pore size of preferably 3 µm or less, more preferably 1 µm or less, in order to, in a case where the laminated body is used as a separator, achieve sufficient ion permeability and prevent particles from entering the cathode, the anode, or the like. The average pore size (average pore diameter (C)) of pores in the porous film and the porosity (D) of the porous film have a relation of preferably (C)/(D)<0.13, more preferably (C)/(D)≤0.10.

A laminated body including a porous film having the above-described (C)/(D) within the above range is preferably used as a nonaqueous electrolyte secondary battery separator. This is because such a laminated body can increase the ease of infiltration of an electrolyte solution into the polyolefin base material of a nonaqueous electrolyte secondary battery separator so that the ease of infiltration is sufficiently high for the separator to be in actual use as a nonaqueous electrolyte secondary battery separator.

The present invention is not limited to the description of the embodiments above, but may be altered in various ways by a skilled person within the scope of the claims. Any embodiment based on a proper combination of technical means disclosed in different embodiments is also encompassed in the technical scope of the present invention.

The present invention may also include in its scope a laminated body arranged as below and a nonaqueous electrolyte secondary battery separator arranged as below.

[1] A laminated body including:
a porous film containing a polyolefin as a main component; and
a porous layer on at least one surface of the porous film, the porous layer containing a resin,
the laminated body satisfying Formula (1') below, $$|(A)-(B)|<10 \text{ mN/nm} \qquad (1'),$$

where
(A) represents a critical surface tension over an outermost surface of the porous layer, and
(B) represents a critical surface tension that, in a case where the porous layer has been peeled from the laminated body at an interface with the porous film, the porous film has on a side of the interface.

[2] The laminated body according to [1],
wherein
the resin contained in the porous layer is a polyvinylidene fluoride-based resin.

[3] A separator for a nonaqueous electrolyte secondary battery,
the separator including
the laminated body according to [1] or [2].

Second Embodiment: Aspect 2 of Present Invention

The description below deals with a second embodiment of the present invention. The present invention is, however, not limited to such an embodiment. Further, the present invention is not limited to the description of the arrangements below, but may be altered in various ways by a skilled person within the scope of the claims. Any embodiment or example based on a proper combination of technical means disclosed in different embodiments and examples is also encompassed in the technical scope of the present invention. All academic and patent documents cited in the present specification are incorporated herein by reference. In the present specification, any numerical range expressed as "A to B" means "not less than A and not greater than B" unless otherwise stated.

<Laminated Body>

A laminated body of the present invention is a laminated body including: a porous film containing a polyolefin as a main component; and a porous layer on one or both, surfaces of the porous film, the porous layer containing a resin, the laminated body satisfying Formula (1) below, $$(A)>(B) \qquad (1),$$

where (A) represents an amount ($V \cdot m^2/g$) of an increase in a dielectric strength of the porous layer with respect to an amount of an increase in an amount ($g/m^2$) of the resin contained per unit area of the porous layer, and (B) represents an amount ($V \cdot m^2/g$) of an increase in a dielectric strength of the porous film with respect to an amount of an increase in an amount ($g/m^2$) of the polyolefin contained per unit area of the porous film, the laminated body satisfying Formula (2) below, $$(C)/(D) \leq 0.13 \qquad (2),$$

where (C) represents an average pore diameter of the porous film, and (D) represents a porosity of the porous film. Such use of a resin that achieves a large amount of an increase in the dielectric strength with respect to the amount of an increase of the resin allows production of a separator having a higher dielectric strength.

In Formula (2) above, (C) represents an average pore diameter of the porous film, and (D) represents a porosity of the porous film, the average pore diameter (C) having a value in µm indicative of a mean value of respective sizes of pores in the porous film, the porosity (D) having a value indicative of a volume proportion of void in the actual porous film with reference to a volume of the porous film assumed to have no void.

Deficient portions are detected as defective portions during a withstand voltage test. Such a deficient portion is caused at a portion with a decrease in the withstand voltage of the coating separator. Reducing such a portion having a decreased withstand voltage requires the porous layer on the film to be uniform. (C)/(D) is presumed to be a factor that influences this uniformity. In a case where (C)/(D) returns a value of 0.13 or less, it is possible to prevent deficient portions from being caused.

The respective dielectric strengths of the porous layer and the porous film may each be measured with use of IMP3800K, an impulse insulation tester available from Nippon Technart Inc., through the following procedure:

(i) Insert a laminated body as a measurement target between an upper cylinder electrode with a diameter of ϕ25 mm and a lower cylinder electrode with a diameter of ϕ75 mm.

(ii) Store electric charge in a capacitor inside the device to apply a voltage increasing linearly from 0 V to the laminated body between the upper and lower electrodes electrically connected to the inside capacitor.

(iii) Continue applying the voltage until a voltage drop is detected (that is, until a dielectric breakdown occurs), and measure, as a dielectric breakdown voltage, the voltage at which the voltage drop was detected.

(iv) Plot dielectric breakdown voltages with respect to the weight per unit area of the resin in the porous layer of the laminated body, and calculate the dielectric strengths from the inclination of a straight line as a result of linear approximation.

In another embodiment of the present invention, the nonaqueous secondary battery separator may include, in addition to the porous layer, a heat-resistant layer containing a heat-resistant resin. The heat-resistant layer preferably contains aramid or fine particles of alumina.

[Porous Film]

The porous film for the present invention serves as a base material of the separator. The porous film contains a polyolefin as a main component and has inside itself a large number of pores connected to one another. The porous film allows a gas, a liquid, or the like to pass therethrough from one surface to the other.

The polyolefin contained in the porous film may have, for example, any kind and content such that (i) about (A) and (B) above, (A)>(B) is satisfied and that (ii) about the mean value of respective sizes of pores in the porous film (average pore diameter (C)) and the porosity (D) of the porous film, (C)/(D)≤0.13 is satisfied. In other words, the kind, content, and the like of the polyolefin may be selected as appropriate depending on, for example, the kind and content of the resin in the porous layer and the properties of the desired porous film. The description below deals with specific examples each satisfying the above relations.

The porous film contains a polyolefin at a proportion of 50% or more by volume, preferably 90% or more by volume, more preferably 95% or more by volume, of the entire porous film. The polyolefin preferably contains a high molecular weight component having a weight-average molecular weight of $5 \times 10^5$ to $15 \times 10^6$. The polyolefin particularly preferably contains a high molecular weight component having a weight-average molecular weight of 1,000,000 or more because such a high molecular weight component increases (i) the strength of the porous film and (ii) that of the laminated body including the porous film. The expression "amount of the polyolefin contained per unit area of the porous film." as used for the present invention refers to the proportion of the polyolefin in the porous film described herein.

The dielectric strength of the porous film may be measured through a conventionally publicly known method. The dielectric strength may be measured, for example, with use of IMP-1090, a lithium ion battery insulation tester available from Nippon Technart Inc., with reference to the attached instruction manual.

Specific examples of a thermoplastic resin as the polyolefin include homopolymers (for example, polyethylene, polypropylene, and polybutene) and copolymers (for example, ethylene-propylene copolymer) produced through (co)polymerization of a monomer such as ethylene, propylene, 1-butene, 4-methyl-1-pentene, or 1-hexene. Among the above examples, polyethylene is preferable because it is able to prevent (shutdown) the flow of an excessively large current at a lower temperature. Examples of the polyethylene include a low-density polyethylene, a high-density polyethylene, a linear polyethylene (ethylene-α-olefin copolymer), and an ultra high molecular weight polyethylene having a weight-average molecular weight of 1,000,000 or more. Among these examples, an ultra high molecular weight polyethylene having a weight-average molecular weight of 1,000,000 or more is preferable.

The porous film may have a thickness selected as appropriate in view of the thickness of the laminated body. The porous film, however, preferably has a thickness of 4 to 40 μm, more preferably 7 to 30 μm, in a case where (i) a porous film is used as a base material and (ii) a porous layer is deposited on one or both surfaces of the porous film to produce a laminated body.

The porous film contains a polyolefin having a weight per unit area selected as appropriate in view of the strength, thickness, weight, and handling easiness of the laminated body. The weight is, however, normally preferably 4 to 20 g/m$^2$, more preferably 5 to 12 g/m$^2$, in order to increase the weight energy density and volume energy density of a nonaqueous electrolyte secondary battery including the laminated body as a separator.

The porous film has an air permeability of preferably 30 to 500 see/100 mL, more preferably 50 to 300 see/100 mL, in terms of Gurley values. A porous film having such an air permeability achieves sufficient ion permeability in a case where the laminated body is used as a separator.

The porous film has a porosity (D) of preferably 0.2 to 0.8 (20 to 80% by volume), more preferably 0.3 to 0.75 (30 to 75% by volume), in order to allow the separator to (i) retain a larger amount of electrolyte solution and (ii) achieve a function of reliably preventing (shutdown) the flow of an excessively large current at a lower temperature. The porous film has pores each having a pore size of preferably 3 μm or less, more preferably 1 μm or less, in order to, in a case where the laminated body is used as a separator, achieve sufficient ion permeability and prevent particles from entering the cathode, the anode, or the like. Further, the porous film has pores having an average pore size (hereinafter referred to also as "average pore diameter (C)"), the average pore diameter (C) and porosity (D) of the porous film preferably satisfying the relation (C)/(D)≤0.13, more preferably satisfying the relation (C)/(D)≤0.10.

The average pore diameter (C) of the porous film is measured with use of a palm porometer available from PMI Co., Ltd. (model: CFP-1500A). The measurement involves, as a test liquid, GalWick (product name) available from PMI Co., Ltd., and is made of the following curves (i) and (ii) for the porous film:

(i) Pressure-flow rate curve for the porous film as immersed in the test liquid (ii) Pressure-flow rate curve, which is half the flow rate measured for the dry porous film The average pore diameter (C) of the porous film is calculated by Formula (3) below on the basis of the value of a pressure P corresponding to the point of intersection of the curves (i) and (ii).

$$(C)=4\cos\theta r/P \quad (3)$$

In Formula (3) above, (C) represents the average pore diameter (μm), r represents the surface tension (N/m) of the test liquid, P represents the above-mentioned pressure (Pa) corresponding to the point of intersection, and θ represents the angle (°) of contact between the porous film and the test liquid.

The porosity (D) of the porous film is measured through the following method: A square piece with a 10 cm side is cut out from the porous film. The weight W (g) and thickness E (cm) of the piece cut out are then measured. The porosity (D) of the porous film is calculated by Formula (4) below on the basis of (i) the weight (W) and thickness (E) measured above and (ii) the true specific gravity ρ (g/cm$^3$) of the porous film.

$$\text{Porosity }(D)=1-\{(W/\rho)\}/(10\times10\times E) \quad (4)$$

The average pore diameter (C) of the porous film is controlled through, for example, a method of, in a case of reducing the pore diameter, (i) uniformizing the dispersion state of a pore forming agent such as an inorganic filler or of a phase separating agent during production of the porous film, (ii) using, as a pore forming agent, an inorganic filler having smaller particle sizes, (iii) drawing the porous film in a state where the porous film contains a phase separating agent, or (iv) drawing the porous film at a low extension magnification. The porosity (D) of the porous film is controlled through, for example, a method of, in a case of producing a porous film having a high porosity, (i) increasing the amount of a pore forming agent such as an inorganic filler or of a phase separating agent relative to the resin such as a polyolefin, (ii) drawing the porous film after the phase separating agent has been removed, or (iii) drawing the porous film at a high extension magnification.

The above average pore diameter (C)/porosity (D) of the porous film is presumed to be a factor that influences uniformity of the porous layer on the film which uniformity is necessary to reduce a portion with a decrease in the withstand voltage of the coating separator which portion causes a deficient portion, which is detected as a defective portion during a withstand voltage test.

If (C)/(D) returns a value outside the above range, that is, a value greater than 0.13, the porous film has either a larger average pore diameter (C) or a smaller porosity (D).

If the porous film has a larger average pore diameter (C), an increase in the size of holes (pores) in the porous film will make it more likely for the resin to enter the pores in the base material (porous film). This will generate a portion with a low withstand voltage, at which the amount of resin is locally decreased per unit area of the deposited porous layer (or no deposited resin is present in some cases). If the porous film has a smaller porosity (D), the resin will be prevented from entering the pores in the porous film. This will prevent the laminated body, which includes the porous film and the porous layer, from having a sufficient interface strength. There will more likely be generated a portion with a low withstand voltage, at which the deposited porous layer is locally lost or deficient.

Thus, in the case where the above-described (C)/(D) returns a value of 0.13 or less, it is possible to produce a laminated body in which (i) generation of a portion with a low withstand voltage is prevented, and (ii) the deficient portion is reduced during a withstand voltage test, the laminated body thus having a higher dielectric strength and being suitable as a separator.

Since the porous film for the present invention has pores, the average pore diameter (C) of the porous film has a value of greater than 0, which also indicates that the above-described (C)/(D) returns a value of greater than 0.

The porous film may be produced through any method, and may be produced through, for example, a method of (i) adding a plasticizing agent to a resin such as a polyolefin to shape the polyolefin into a film and then removing the plasticizing agent with use of an appropriate solvent.

Specifically, in a case of, for example, producing a porous film with use of (i) a polyolefin resin containing an ultra high molecular weight polyethylene and (ii) a low molecular weight polyolefin having a weight-average molecular weight of 10,000 or less, such a porous film is, in terms of production cost, preferably produced through the method including steps of:

(1) kneading (i) 100 parts by weight of the ultra high molecular weight polyethylene, (ii) 5 to 200 parts by weight of the low molecular weight polyolefin having a weight-average molecular weight of 10,000 or less, and (iii) 100 to 400 parts by weight of an inorganic filler made of calcium carbonate and the like to produce a polyolefin resin composition, (2) shaping the polyolefin resin composition into a sheet, then either (3) removing the inorganic filler from the sheet produced in the step (2), and (4) drawing the sheet, from which the inorganic filler has been removed in the step (3), to produce a porous film, or (3') drawing the sheet produced in the step (2), and (4') removing the inorganic filler from the sheet drawn in the step (3') to produce a porous film.

The porous film may alternatively be a commercially available product having the above physical properties.

The porous film is preferably subjected to a hydrophilization treatment before a porous layer is formed thereon, that is, before a coating solution described below is applied thereto. Performing a hydrophilization treatment on the porous film further improves the coating easiness of the coating solution and thus allows a more uniform porous layer to be formed. This hydrophilization treatment is effective in a case where the solvent (disperse medium) contained in the coating solution has a high proportion of water. Specific examples of the hydrophilization treatment include publicly known treatments such as (i) a chemical treatment involving an acid, an alkali, or the like, (ii) a corona treatment, and (iii) a plasma treatment. Among these hydrophilization treatments, a corona treatment is preferable because it can not only hydrophilize the porous film within a relatively short time period, but also hydrophilize only a surface and its vicinity of the porous film to leave the inside of the porous film unchanged in quality.

[Porous Layer]

The porous layer for the present invention is a heat-resistant layer provided on one or both surfaces of the porous film and containing at least resin. The resin preferably has a three-dimensional network structure.

The resin contained in the porous layer is any resin such that about (A) and (B) above, (A)>(B) is satisfied. The resin is, however, preferably (i) insoluble in the electrolyte solution of the battery and (ii) electrochemically stable when the battery is in normal use. Whether the resin has a three-dimensional network structure may be examined, for example, under a scanning electron microscope (SEM).

The "amount of the resin contained per unit area of the porous layer" for the present invention may be calculated from (i) the respective amounts of a resin, a monomer, a filler, and the like for forming a porous layer and (ii) the area of the porous layer produced.

The dielectric strength of the porous layer may be measured through a method similar to the method described above for measuring the dielectric strength of the porous film.

Specific examples of the resin contained in the porous layer include polyolefins such as polyethylene, polypropylene, polybutene, and ethylene-propylene copolymer; fluorine-containing resins such as polyvinylidene fluoride (PVDF) and polytetrafluoroethylene; fluorine-containing rubbers such as vinylidene fluoride-hexafluoropropylene-tetrafluoroethylene copolymer and ethylene-tetrafluoroethylene copolymer; aromatic polyamides; fully aromatic polyamides (aramid resins); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or glass transition temperature of 180° C. or higher such as polyphenylene ether, polysulfone, polyether sulfone, polyphenylene sulfide, polyetherimide, polyamide imide, polyetheramide, and polyester; and water-soluble polymers such as polyvinyl alcohol, polyethyleneglycol, cellulose ethers, polyacrylic acid, polyacrylamide, and polymethacrylic acid.

Specific examples of the aromatic polyamides include poly(paraphenylene terephthalamide), poly(methaphenylene isophthalamide), poly(parabenzamide), poly(methabenzamide), poly(4,4'-benzanilide terephthalamide), poly (paraphenylene-4,4'-biphenylene dicarboxylic acid amide), poly(methaphenylene-4,4'-biphenylene dicarboxylic acid amide), poly(paraphenylene-2,6-naphthalene dicarboxylic acid amide), poly(methaphenylene-2,6-naphthalene dicarboxylic acid amide), poly(2-chloroparaphenylene terephthalamide), paraphenylene terephthalamide/2,6-dichloroparaphenylene terephthalamide copolymer, and methaphenylene terephthalamide/2,6-dichloroparaphenylene terephthalamide copolymer. Among these, poly(paraphenylene terephthalamide) is preferable.

The polyimide is preferably a fully aromatic polyimide produced through condensation polymerization of an aromatic diacid anhydride and a diamine. Examples of the diacid anhydride include pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3',4,4'-biphenyl tetracarboxylic dianhydride. Examples of the diamine include oxydianiline, paraphenylenediamine, benzophenone diamine, 3,3-methylenedianiline, 3,3'-diaminobenzophenone, 3,3'-diaminodiphenyl sulfone, and 1,5'-naphthalene diamine.

The polyamide imide is, for example, produced through condensation polymerization of (i) aromatic dicarboxylic acid and aromatic diisocyanate or (ii) aromatic diacid anhydride and aromatic diisocyanate. Examples of the aromatic dicarboxylic acid include isophthalic acid and terephthalic acid. Examples of the aromatic diacid anhydride include trimellitic anhydride. Examples of the aromatic diisocyanate include 4,4'-diphenylmethane diisocyanate, 2,4-tolylene diisocyanate, 2,6-tolylene diisocyanate, ortho tolylene diisocyanate, and m-xylene diisocyanate.

Among the above resins, a polyolefin, a fluorine-containing resin, an aromatic polyamide, and a water-soluble polymer are preferable. An aromatic polyamide and polyvinylidene fluoride are more preferable for a higher dielectric strength.

The porous layer may contain a filler. In a case where the porous layer contains a filler, the resin functions also as a binder resin.

The porous layer for the present invention may contain a filler made of organic matter or a filler made of inorganic matter. Specific examples of the filler made of organic matter include fillers made of (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-containing resins such as polytetrafluoroethylene, ethylene tetrafluoride-propylene hexafluoride copolymer, tetrafluoroethylene-ethylene copolymer, and polyvinylidene fluoride; melamine resin; urea resin; polyethylene; polypropylene; and polyacrylic acid and polymethacrylic acid. Specific examples of the filler made of inorganic matter include fillers made of calcium carbonate, talc, clay, kaolin, silica, hydrotalcite, diatomaceous earth, magnesium carbonate, barium carbonate, calcium sulfate, magnesium sulfate, barium sulfate, aluminum hydroxide, magnesium hydroxide, calcium oxide, magnesium oxide, titanium oxide, titanium nitride, alumina (aluminum oxide), aluminum nitride, mica, zeolite, or glass. The porous layer may contain (i) only one kind of filler or (ii) two or more kinds of fillers in combination.

Among the above fillers, an inorganic particle is preferable. The inorganic particle is a filler made of inorganic matter typically called "filling material". The inorganic particle is, for example, a filler made of an inorganic oxide such as silica, calcium oxide, magnesium oxide, titanium oxide, alumina, mica, or zeolite is preferable. A filler made of at least one kind selected from the group consisting of silica, magnesium oxide, titanium oxide, and alumina is more preferable. A filler made of alumina is particularly preferable. While alumina has many crystal forms such as α-alumina, β-alumina, γ-alumina, and θ-alumina, any of the crystal forms can be used suitably. Among the above crystal forms, α-alumina is the most preferable because it is particularly high in thermal stability and chemical stability.

The filler has a shape that varies depending on, for example, (i) the method for producing the organic matter or inorganic matter as a raw material and (ii) the condition under which the filler is dispersed when the coating solution for forming a porous layer is prepared. The filler may, as long as it has the particle diameter below, have any of various shapes such as a spherical shape, an oblong shape, a rectangular shape, a gourd shape, or an indefinite, irregular shape.

In a case where (i) the porous layer contains a filler, and (ii) the filler is an inorganic particle, the filler is contained in an amount of preferably 10 to 90% by weight, more preferably 25 to 75% by weight, with respect to the porous layer in its entirety. In a case where the inorganic particle is contained in an amount of 90% by weight or less, preferably 75%, by weight or less, with respect to the resin layer in its entirety, the resin layer can have improved dielectric strength. The laminated body of the present invention is produced through a method of, for example, (i) dissolving a resin in a solvent and dispersing the above filler in the solution as necessary to prepare a coating solution for forming a porous layer and then (ii) applying the coating solution to one or both surfaces of the porous film and drying the coating solution applied to form a porous layer for the present invention. In other words, the coating solution is applied to one or both surfaces of the porous film and then dried to produce a laminated body of the present invention, which includes (i) a porous film and (ii) a porous layer on one or both surfaces of the porous film.

The laminated body of the present invention may be produced through any of various methods as long as the method allows production of the laminated body described above.

In a case where the porous layer is to contain, for example, a fluorine-containing resin, the laminated body of the present invention may be produced through a method of (i) applying to the porous film a coating solution containing a fluorine-containing resin to form a coating layer and then (ii) curing the fluorine-containing resin in the coating layer to form a porous layer integrally on the porous film.

A porous layer containing a fluorine-containing resin may be formed through, for example, the wet coating method below. Forming a porous layer through such a method allows the porous layer to have a three-dimensional network structure. First, a fluorine-containing resin is dissolved in a solvent, and as necessary, a filler is dispersed in the solution to prepare a coating solution. This coating solution is applied to a porous film, and then the porous film with the coating solution applied is immersed in an appropriate setting liquid to induce phase separation and cure the fluorine-containing resin. Performing these steps forms, on the porous film, a layer containing a fluorine-containing resin and having a porous structure (preferably a three-dimensional network structure). This layer is then washed with water and dried to remove the setting liquid from the layer having a porous structure.

A specific example is the following method:
(Method 1)
(a) Prepare a solution in which a fluorine-containing resin is dissolved in a solvent.
(b) Apply the solution to a porous film to form a coating film.
(c) Perform an operation such as immersing, into a solvent that does not dissolve the fluorine-containing resin, the wet coating film to separate the fluorine-containing resin out of the coating film.
(d) As necessary, immerse the wet coating film, in which the fluorine-containing resin has been separated, again into a solvent that does not dissolve the fluorine-containing resin and wash the coating film.
(e) Dry the wet coating film, in which the fluorine-containing resin has been separated.

The description below deals in detail with a wet coating method suitable for the present invention.

Suitable examples of the solvent (hereinafter referred to also as "good solvent") for use in the preparation of the coating solution which solvent dissolves a fluorine-containing resin include polar amide solvents such as N-methyl 2-pyrrolidone (NMP), dimethylacetamide, dimethylformamide, and dimethylformamide.

To form a good porous structure, the good solvent is preferably mixed with a phase separating agent for inducing phase separation. Examples of the phase separating agent include water, methanol, ethanol, propyl alcohol, butyl alcohol, butandiol, ethylene glycol, propylene glycol, and tripropylene glycol. The phase separating agent is preferably added in an amount that achieves viscosity suitable for the coating.

To form a good porous structure, the solvent is preferably a mixed solvent containing (i) 60% or more by mass of a good solvent and (ii) 5% by mass to 40% by mass of a phase separating agent. To form a good porous structure, the coating solution preferably contains a fluorine-containing resin at a concentration of 3% by mass to 10% by mass.

To impart slidability to the porous layer and form a good porous structure, the coating solution contains a filler at a proportion of preferably 1% by mass to 30% by mass, more preferably 3%, by mass to 28% by mass, with respect to the total amount of the fluorine-containing resin and the filler.

The setting liquid typically includes (i) a good solvent and phase separating agent for use in the preparation of the coating solution and (ii) water. It is preferable in terms of production that the good solvent and the phase separating agent be mixed at a ratio equal to that of the mixed solvent for use in the dissolution of the fluorine-containing resin. For good formation of a porous structure and productivity, the water concentration is preferably 40% by mass to 90% by mass.

The coating solution may be applied to the porous film through a conventional coating method, for example, with use of a Meyer bar, a die coater, a reverse roll coater, or a gravure coater.

The porous layer may alternatively be produced through a dry coating method instead of a wet coating method described above. The dry coating method is a method of (i)

applying to a porous film a coating solution containing a fluorine-containing resin, a filler, and a solvent and then (ii) drying the coating layer for removal of the solvent through volatilization to produce a porous layer. The dry coating method, however, likely produces a closely packed coating layer as compared to the wet coating method. Thus, to form a good porous structure (three-dimensional network structure), the wet coating method is preferable.

The separator may alternatively be produced through a method of (i) preparing a porous layer as a separate sheet, (ii) placing the porous layer on a porous film, and (iii) combining the porous layer with the porous film through thermocompression or with use of an adhesive. The porous layer may be prepared as a separate sheet through a method of, for example, (i) applying to a release sheet a coating solution containing a fluorine-containing resin and a filler, (ii) forming a porous layer through the wet coating method or dry coating method described above, and (iii) peeling the porous layer from the release sheet.

In a case where the porous layer is to contain a resin other than a fluorine-containing resin, a laminated body may be produced through, for example, a method of (i) preparing a porous film and a porous layer separately and (ii) combining the porous film and the porous layer with each other or a method of (i) preparing a coating solution containing a medium as well as a component for a porous layer, (ii) applying the coating solution to a porous film, and (iii) removing the medium. The latter of these methods is simple and preferable.

The medium is a solvent or a disperse medium, and simply needs to be capable of dissolving or dispersing a component for a porous layer uniformly and stably. Examples of the medium include water, alcohols such as methanol, ethanol, and isopropanol, acetone, toluene, xylene, hexane, N-methylpyrrolidone, N,N-dimethylacetamide, and N,N-dimethylformamide. The present invention may use only one of the above mediums, or mix two or more of the above mediums with each other for use as long as the two or more mediums are dissolved in each other.

In terms of process or environmental load, it is preferable for the medium to contain water at 80% or more by weight, more preferably contain only water.

The coating solution may be applied to the porous film through any method that allows uniform wet coating, and may be applied through a conventionally publicly known method. Examples of the application method include capillary coating method, spin coating method, slit die coating method, spray coating method, roll coating method, screen printing method, flexographic printing method, bar coater method, gravure coater method, and die coater method. The thickness of the porous layer may be controlled by adjusting (i) the amount of the coating solution to be applied, (ii) the concentration of the polymer in the coating solution, and/or (iii) in a case where the coating solution contains fine particles, the ratio of the fine particles to the polymer.

The coating solution may be prepared through any method that allows a homogeneous coating solution to be prepared. In a case where the coating solution is to contain a filler, in particular, the coating solution is preferably prepared through a method such as mechanical stirring method, ultrasonic dispersion method, high-pressure dispersion method, or media dispersion method, among which high-pressure dispersion method is preferable because the method makes it easy to disperse a filler more uniformly. The mixing order during such an operation may be any order as long as it causes no particular problem such as generation of precipitate. For instance, the polymer and any other component such as a filler may be (i) added together to a medium and mixed with each other, (ii) added in any order to a medium and mixed with each other, or (iii) first dissolved or dispersed in respective mediums and then mixed with each other.

In a case where the medium for the coating solution contains water, it is preferable to perform a hydrophilization treatment on the porous film before applying the coating solution to the porous film. Performing a hydrophilization treatment on the porous film further improves the application property, and allows production of a more homogeneous porous layer. A hydrophilization treatment is particularly effective in a case where the medium contains water at a high concentration.

Examples of the hydrophilization treatment include (i) a chemical treatment involving an acid, an alkali, or the like, (ii) a corona treatment, and (iii) a plasma treatment.

Among the above hydrophilization treatments, a corona treatment is preferable because it can not only hydrophilize the porous film within a relatively short time period, but also reform the polyolefin through corona discharge only at a surface and its vicinity of the porous film and leave the inside of the porous film unchanged in quality while ensuring a high application property.

The medium is removed from the coating solution on the porous film preferably by drying the porous film because drying is simple. Examples of the drying method include natural drying, blow drying, drying by heating, and drying under reduced pressure, among which drying by heating is preferable. Although depending on the medium used, the drying temperature is preferably 30° C. to 80° C., more preferably 50° C. to 80° C. A drying temperature of 30° C. or higher allows a sufficient drying speed. A drying temperature of 80° C. or lower allows deposition of a porous film having good appearance.

The thickness of the porous layer of the present invention formed through the above method may be selected as appropriate in view of the thickness of the laminated body. In a case where (i) a porous film is used as a base material and (ii) a porous layer is deposited on one or both surfaces of the porous film to produce a laminated body, the thickness of the porous layer is preferably 0.1 to 20 μm (combined value in a case where a porous layer is deposited on each of both surfaces), more preferably 2 to 15 μm. If the thickness of the porous layer is larger than the above range, a nonaqueous electrolyte secondary battery including the laminated body as a separator may have a degraded load characteristic. If the thickness of the porous layer is smaller than the above range, heat generated in the battery by an accident or the like may let the porous layer break due to a failure to resist thermal shrinkage of the porous film, with the result of the separator being contracted.

The physical properties of the porous layer are described below to indicate, in a case where a porous layer is deposited on each of both surfaces of a porous film, at least the physical properties of a porous layer on a surface of the porous film which surface faces the cathode when the porous film is included in a nonaqueous electrolyte secondary battery.

The porous layer has a weight per unit area selected as appropriate in view of the strength, thickness, weight, and handling easiness of the laminated body. The weight per unit area is, however, normally preferably 0.1 to 5 $g/m^2$, more preferably 0.5 to 3 $g/m^2$, in order to increase the weight energy density and volume energy density of a nonaqueous electrolyte secondary battery including the laminated body as a separator. If the weight per unit area of the porous layer is larger than the above range, a nonaqueous electrolyte secondary battery including the laminated body as a separator will be heavy.

Depositing a porous layer on one or both surfaces of the porous film through the method described above allows the laminated body of the present invention to be formed. The laminated body of the present invention, in other words, includes (i) a porous film and (ii) the above-described porous layer on one or both surfaces of the porous film.

The laminated body has an air permeability of preferably 30 to 800 sec/100 mL, more preferably 50 to 500 sec/100 mL, in terms of Gurley values. A laminated body having such an air permeability achieves sufficient ion permeability in a case where the laminated body is used as a separator. An air permeability larger than the above range means that the laminated body has a high porosity and thus has a rough laminated structure. This may result in the laminated body having decreased strength, in particular insufficient shape stability at high temperatures. An air permeability smaller than the above range, on the other hand, may prevent the laminated body from having sufficient ion permeability when used as a separator and thus degrade the characteristics of a nonaqueous electrolyte secondary battery to be produced.

The laminated body is preferably arranged such that about (A) and (B) above, (A)>2×(B) is satisfied. In a case where (A) and (B) above satisfy this relation, the withstand voltage property is improved at a portion at which the deposited porous layer is deficient in the laminated body produced. Thus, even in a case where the deposited porous layer has, for example, a portion with a structural deficiency or decreased thickness, the present embodiment allows production of (i) a laminated body that does not become defective during a withstand voltage test and (ii) a nonaqueous electrolyte secondary battery separator including such a laminated body.

In a case where a withstand voltage test is conducted on a laminated body (that is, a voltage is applied to a laminated body), the laminated body preferably has 30 or less, more preferably 25 or less, deficient portions caused by the withstand voltage test. In a case where the number of such deficient portions is reduced to fall within the above range, a nonaqueous electrolyte secondary battery assembled to include the laminated body as a separator can have a decreased rate of operation defects.

The laminated body of the present invention may further include, in addition to the porous film and the porous layer, a publicly known porous film such as a heat-resistant layer, an adhesive layer, or a protective layer as necessary as long as the present invention can attain its objects.

<Nonaqueous Electrolyte Secondary Battery>

The nonaqueous electrolyte secondary battery of the present invention includes a laminated body as a separator. More specifically the nonaqueous electrolyte secondary battery of the present invention includes a nonaqueous electrolyte secondary battery member including a cathode, a laminated body, and an anode arranged in that order. The description below deals with a lithium ion secondary battery as an example of the nonaqueous electrolyte secondary battery. The constituent elements of the nonaqueous electrolyte secondary battery other than the laminated body are not limited to the constituent elements described below.

The nonaqueous electrolyte secondary battery of the present invention may use, for example, a nonaqueous electrolyte solution prepared by dissolving a lithium salt in an organic solvent. Examples of the lithium salt include $LiClO_4$, $LiPF_6$, $LiAsF_6$, $LiSbF_6$, $LiBF_4$, $LiCF_3SO_3$, $LiN$ $(CF_3SO_2)_2$, $LiC(CF_3SO_2)_3$, $Li_2B_{10}Cl_{10}$, lower aliphatic carboxylic acid lithium salt, and $LiAlCl_4$. The present embodiment may use only one kind of the above lithium salts or two or more kinds of the above lithium salts in combination. The present embodiment preferably uses, among the above lithium salts, at least one fluorine-containing lithium salt selected from the group consisting of $LiPF_6$, $LiAsF_6$, $LiSbF_6$, $LiBF_4$, $LiCF_3SO_3$, $LiN(CF_3SO_2)_2$, and $LiC(CF_3SO_2)_3$.

Specific examples of the organic solvent in the nonaqueous electrolyte solution include carbonates such as ethylene carbonate, propylene carbonate, dimethyl carbonate, diethyl carbonate, ethyl methyl carbonate, 4-trifluoromethyl-1,3-dioxolane-2-on, and 1,2-di(methoxy carbonyloxy)ethane; ethers such as 1,2-dimethoxyethane, 1,3-dimethoxypropane, pentafluoropropyl methylether, 2,2,3,3-tetrafluoropropyl difluoro methylether, tetrahydrofuran, and 2-methyl tetrahydrofuran; esters such as methyl formate, methyl acetate, and γ-butyrolactone; nitriles such as acetonitrile and butyronitrile; amides such as N,N-dimethylformamide and N,N-dimethylacetamide; carbamates such as 3-methyl-2-oxazolidone; sulfur-containing compounds such as sulfolane, dimethyl sulfoxide, and 1,3-propane sultone; and fluorine-containing organic solvents each prepared by introducing a fluorine group into the organic solvent. The present embodiment may use only one kind of the above organic solvents or two or more kinds of the above organic solvents in combination. Among the above organic solvents, carbonates are preferable. A mixed solvent of a cyclic carbonate and an acyclic carbonate or a mixed solvent of a cyclic carbonate and an ether is more preferable. The mixed solvent of a cyclic carbonate and an acyclic carbonate is preferably a mixed solvent of ethylene carbonate, dimethyl carbonate, and ethyl methyl carbonate because such a mixed solvent allows a wider operating temperature range, and is not easily decomposed even in a case where the present embodiment uses, as an anode active material, a graphite material such as natural graphite or artificial graphite.

The cathode is normally a sheet-shaped cathode including (i) a cathode mix containing a cathode active material, a conductive material, and a binding agent and (ii) a cathode current collector supporting the cathode mix thereon.

The cathode active material is, for example, a material capable of being doped and dedoped with lithium ions. Specific examples of such a material include a lithium complex oxide containing at least one transition metal such as V, Mn, Fe, Co, or Ni. Among such lithium complex oxides, (i) a lithium complex oxide having an α-$NaFeO_2$ structure such as lithium nickelate and lithium cobaltate and (ii) a lithium complex oxide having a spinel structure such as lithium manganese spinel are preferable because such lithium complex oxides have a high average discharge potential. The lithium complex oxide containing the at least one transition metal may further contain any of various metallic elements, and is more preferably complex lithium nickelate. Further, the complex lithium nickelate particularly preferably contains at least one metallic element selected from the group consisting of Ti, V, Cr, Mn, Fe, Co, Cu, Ag, Mg, Al, Ga, In, and Sn at a proportion of 0.1 to 20 mol % with respect to the sum of the number of moles of the at least one metallic element and the number of moles of Ni in the lithium nickelate. This is because such a complex lithium nickelate allows an excellent cycle characteristic for use in a high-capacity battery.

Examples of the conductive material include carbonaceous materials such as natural graphite, artificial graphite, cokes, carbon black, pyrolytic carbons, carbon fiber, and a fired product of an organic polymer compound. The present embodiment may use (i) only one kind of the above conductive materials or (ii) two or more kinds of the above conductive materials in combination, for example a mixture of artificial graphite and carbon black.

Examples of the binding agent include thermoplastic resins such as polyvinylidene fluoride, a copolymer of vinylidene fluoride, polytetrafluoroethylene, a tetrafluoroethylene-hexafluoropropylene copolymer, a tetrafluoroethylene-perfluoroalkyl vinyl ether copolymer, an ethylene-tetrafluoroethylene copolymer, a vinylidene fluoride-hexafluoropropylene-tetrafluoroethylene copolymer, and a thermoplastic polyimide, polyethylene, and polypropylene. The binding agent functions also as a thickening agent.

The cathode mix may be prepared by, for example, a method of applying pressure to the cathode active material, the conductive material, and the binding agent on the cathode current collector or a method of using an appropriate organic solvent so that the cathode active material, the conductive material, and the binding agent are in a paste form.

The cathode current collector is, for example, an electric conductor such as Al, Ni, and stainless steel, among which Al is preferable because Al is easily processed into a thin film and is inexpensive.

The sheet-shaped cathode may be produced, that is, the cathode mix may be supported by the cathode current collector, through, for example, a method of applying pressure to the cathode active material, the conductive material, and the binding agent on the cathode current collector to form a cathode mix thereon or a method of (i) using an appropriate organic solvent so that the cathode active material, the conductive material, and the binding agent are in a paste form to provide a cathode mix, (ii) applying the cathode mix to the cathode current collector, (iii) drying the applied cathode mix to prepare a sheet-shaped cathode mix, and (iv) applying pressure to the sheet-shaped cathode mix so that the sheet-shaped cathode mix is firmly fixed to the cathode current collector.

The anode is normally a sheet-shaped anode including (i) an anode mix containing an anode active material and (ii) an anode current collector supporting the anode mix thereon.

The anode active material is, for example, (i) a material capable of being doped and dedoped with lithium ions, (ii) a lithium metal, or (iii) a lithium alloy. Specific examples of the material include carbonaceous materials such as natural graphite, artificial graphite, cokes, carbon black, pyrolytic carbons, carbon fiber, and a fired product of an organic polymer compound; and chalcogen compounds such as an oxide and a sulfide that are doped and dedoped with lithium ions at an electric potential lower than that for the cathode. Among the above anode active materials, a carbonaceous material containing a graphite material such as natural graphite or artificial graphite as a main component is preferable because such a carbonaceous material has high electric potential flatness and low average discharge potential and can thus be combined with a cathode to achieve high energy density.

The anode mix may be prepared by, for example, a method of applying pressure to the anode active material on the anode current collector or a method of using an appropriate organic solvent so that the anode active material is in a paste form.

The anode current collector is, for example, Cu, Ni, or stainless steel, among which Cu is preferable because Cu is not easily alloyed with lithium in the case of a lithium ion secondary battery and is easily processed into a thin film.

The sheet-shaped anode may be produced, that is, the anode mix may be supported by the anode current collector, through, for example, a method of applying pressure to the anode active material on the anode current collector to form an anode mix thereon or a method of (i) using an appropriate organic solvent so that the anode active material is in a paste form to provide an anode mix, (ii) applying the anode mix to the anode current collector, (iii) drying the applied anode mix to prepare a sheet-shaped anode mix, and (iv) applying pressure to the sheet-shaped anode mix so that the sheet-shaped, anode mix is firmly fixed to the anode current collector.

The nonaqueous electrolyte secondary battery of the present invention may be produced by (i) arranging the cathode, the laminated body, and the anode in that order to form a nonaqueous electrolyte secondary battery member, (ii) inserting the nonaqueous electrolyte secondary battery member into a container for use as a housing of the nonaqueous electrolyte secondary battery, (iii) filling the container with a nonaqueous electrolyte solution, and (iv) hermetically sealing the container under reduced pressure. The nonaqueous electrolyte secondary battery may have any shape such as the shape of a thin plate (paper), a disk, a cylinder, or a prism such as a cuboid. The nonaqueous electrolyte secondary battery may be produced through any method, and may be produced through a conventionally publicly known method.

The nonaqueous electrolyte secondary battery of the present invention has a high dielectric strength, and has a low rate of defects such as a current leak.

The present invention is not limited to the description of the embodiments above, but may be altered in various ways by a skilled person within the scope of the claims. Any embodiment based on a proper combination of technical means disclosed in different embodiments is also encompassed in the technical scope of the present invention. Further, combining different technical means disclosed in different embodiments can provide a new technical feature.

The present invention may also include in its scope a laminated body arranged as below, a nonaqueous electrolyte secondary battery member arranged as below, and a nonaqueous electrolyte secondary battery arranged as below.

[1] A laminated body, including:

a porous film containing a polyolefin as a main component; and a porous layer on one or both surfaces of the porous film, the porous layer containing a resin, the laminated body satisfying $$(A) > (B),$$

where (A) represents an amount ($V \cdot m^2/g$) of an increase in a dielectric strength of the porous layer with respect to an amount of an increase in an amount ($g/m^2$) of the resin contained per unit area of the porous layer, and (B) represents an amount ($V \cdot m^2/g$) of an increase in a dielectric strength of the porous film with respect to an amount of an increase in an amount ($g/m^2$) of the polyolefin contained per unit area of the porous film.

[2] The laminated body according to [1], wherein the resin is a polyvinylidene fluoride.

[3] The laminated body according to [1], wherein the resin is an aromatic polyamide,

[4] A member for a nonaqueous electrolyte secondary battery,
the member including in sequence:
a cathode;
the laminated body according to any one of [1] to [3]; and
an anode.
[5] A nonaqueous electrolyte secondary battery, including the laminated body according to any one of [1] to [3] as a separator.

Third Embodiment: Aspect 3 of Present Invention

The description below deals with a third embodiment of the present invention. The present invention is, however, not limited to such an embodiment. Further, the present invention is not limited to the description of the arrangements below, but may be altered in various ways by a skilled person within the scope of the claims. Any embodiment or example based on a proper combination of technical means disclosed in different embodiments and examples is also encompassed in the technical scope of the present invention. All academic and patent documents cited in the present specification are incorporated herein by reference. In the present specification, any numerical range expressed as "A to B" means "not less than A and not greater than B" unless otherwise stated.

[1. Laminated Body]

A laminated body of the present invention includes a stack of (i) a first porous layer made of a polyolefin-based resin and (ii) a second porous layer For the present invention, a moisture absorption property of the laminated body is important. The inventors of the present invention discovered that (i) the moisture absorption property of the laminated body, which is included in the separator, is closely relevant to occurrence of curling of the separator and (ii) a laminated body having a moisture absorption within a certain range can prevent occurrence of the curling. Specifically, with regard to the laminated body including a stack of the first porous layer and the second porous layer, a difference between (A) a water content rate of the laminated body in an atmosphere having a dew point of 20° C. and (B) a water content rate of the laminated body in an atmosphere having a dew point of −30° C. is preferably 1000 ppm or less. Further, the difference between the water content rates (A) and (B) is preferably 800 ppm or less, more preferably 600 ppm or less, further preferably 500 ppm or less, and particularly preferably 400 ppm or less. Values of the water content rates (A) and (B) are calculated according to the method in the later-described Examples.

In a case where a difference between water content rates (A) and (B) of a laminated body is the above-described value or less, i.e., in a case where a difference between water content rates of a laminated body observed at two different dew points (20° C. and −30° C.) is a predetermined value or less, it is possible to prevent occurrence of curling of the laminated body which is used as the separator. The inventors of the present invention assume that, for a mechanism of this effect, it is important to control the amount of change in water content of the laminated body to be the predetermined value or less, because curling of the laminated body occurs if the water content of the laminated body changes in an amount greater than the predetermined value when the dew point becomes low.

Further, the difference between the water content rates (A) and (B) of the laminated body is preferably 100 ppm or more. In a case where a difference between water content rates (A) and (B) of a laminated body is 100 ppm or more, the electrolyte solution is easily permeated into the laminated body which is used as the separator. Thus, an adverse influence is hardly given to rate characteristics and/or the like.

Further, as another important moisture absorption property, a difference between (C) a water content of the first porous layer in an atmosphere having a dew point of 20° C. and (D) a water content of the second porous layer in the atmosphere is preferably 10 mg/m$^2$ or less. Furthermore, the difference between the water contents (C) and (D) is preferably 8 mg/m$^2$ or less, more preferably 7 mg/m$^2$ or less, further preferably 6 mg/m$^2$ or less, and particularly preferably 5 mg/m$^2$ or less. Values of the water contents (C) and (D) are calculated according to the method in the later-described Examples.

In a case where a difference between water contents (C) and (D) in a laminated body is the above-described value or less, it is possible to prevent occurrence of curling of the laminated body which is used as the separator. With regard to this, the inventors of the present invention assume that it is important to control the difference between the water contents of the first porous layer and the second porous layer, because curling of the laminated body occurs if the difference between the water contents of the first porous layer and the second porous layer, each included in the laminated body, is greater than the predetermined value. Here, the less water content the second porous layer has, the more preferable it is. This is because that, the less water content the second porous layer has, the less likely a side reaction occurs in the battery due to water and therefore the less likely the battery characteristics are degraded.

Further, the difference between the water contents (C) and (D) is preferably 1 mg/m$^2$ or more. In a case where a difference between water contents (C) and (D) in a laminated body is 1 mg/m$^2$ or more, the electrolyte solution is easily permeated into the laminated body which is used as the separator. Thus, an adverse influence is hardly given to rate characteristics and/or the like.

Further, for the present invention, a shape of the second porous layer, which is included in the laminated body, is important. The inventors of the present invention discovered that (i) the shape of the second porous layer of the laminated body, which constitutes the separator, is closely relevant to occurrence of curling of the separator and (ii) a second porous layer having a certain shape can prevent occurrence of the curling. Specifically, an area of opening sections, each of which is a macropore of 0.5 μm$^2$ or more, accounts for preferably 30% or less of a surface of the second porous layer (a surface of the second porous layer being not a surface onto which the first porous layer is stacked), more preferably 20% or less, further preferably 10% or less, and particularly preferably 5% or less. Further, in terms of ion permeability, such an area of the opening sections is preferably 0.001 or more, and more preferably 0.1% or more. The area of the opening sections, each of which is the macropore of 0.5 μm$^2$ or more, in the surface of the second porous layer is calculated according to a method explained in the later-described Examples. The area of the opening sections, each of which is the macropore of 0.5 μm$^2$ or more, in the surface of the second porous layer is preferably within the above-described range, because it is possible to effectively prevent occurrence of curling of a laminated body having such an arrangement.

Next, the following explains the first porous layer and the second porous layer, which are included in the laminated body of the present invention.

[1-1. First Porous Layer]

The first porous layer only needs to be made of a polyolefin-based resin, and is preferably a microporous film. Namely, the first porous layer is preferably a porous film that (i) contains a polyolefin as a main component, (ii) has inside itself pores connected to one another, and (iii) allows a gas, a liquid, or the like to pass therethrough from one surface to the other. Also, the first porous layer can be arranged such that, in a case where the battery generates heat, the first porous layer is melted so as to make the laminated body (i.e., the separator) non-porous. Thus, the first porous layer can impart to the laminated body a shutdown function. The first porous layer can be made of a single layer or a plurality of layers.

It is essential that the first porous layer contains a polyolefin component at a proportion of 50% or more by volume with respect to whole components contained in the first porous layer. Such a proportion of the polyolefin component is preferably 90% or more by volume, and more preferably 95% or more by volume. The first porous layer preferably contains, as the polyolefin component, a high molecular weight component having a weight-average molecular weight of $5 \times 10^5$ to $15 \times 10^6$. The first porous layer particularly preferably contains, as the polyolefin component, a polyolefin component having a weight-average molecular weight of 1,000,000 or more. This is because that (i) a first porous layer containing such a polyolefin component and (ii) the whole of a laminated body including such a first porous layer achieve higher strength.

Examples of the polyolefin include high molecular weight homopolymers or copolymers produced through polymerization of ethylene, propylene, 1-butene, 4-methyl-1-pentene, 1-hexene, and/or the like. The first porous layer can be a layer containing only one of these polyolefins and/or a layer containing two or more of these polyolefins. Among these, a high molecular weight polyethylene containing ethylene as a main component is particularly preferable. Note that the first porous layer can contain other component which is not a polyolefin, as long as the other component does not impair the function of the first porous layer.

The first porous layer has inside itself pores connected to one another and allows a gas, a liquid, an ion or the like to pass therethrough from one surface to the other. A transmittance thereof is normally indicated as an air permeability. The first porous layer has an air permeability normally in a range of 30 to 1000 sec/100 cc, and preferably in a range of 50 to 800 sec/100 cc, in terms of Gurley values. A first porous layer having an air permeability within such a range achieves sufficient ion permeability in a case where the first porous layer is used in the separator.

The first porous layer has a porosity of preferably 20 to 80% by volume, and more preferably 30 to 70% by volume, in order to allow the separator to (i) retain a larger amount of electrolyte solution and (ii) achieve the shutdown function reliably. A first porous layer having a porosity of less than 20% by volume may decrease an amount of electrolyte solution retained by the separator. Meanwhile, a first porous layer having a porosity of more than 80% by volume may lead to an insufficient effect of making the laminated body non-porous, even at a high temperature at which shutdown should be performed. Namely, such a first porous layer may make it impossible to prevent a current even in a case where the battery generates a high heat.

The first porous layer has a pore size of preferably 3 μm or less, and more preferably 1 μm or less. This is because that, in a case where the separator of the present invention including such a first porous layer is included in the battery, it is possible to achieve sufficient ion permeability and to prevent particles from entering the cathode, the anode, or the like.

A thickness of the first porous layer is selected as appropriate in view of the number of layers in the laminated body. Particularly in a case where the first porous layer is used as a base material and the second porous layer is formed on one surface (or both surfaces) of the first porous layer, the first porous layer has a thickness of preferably 4 to 40 μm, and more preferably a thickness of 5 to 30 μm. A first porous layer having a thickness of less than 4 μm may have an insufficient strength. Meanwhile, a first porous layer having a thickness more than 40 μm may lead to a small battery capacity due to its too large thickness.

The first porous layer has a weight per unit area of normally 4 to 15 $g/m^2$, in and preferably 5 to 12 $g/m^2$. This is because that a first porous layer having such a weight is possible to provide suitable strength, thickness, handling easiness, and weight of the laminated body and is also possible to enhance a weight energy density and/or a volume energy density in a case where the first porous layer is used in the separator of the battery.

Suitable examples of such a first porous layer include a porous polyolefin layer disclosed in Japanese Patent Application Publication, Tokukai, No. 2013-14017 A, a polyolefin porous film disclosed in Japanese Patent Application Publication, Tokukai, No. 2012-54229 A, and a polyolefin base material porous film disclosed in Japanese Patent Application Publication, Tokukai, No. 2014-040580 A.

The first porous layer may be produced through any publicly-known technique, and is not particularly limited to any specific method. For example, as disclosed in Japanese Patent Application Publication, Tokukaihei, No. 7-29563 A (1995), the first porous layer may be produced through a method of (i) adding a plasticizing agent to a thermoplastic resin to shape the thermoplastic resin into a film and then (ii) removing the plasticizing agent with use of an appropriate solvent.

Specifically, in a case of, for example, producing a first porous layer with use of a polyolefin resin containing (i) an ultra high molecular weight polyethylene and (ii) a low molecular weight polyolefin having a weight-average molecular weight of 10,000 or less, such a first porous layer is, in terms of production cost, preferably produced through the method including the steps of:

(a) kneading (i) 100 parts by weight of the ultra high molecular weight polyethylene, (ii) 5 to 200 parts by weight of the low molecular weight polyolefin having a weight-average molecular weight of 10,000 or less, and (iii) 100 to 400 parts by weight of an inorganic filler of calcium carbonate or the like to produce a polyolefin resin composition, (b) shaping the polyolefin resin composition into a sheet, (c) removing the inorganic filler from the sheet produced in the step (b), and (d) drawing the sheet produced in the step (c) to produce a first porous layer.

Alternatively, the first porous layer may be produced through any of the methods explained in the above-described Patent Literatures.

The first porous layer may alternatively be a commercially available product having the above physical properties.

Adjustment of the water content rate of the first porous layer can be made by selecting a raw material of the first porous layer. Alternatively, such adjustment can be made by performing a hydrophilization treatment on the first porous layer. Performing the hydrophilization treatment so that the first porous layer attains a desired water content rate to yield the laminated body of the present invention. Examples of the hydrophilization treatment include (i) a chemical treatment involving an acid, an alkali, or the like, (ii) a corona treatment, and (iii) a plasma treatment.

[1-2. Second Porous Layer]

The second porous layer only needs to exhibit the above-described moisture absorption property, and is not particularly limited in terms of its specific arrangement. The second porous layer can be a layer (i) having inside itself pores connected to one another and (ii) allowing a gas, a liquid, or the like to pass therethrough from one surface to the other. Further, the second porous layer may be a layer which (i) is provided on one surface of the first porous layer as an outermost layer of the laminated body and (ii) can be adhered to the electrode in a case where the second porous layer is used in the separator.

The second porous layer may include a plurality of layers. For example, the second porous layer can include at least one of a heat-resistant layer and a functional layer. In a case of a second porous layer including the heat-resistant layer and the functional layer, the heat-resistant layer may be disposed between the first porous layer and the functional layer (namely, a laminated body including the first porous layer, the heat-resistant layer, and the functional layer which are stacked in this order is obtained). A laminated body according to another aspect of the present invention may include the first porous layer, the functional layer, and the heat-resistant layer which are stacked in this order. A laminated body according to further another aspect of the present invention may include the functional layer and the heat-resistant layer by which the first porous layer is sandwiched (namely, the heat-resistant layer, the first porous layer, and the functional layer are stacked in this order). However, in order to attain the separator having a small thickness, the second porous layer preferably includes the functional layer only. Such an arrangement contributes to a higher capacity of the battery.

The following description deals with the functional layer and the heat-resistant layer.

Adjustment of the water content rate of the second porous layer can be made by selecting a raw material of the second porous layer. Alternatively, such adjustment can be made by performing a hydrophilization treatment on the second porous layer. Performing the hydrophilization treatment so that the second porous layer attains a desired water content rate to yield the laminated body of the present invention. Examples of the hydrophilization treatment include (i) a chemical treatment involving an acid, an alkali, or the like, (ii) a corona treatment, and (iii) a plasma treatment.

<Functional Layer>

The functional layer included in the second porous layer only needs to exhibit the above-described moisture absorption property, and is not particularly limited in terms of its specific arrangement. For example, the functional layer is preferably made of a resin having a structure in which skeletons each having a diameter of 1 μm or less are bonded to each other in a three-dimensional network. For example, such a resin is preferably the one containing a polyvinylidene fluoride-based resin (hereinafter, such a resin may also be simply referred to as "PVDF-based resin").

Examples of the PVDF-based resin include homopolymers of vinylidene fluoride (i.e., polyvinylidene fluoride); copolymers (e.g., polyvinylidene fluoride copolymer) of vinylidene fluoride and other monomer(s) polymerizable with vinylidene fluoride; and mixtures of these polymers. Examples of the monomer polymerizable with vinylidene fluoride include hexafluoropropylene, tetrafluoroethylene, trifluoroethylene, trichloroethylene, and vinyl fluoride. The present invention, can use (i) one kind of monomer or (ii) two or more kinds of monomers selected from above. The PVDF-based resin can be synthesized through emulsion polymerization or suspension polymerization.

The PVDF-based resin preferably contains vinylidene fluoride at a proportion of 95 mol % or more (more preferably, 98 mol % or more). A PVDF-based resin containing vinylidene fluoride at a proportion of 95 mol % or more is more likely to allow the second porous layer to achieve a mechanical strength and a heat resistance against a pressure or heat occurred in battery production.

A functional layer according to another preferable aspect contains two kinds of PVDF-based resins (a first resin and a second resin below) that are different from each other in a content of hexafluoropropylene.

The first resin is (i) a vinylidene fluoride-hexafluoropropylene copolymer containing hexafluoropropylene at a proportion of more than 0 mol % and 1.5 mol % or less or (ii) a vinylidene fluoride homopolymer (containing hexafluoropropylene at a proportion of 0 mol %).

The second resin, is a vinylidene fluoride-hexafluoropropylene copolymer containing hexafluoropropylene at a proportion of more than 1.5 mol %.

The functional layer containing the two kinds of PVDF-based resins is adhered to the electrode more favorably, as compared with a functional layer not containing one of the two kinds of PVDF-based resins. Further, the functional layer containing the two kinds of PVDF-based resins has improved adhesiveness to the first porous layer and is separated from the first porous layer more favorably, as compared with a functional layer not containing one of the two kinds of PVDF-based resins. The first resin and the second resin are preferably mixed at a mixing ratio (mass ratio, first resin:second resin) of 15:85 to 85:15.

The PVDF-based resin has a weight-average molecular weight of preferably 300,000 to 3,000,000. A PVDF-based resin having a weight-average molecular weight of 300,000 or more allows the second porous layer to attain a mechanical property with which the second porous layer can endure a process for adhering the second porous layer to the electrode, thereby allowing the second porous layer and the electrode to adhere to each other sufficiently. Meanwhile, a PVDF-based resin having a weight-average molecular weight of 3,000,000 or less does not cause the coating solution, which is to be applied in order to shape the second porous layer, to have a too high viscosity, which allows the coating solution to have excellent shaping easiness. The weight-average molecular weight of the PVDF-based resin is more preferably 300,000 to 2,000,000, and further preferably 500,000 to 1,500,000.

The PVDF-based resin has a fibril diameter of preferably 10 nm to 1000 nm, in terms of the cycle characteristic.

The functional layer may contain other resin which is not the PVDF-based resin. Examples of the other resin include styrene-butadiene copolymer; homopolymers or copolymers of vinyl nitriles such as acrylonitrile and methacrylonitrile; and polyethers such as polyethylene oxide and polypropylene oxide.

Further, the functional layer may contain a filler made of inorganic matter or organic matter. A functional layer containing the filler can improve slidability and/or heat resistance of the separator. The filler may be an organic filler or an inorganic filler each of which is stable in a nonaqueous electrolyte solution and is electrochemically stable.

Examples of the organic filler include crosslinked high molecule fine particles such as crosslinked polyacrylic acid, crosslinked polyacrylic acid ester, crosslinked polymethacrylic acid, crosslinked polymethacrylic acid ester, crosslinked polymethyl methacrylate, crosslinked polysilicone, crosslinked polystyrene, crosslinked polydivinyl benzene, a crosslinked product of a styrene-divinylbenzene copolymer, polyimide, a melamine resin, a phenol resin, a benzoguanamine-formaldehyde condensate; and heat-resistant high molecule fine particles such as polysulfone, polyacrylonitrile, polyaramid, polyacetal, and thermoplastic polyimide.

A resin (high molecule) contained in the organic filler may be a mixture, a modified product, a derivative, a copolymer (a random copolymer, an alternating copolymer, a block copolymer, or a graft copolymer), or a crosslinked product of any of the molecules listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia; carbonates such as calcium carbonate and magnesium carbonate; sulfates such as barium sulfate and calcium sulfate; clay minerals such as calcium silicate and talc. Among these, the inorganic filler is preferably a metal hydroxide, in terms of achievement of fire retardance and/or electricity removal effects.

The present invention may use (i) only one of filler or (ii) two or more of fillers in combination.

The filler has a volume average particle size of preferably 0.01 µm to 10 µm, in order to ensure (i) fine adhesion and fine slidability and (ii) shaping easiness of the separator. A lower limit of the volume average particle size is more preferably 0.1 µm or more, whereas an upper limit of the volume average particle size is more preferably 5 µm or less.

The filler is constituted by particles of any shape, which may be a sphere, an ellipse, a plate-shape, a bar-shape, or an irregular shape. In order to prevent a short circuit in the battery, the particles are preferably (i) bar-shaped particles or (ii) primary particles which are not aggregated.

The filler forms fine bumps on a surface of the functional layer, thereby improving the slidability. A filler constituted by (i) plate-shaped particles or (ii) primary particles which are not aggregated forms finer bumps on the surface of the functional layer, so that the functional layer is adhered to the electrode more favorably.

The functional layer contains the filler at a proportion of preferably 1% by mass to 30% by mass with respect to a total amount of the PVDF-based resin and the filler. A functional layer containing the filler at a proportion of 1% or more by mass is likely to exhibit the effect of forming fine bumps on the surface of the functional layer so as to improve the slidability of the separator. From this viewpoint, the functional layer contains the filler more preferably at a proportion of 3% or more by mass. Meanwhile, a functional layer containing the filler at a proportion of 30% or less by mass allows each of the functional layer and the separator to maintain mechanical strength. With this arrangement, for example, during a process for producing an electrode body by rolling up a stack of the electrode and the separator, the separator is hardly cracked and/or the like. From this viewpoint, the functional layer contains the filler at a proportion of more preferably 20% or less by mass, and further preferably 10% or less by mass.

In order to prevent, in a process of slitting the separator, a slitted surface of the separator from becoming fibrous, bending, and/or permitting intrusion of scraps occurred as a result of the slitting, the functional layer contains the filler at a proportion of preferably 1% or more by mass, and more preferably 3% or more by mass, with respect to a total amount of the PVDF-based resin and the filler.

In order to ensure adhesion to the electrode and a high energy density, the functional layer has, on one surface of the first porous layer, an average thickness of preferably 0.5 µm to 10 µm, and more preferably 1 µm to 5 µm.

The functional layer is preferably made porous sufficiently, in terms of ion permeability. Specifically, the functional layer has a porosity of preferably 30% to 60%. The functional layer has an average pore size of 20 nm to 100 nm.

The functional layer has a surface roughness, in terms of a ten-point average roughness (Rz), of preferably 0.8 µm to 8.0 µm, more preferably 0.9 µm to 6.0 µm, and further preferably 1.0 µm to 3.0 µm. The ten-point average roughness (Rz) is a value measured by a method according to JIS B 0601-1994 (or Rzjis of JIS B 0601-2001). Specifically, "Rz" is a value measured by ET4000 (available from Kosaka Laboratory Ltd.) with a measurement length of 1.25 mm, a measurement rate of 0.1 mm/sec, and a temperature and humidity of 25° C./50% RH.

The functional layer has a coefficient of kinetic friction of preferably 0.1 to 0.6, more preferably 0.1 to 0.4, and further preferably 0.1 to 0.3. The coefficient of kinetic friction is a value measured by a method according to JIS K7125. Specifically, a coefficient of kinetic friction in the present invention is a value measured by Surface Property Tester (available from Heidon).

An applied amount of the functional layer is, on one surface of the first porous layer, preferably 0.5 g/m$^2$ to 1.5 g/m$^2$ in terms of adhesion to the electrode and ion permeability.

Further, the functional layer, which is included in the second porous layer, may contain fine resin particles. The fine resin particles are preferably made of a resin or a PVDF-based resin each having a structure unit derived from α-olefin having 2 to 4 carbon atoms. Further, such a functional layer may contain a binder resin in addition to the fine resin particles. The binder resin is preferably a polymer (i.e., a binder resin) that (i) has a nature of causing the fine resin, particles to be bound to each other, (ii) is insoluble in the electrolyte solution of the battery, and (iii) is electrochemically stable while the battery is in use. The binder resin may be a water-soluble polymer or a water-insoluble polymer.

Examples of the binder resin include: polyolefins such as polyethylene and polypropylene; fluorine-containing resins such as polyvinylidene fluoride and polytetrafluoroethylene; fluorine-containing rubbers such as vinylidene fluoride-hexafluoropropylene-tetrafluoroethylene copolymer and ethylene-tetrafluoroethylene copolymer); rubbers such as styrene-butadiene copolymer and a hydride thereof, methacrylic acid ester copolymer, acrylonitrile-acrylic acid ester copolymer, styrene-acrylic acid ester copolymer, ethylene propylene rubber, and polyvinyl acetate; resins with a melting point or a glass transition temperature of 180° C. or higher, such as polyphenylene ether, polysulfone, polyether sulfone, polyphenylene sulfide, polyetherimide, polyamide, polyimide, polyamide imide, polyetheramide, and polyester; and polymers such as polyvinyl alcohol, polyethyleneglycol, cellulose ethers, sodium alginate, polyacrylic acid, polyacrylamide, and polymethacrylic acid. The present invention may use (i) only one kind of binder resin or (ii) a mixture of two or more of binder resins selected from the above. Examples of the cellulose ether include carboxymethyl cellulose (CMC), hydroxyethyl cellulose (HEC), carboxy ethyl cellulose, methyl cellulose, ethyl cellulose, cyan ethyl cellulose, and oxyethyl cellulose.

A functional layer according to another aspect may be a fine particle aggregate layer containing a resin or a PVDF-based resin each having a structure unit derived from α-olefin having 2 to 4 carbon atoms. Such a functional layer further contains a filler containing at least one of an organic compound and an inorganic compound. In the first embodiment, a content of the filler in the functional layer is 20% by mass to 80% by mass with respect to a total mass of the fine particles and the filler. Meanwhile, in the second embodiment, a content of the filler in the functional layer is 15%, by volume to 90% by volume with respect to a total volume of the fine particles and the filler. Further, a content of the fine particles in a single functional layer is 0.1 g/m$^2$ to 6.0 g/m$^2$. The filler may be suitably selected from the above-exemplified ones.

The functional layer arranged above allows the separator to excel in ion permeability and handling easiness, and makes it possible to attain favorable adhesion between the electrode and the separator after the electrode and the separator are bonded to each other through hot pressing.

The functional layer may be a fine particle aggregate layer containing an aggregate of the fine particles. Here, examples of the "fine particle aggregate layer" include the following arrangements (I) and (II).

In the arrangement (I), (a) the fine particles are fixed onto the first porous layer by the primary particles or (b) the fine particles and/or the filler are fixed onto the first porous layer as an aggregate (secondary particles).

In the arrangement (ii), a layer made of (a) a plurality of adjacent fine particles being integrally bonded to each other or (b) the fine particles and the filler being integrally bonded to each other is fixed onto a surface of the first porous layer via at least part of the fine particles in the layer, so that the whole of the layer is fixed onto (integrated into) the first porous layer.

The fine particles constituting the aggregate may be confirmed by observation of a surface of the separator (a surface of the functional layer) with a scanning electron microscope (SEM).

A structure of the functional layer is not particularly limited, as long as the functional layer has sufficient ion permeability. In terms of the ion permeability, the functional layer is preferably made porous. The functional layer which has been made porous is also referred as an adhesive porous layer.

The fine particles preferably retain a particle shape in the functional layer.

The expression "retaining a particulate shape" refers to, for example, a state where particle interfaces of the fine particles are identifiable in a case where the nonaqueous secondary battery separator of the present invention is observed with the scanning electron microscope.

The fine particles have an average particle size of preferably 0.01 μm to 1 μm, more preferably 0.02 μm to 1 μm, and particularly preferably 0.05 μm to 1 μm.

Fine particles having an average particle size of 0.01 μm or more allow the nonaqueous secondary battery separator to excel in slidability and handling easiness. Meanwhile, fine particles having an average particle size of 1 μm or less make it easier to provide a functional layer having a uniformly small thickness.

A mass of the fine particles in a single functional layer is 0.1 g/m$^2$ to 6.0 g/m$^2$. Preferably, the mass of the fine particles in a single functional layer is in a range from 1.0 g/m$^2$ to 3.0 g/m$^2$.

In a case where the mass of the fine particles in a single functional layer is 0.1 g/m$^2$ or more, adhesion between the separator and the electrode is enhanced. Meanwhile, in a case where the mass of the fine particles in a single functional layer is 6.0 g/m$^2$ or less, the separator allows an ion to pass therethrough more easily and the load characteristic of the battery is improved.

The functional layer is bonded to the electrode through pressure bonding or hot pressing per formed in a state where the functional layer contains the electrolyte solution.

The fine resin particles are preferably made of a resin having a structure unit derived from α-olefin having 2 to 4 carbon atoms. For example, the fine resin particles are preferably made of a copolymer of ethylene and vinyl acetate.

The fine particles has an average particle size of 0.01 μm to 1 μm, more preferably 0.02 μm to 1 μm, and particularly preferably 0.05 μm to 1 μm.

Examples of α-olefin having 2 to 4 carbon atoms include ethylene, propylene, and 1-butene. Such α-olefin is preferably ethylene. The resin having a structure unit derived from α-olefin having 2 to 4 carbon atoms may be a copolymer of (i) any of the α-olefins having 2 to 4 carbon atoms and (ii) other monomer. Examples of the other monomer include fatty acid vinyl such as vinyl acetate, propionate vinyl, butyric acid vinyl, lauric acid vinyl, caproic acid vinyl, stearic acid vinyl, palmitic acid vinyl, and versatic acid vinyl; acrylic acid ester having an alkyl group having 1 to 16 carbon atoms such as methyl acrylate, ethyl acrylate, propyl acrylate, butyl acrylate, hexyl acrylate, octyl acrylate, and lauryl acrylate; methacrylic acid ester having an alkyl group having 1 to 16 carbon atoms such as ethyl methacrylate, propyl methacrylate, buty methacrylate, hexyl methacrylate, octyl methacrylate, and lauryl methacrylate; an acidic group-containing vinyl monomer such as acrylic acid, methacrylic acid, 2-acryloyloxyethyl succinate, 2-methacryloyloxyethyl succinate, carboxy ethyl acrylate, and carboxy ethyl methacrylate; an aromatic vinyl monomer such as styrene, benzyl acrylate, and benzyl methacrylate; diene such as 1,3-butadiene and isoprene; and acrylonitrile. Among these, the other monomer is preferably fatty acid vinyl, acrylic acid ester, or methacrylic acid ester, and more preferably vinyl acetate or ethyl acrylate.

The resin having a structure unit derived from α-olefin having 2 to 4 carbon atoms is preferably a resin having (i) a structure unit derived from α-olefin having 2 to 4 carbon atoms and (ii) a structure unit derived from the other monomer. Such a resin is more preferably a resin having (i) a structure unit derived from at least one selected from a group consisting of fatty acid vinyl, acrylic acid ester, and methacrylic acid ester and (ii) a structure unit derived from α-olefin having 2 to 4 carbon atoms.

<Heat-Resistant Layer>

The heat-resistant layer is not particularly limited in configuration except that the heat-resistant layer only needs to contain a heat resistance material so as to be heat resistant at high temperatures at which a shutdown occurs. Preferably, the heat-resistant layer is also a layer (i) having inside itself pores connected to one another and (ii) allowing a gas, a liquid, or the like to pass therethrough from one surface to the other.

In a case where the second porous layer includes the heat-resistant layer, the second porous layer can have shape stability even at high temperatures. Note that in the present specification, a heat resistance material is defined as a material that does not melt or pyrolize at temperatures at which the first porous layer melts (for example, approximately 130° C. in a case where the first porous layer is made of polyethylene).

Examples of the heat resistance material include a heat-resistant resin and a heat-resistant resin composition which includes a filler.

Examples of the heat-resistant resin include polyamide, polyimide, polyamide imide, polycarbonate, polyacetal, polysulfone, polyphenylene sulfide, polyether ether ketone, aromatic polyester, polyether sulfone, polyetherimide, cellulose ethers. The present invention may use (i) only one kind of heat-resistant resin or (ii) mixture of two or more kinds of heat-resistant resins selected from the above.

Among the above heat-resistant resins, in order to further increase heat resistance, (i) polyamide, polyimide, polyamide imide, polyether sulfone, and polyetherimide are preferable, (ii) polyamide, polyimide, and polyamide imide are more preferable, (iii) nitrogen-containing aromatic polymers such as aromatic polyamide (para-oriented aromatic polyamide, meta-oriented aromatic polyamide), aromatic polyimide, and aromatic polyamide imide are even more preferable, and (iv) aromatic polyamides are further preferable. From the viewpoint of heat resistance, para-oriented aromatic polyamide (hereinafter referred to also as "para-aramid") is particularly preferable.

Para-aramid is obtained by condensation polymerization of para-oriented aromatic diamine and para-oriented aromatic dicarboxylic acid halide, and substantially includes repeating units in which amide bonds are bonded at para positions or corresponding oriented positions (for example, oriented positions that extend coaxially or parallel in opposite directions such as the cases of 4,4'-biphenylene, 1,5-naphthalene, and 2,6-naphthalene) of aromatic rings. Examples of the para-aramid include para-aramids each having a para-oriented structure or a structure corresponding to a para-oriented structure, such as poly(paraphenylene terephthalamide), poly(parabenzamide), poly(4,4'-benzanilide terephthalamide), poly(paraphenylene-4,4'-biphenylene dicarboxylic acid amide), poly(paraphenylene-2,6-naphthalene dicarboxylic acid amide), poly(2-chloro-paraphenylene terephthalamide), and paraphenylene terephthalamide/2,6-dichloroparaphenylene terephthalamide copolymer.

The aromatic polyimide is preferably fully aromatic polyimide produced through condensation polymerization of an aromatic diacid anhydride and a diamine. Examples of the diacid anhydride include pyromellitic dianhydride, 3,3',4,4'-diphenyl sulfone tetracarboxylic dianhydride, 3,3',4,4'-benzophenone tetracarboxylic dianhydride, 2,2'-bis(3,4-dicarboxyphenyl)hexafluoropropane, and 3,3'4,4'-biphenyl tetracarboxylic dianhydride. Examples of the diamine include oxydianiline, paraphenylenediamine, benzophenone diamine, 3,3'-methylenedianiline, 3,3'-diaminobenzophenone, 3,3'-diaminodiphenyl sulfone, and 1,5'-naphthalene diamine.

The aromatic polyamide imide is, for example, produced through condensation polymerization of (i) aromatic dicarboxylic acid and aromatic diisocyanate or (ii) aromatic diacid anhydride and aromatic diisocyanate. Examples of the aromatic dicarboxylic acid include isophthalic acid and terephthalic acid. Examples of the aromatic diacid anhydride include trimellitic anhydride. Examples of the aromatic diisocyanate include 4,4'-diphenylmethane diisocyanate, 2,4-tolylene diisocyanate, 2,6-tolylene diisocyanate, ortho tolylene diisocyanate, and m-xylene diisocyanate.

Examples of the cellulose ether include carboxymethyl cellulose (CMC), hydroxyethyl cellulose (HEC), carboxy ethyl cellulose, methyl cellulose, ethyl cellulose, cyan ethyl cellulose, and oxyethyl cellulose.

Among these, CMC and HEC, which have excellent chemical and thermal stability, are preferable, and CMC is more preferable.

The filler may be an organic filler or an inorganic filler. Examples of the organic filler include fine particles made of: (i) a homopolymer of a monomer such as styrene, vinyl ketone, acrylonitrile, methyl methacrylate, ethyl methacrylate, glycidyl methacrylate, glycidyl acrylate, or methyl acrylate, or (ii) a copolymer of two or more of such monomers; fluorine-based resins such as polytetrafluoroethylene, ethylene tetrafluoride-propylene hexafluoride copolymer, tetrafluoroethylene-ethylene copolymer, and polyvinylidene fluoride (polyvinylidene fluoride-based resin); melamine resin; urea resin; polyethylene; polypropylene; or polymethacrylate.

Examples of the inorganic filler includes fine particles made of calcium carbonate, talc, clay, kaolin, silica, hydrotalcite, diatomaceous earth, magnesium carbonate, barium carbonate, sulfuric acid calcium, magnesium sulfate, barium sulfate, aluminum hydroxide, magnesium hydroxide, calcium oxide, magnesium oxide, titanium oxide, alumina (for example, α-alumina), mica, zeolite, or glass.

Alternatively, it is possible to use a material, such as a hydrate of the filler, which is similar to the filler. The present invention may use (i) only one kind of filler or (ii) a mixture of two or more of fillers selected from the above.

Among these fillers, in order to further increase chemical stability and high temperature shape stability, the filler is preferably made of an inorganic oxide, and more preferably made of α-alumina.

Note that the filler is preferably a filler having a sufficient amount of pores to ensure ion permeability in the second porous layer.

Of a total 100% by weight of the heat-resistant resin and the filler, a weight proportion of the filler is 20 to 99% by weight, but is preferably 30 to 99% by weight, more preferably 40 to 99% by weight, even more preferably 50 to 99% by weight, and still more preferably 60 to 99% by weight. In a case where the weight proportion of the filler falls within such a certain range, it is possible to obtain a second porous layer having an excellent balance between ion permeability and improbability of powder falling. Note that powder falling is a phenomenon in which a filler is peeled off of a deposited porous film.

The heat-resistant layer can contain a component other than a heat resistance material, provided that the function of the heat-resistant layer is not impaired. Examples of such a component include a dispersing agent, a plasticizing agent, and a pH adjusting agent.

A thickness of the heat-resistant layer is 1 to 25 μm or less, but is preferably in a range of 5 to 20 μm or less. If the thickness of the heat-resistant layer is 1 μm or more, then thermal shrinkage of the first porous layer, which occurs when heat is generated in the battery by an accident or the like, can be prevented. This avoids the contraction of the separator. Meanwhile, if the thickness of the heat-resistant layer is 25 μm or less, then the second porous layer is not excessively thick. This avoids a risk of causing a capacity of the battery to be small.

[2. Separator Including Laminated Body]

The laminated body of the present invention can be used as a separator (for example, nonaqueous secondary battery separator). Such a separator preferably has an overall thickness of 5 μm to 35 μm, more preferably 10 μm to 20 μm, from the viewpoint of (i) mechanical strength and (ii) energy density in a case where the separator is included in a battery.

A porosity of the separator is preferably 30% to 60% from the viewpoints of (i) adhesion to electrode, (ii) handling easiness, (iii) mechanical strength, and (iv) ion permeability.

A Gurley value (JIS P8117) of the separator is preferably in a range of 50 seconds/100 cc to 800 seconds/100 cc since a balance between mechanical strength and film resistance is good in such a range. From the viewpoint of ion permeability, a difference between a Gurley value of a first porous layer and a Gurley value of the separator, in which a second porous layer is provide on the first porous layer, is preferably not more than 300 seconds/100 cc, more preferably not more than 150 seconds/100 cc, and even more preferably not more than 100 seconds/100 cc.

A tortuosity ratio of the separator is preferably 1.5 to 2.5 from the viewpoint of ion permeability.

From the viewpoint of load characteristics of the battery, the film resistance of the separator is preferably 1 ohm·cm$^2$ to 10 ohm·cm$^2$. The film resistance as defined herein is a resistance value in a case where the separator is impregnated with an electrolyte solution, and is measured through an alternating current method. While the above numerical value varies naturally depending on a kind of electrolyte solution and on temperature, the above numerical value defined herein is a numerical value measured at 20° C. with use of 1M LiBF$_4$-propylene carbonate/ethylene carbonate (mass ratio: 1/1) as an electrolyte solution.

A thermal shrinkage rate of the separator at 105° C. in each of an MD direction and a TD direction is preferably 10% or less. In a case where the thermal shrinkage rate falls within this range, shape stability and a shutdown characteristic of the separator are balanced. The thermal shrinkage rate is more preferably 5% or less.

[3. Method for Producing Separator]

A method for producing the laminated body of the present invention is not limited to any particular one, but may be selected from various methods, provided that the separator can be obtained.

For example, in a case where the functional layer of the second porous layer is made of PVDF-based resin, the separator can be produced through a method in which a second porous layer is integrally formed on a first porous layer by (i) forming a coating layer by applying a coating solution, which contains a PVDF-based resin, to the first porous layer (base material) and then (ii) curing the PVDF-based resin in the coating layer.

A second porous layer containing a PVDF-based resin may be formed through, for example, the wet coating method below. First, a PVDF-based resin is dissolved in a solvent, and as necessary, a filler is dispersed in the solution to prepare a coating solution. This coating solution is applied to a first porous layer, and then the first porous layer with the coating solution applied is immersed in an appropriate setting liquid to induce phase separation and cure the PVDF-based resin. Performing these steps forms, on the first porous layer, a layer containing a PVDF-based resin and having a porous structure. This layer is then washed with water and dried to remove the setting liquid from the layer having a porous structure.

A specific example is the following method:
(Method 1)
(a) Prepare a solution in which a PVDF-based resin is dissolved in a solvent.
(b) Apply the solution to a first porous layer to form a coating film.
(c) Perform an operation such as immersing, into a solvent that does not dissolve the PVDF-based resin, the wet coating film to separate the PVDF-based resin out of the coating film.
(d) As necessary, immerse the wet coating film, in which the PVDF-based resin has been separated, again into a solvent that does not dissolve the PVDF-based resin and wash the coating film.
(e) Dry the wet coating film, in which the PVDF-based resin has been separated.
(Method 2)
(a) Prepare a coating film in which a PVDF-based resin is dispersed in an aqueous solution which is obtained by, as needed, dissolving a binder resin in water. In so doing, the PVDF-based resin can be fine particles.
(b) Apply the solution to the first porous layer to form a coating film.
(c) Dry the coating film to remove water.

A second porous layer produced through such a method normally has a structure in which skeletons each having a diameter of 1 μm or less are bonded to each other in a three-dimensional network. Whether or not the second porous layer has a structure in which skeletons each having a diameter of 1 μm or less are bonded to each other in a three-dimensional network can be examined by observing a surface of the second porous layer with the use of a scanning electron microscope.

The description below deals in detail with a wet coating method suitable for the present invention.

Suitable examples of the solvent (hereinafter referred to also as "good solvent") for use in the preparation of the coating solution which solvent dissolves a PVDF-based resin include polar amide solvents such as N-methyl-2-pyrrolidone (NMP), dimethylacetamide, dimethylformamide, and dimethylformamide.

To form a good porous structure, the good solvent is preferably mixed with a phase separating agent for inducing phase separation. Examples of the phase separating agent include water, methanol, ethanol, propyl alcohol, and butyl alcohol. Note, however, that a hydrophilic phase separating agent, such as tripropylene glycol and ethylene glycol, which has a boiling point of more than 150° C., is preferably not mixed with the good solvent. A first porous layer made of polyolefin resin is melted and deformed at 80° C. to 150° C. Therefore, the laminated body of the present invention cannot be dried at temperatures higher than 150° C. This tends to cause a hydrophilic phase separating agent having a boiling point of higher than 150° C. to remain in a laminated body, so that a water content rate of the laminated body in an atmosphere having a dew point of 20° C. tends to be increased. The phase separating agent is preferably added in an amount that achieves viscosity suitable for the coating.

To form a good porous structure, the solvent is preferably a mixed solvent containing (i) 60% or more by mass of a good solvent and (ii) 5% by mass to 40% by mass of a phase separating agent. To form a good porous structure, the coating solution preferably contains a PVDF-based resin at a concentration of 3% by mass to 10% by mass.

To impart slidability to the second porous layer and form a good porous structure, the coating solution contains a filler at a proportion of preferably 1% by mass to 30% by mass, more preferably 3% by mass to 28% by mass, with respect to the total amount of the PVDF-based resin and the filler.

The setting liquid (solvent that does not dissolve a PVDF-based resin) typically includes (i) a good solvent and phase separating agent for use in the preparation of the coating solution and (ii) water. It is general practice that the good solvent and the phase separating agent is mixed at a ratio equal to that of the mixed solvent for use in the dissolution of the PVDF-based resin. For good formation of a porous structure and productivity, the water concentration is preferably 40% by mass to 90% by mass. For the reason similar to that in the case of the good solvent, a hydrophilic phase separating agent having a boiling point of higher than 150° C. is also not contained in the setting liquid.

The coating solution may be applied to the first porous layer through a conventional coating method, for example, with use of a Meyer bar, a die coater, a reverse roll coater, or a gravure coater.

The second porous layer may alternatively be produced through a dry coating method instead of a wet coating method described above. The dry coating method is a method of (i) applying to a second porous layer a coating solution containing a PVDF-based resin, a filler, and a solvent and then (ii) drying the coating layer for removal of the solvent through volatilization to produce a porous layer. The dry coating method, however, (i) likely produces a closely packed coating layer as compared to the wet coating method and (ii) likely causes the good solvent in the coating solution to remain in the second porous material. Thus, to form a good porous structure, the wet coating method is preferable.

In the dry coating method, a mixed solvent, in which a good solvent is mixed with a poor solvent having a boiling point higher than that of the good solvent, may be used as a solvent that dissolves a PVDF-based resin to form a porous structure. From the viewpoint of prevention of a curl of a laminated body, however, such a mixed solvent is not preferable. In a case where such a mixed solvent is used, a good solvent evaporates first, and then a poor solvent remains. This causes pores to be formed in a porous layer. That is, parts of the poor solvent, on which parts the poor solvent was present before the evaporation, become pores. In a case where a second porous layer is formed through such a method, pores tend to be large in size. Specifically, an area of opening sections, each of which is a macropore of 0.5 μm$^2$ or more, tends to account for more than 30% of a surface of the second porous layer.

In a case where (i) the pores are large in size and (ii) the area of opening sections, each of which is a macropore of 0.5 μm$^2$ or more, accounts for more than 30% of the surface of the second porous layer, pores of the second porous layer, which pores are located on an interface between the first porous layer and the second porous layer, also become large in size. This causes an adhesion point between the first porous layer and the second porous layer to be rough. Consequently, contraction stress of the first porous layer, which occurs as a result of a change in humidity, cannot be restricted by the second porous layer. This causes the laminated body to curl.

The separator may alternatively be produced through a method of (i) preparing a second porous layer as a separate sheet, (ii) placing the second porous layer on a first porous layer, and (iii) combining the second porous layer with the first porous layer through thermocompression or with use of an adhesive. The second porous layer may be prepared as a separate sheet through a method of, for example, (i) applying to a release sheet a coating solution containing a PVDF-based resin and a filler, (ii) forming a second porous layer through the wet coating method or dry coating method described above, and (iii) peeling the second porous layer from the release sheet.

In a case where the second porous layer is a heat-resistant layer, examples of a method to be employed include: a method of (i) preparing a first porous layer and a second porous layer separately and (ii) combining the first porous layer and the second porous layer with each other; and a method of (i) preparing a coating solution containing a medium as well as a component for a second porous layer, (ii) applying the coating solution to a first porous layer, and (iii) removing the medium. The latter of these methods is simple and preferable.

The medium is a solvent or a disperse medium, and simply needs to be capable of dissolving or dispersing a component for a second porous layer uniformly and stably. Examples of the medium include water, alcohols such as methanol, ethanol, and isopropanol, acetone, toluene, xylene, hexane, N-methylpyrrolidone, N,N-dimethylacetamide, and N,N-dimethylformamide. The present invention may use only one of the above mediums, or mix two or more of the above mediums with each other for use as long as the two or more mediums are dissolved in each other.

In terms of process or environmental load, it is preferable for the medium to contain water at 80% or more by weight, more preferably contain only water.

The coating solution may be applied to the first porous layer through any method that allows uniform wet coating, and may be applied through a conventionally publicly known method. Examples of the application method include capillary coating method, spin coating method, slit die coating method, spray coating method, roll coating method, screen printing method, flexographic printing method, bar coater method, gravure coater method, and die coater method. The thickness of the second porous layer may be controlled by adjusting (i) the amount of the coating solution to be applied, (ii) the concentration of the polymer in the coating solution, and/or (iii) in a case where the coating solution contains fine particles, the ratio of the fine particles to the polymer. Normally, a process of (i) applying the coating solution to the first porous layer and (ii) removing, from the coating solution, a medium which has been applied to the first porous layer, is carried out sequentially while the first porous layer is conveyed. This allows the first porous layer and the second porous layer to be sequentially deposited even in a case where the first porous layer is long.

The coating solution may be prepared through any method that allows a homogeneous coating solution to be prepared. In a case where the coating solution is to contain a component in addition to a polymer other than polyolefin, particularly a filler, the coating solution is preferably prepared through a method such as mechanical stirring method, ultrasonic dispersion method, high-pressure dispersion method, or media dispersion method, among which high-pressure dispersion method is preferable because the method makes it easy to disperse a filler more uniformly. The mixing order during such an operation may be any order as long as it causes no particular problem such as generation of precipitate. For instance, the polymer and any other component such as a filler may be (i) added together to a medium and mixed with each other, (ii) added in any order to a medium and mixed with each other, or (iii) first dissolved or dispersed in respective mediums and then mixed with each other.

In a case where the medium for the coating solution contains water, it is preferable to perform a hydrophilization treatment on the first porous layer before applying the coating solution to the first porous layer. Performing a hydrophilization treatment on the first porous layer further improves the application property, and allows production of a more homogeneous second porous layer. A hydrophilization treatment is particularly effective in a case where the medium contains water at a high concentration.

Examples of the hydrophilization treatment include (i) a chemical treatment involving an acid, an alkali, or the like, (ii) a corona treatment, and (iii) a plasma treatment.

Among the above hydrophilization treatments, a corona treatment is preferable because it can not only hydrophilize the first porous layer within a relatively short time period, but also reform the polyolefin through corona discharge only at a surface and its vicinity of the first porous layer and leave the inside of the first porous layer unchanged in quality while ensuring a high application property.

The medium is removed from the coating solution on the first porous layer preferably by drying the first porous layer because drying is simple. Examples of the drying method include natural drying, blow drying, drying by heating, and drying under reduced pressure, among which drying by heating is preferable. Although depending on the medium used, the drying temperature is preferably 30° C. to 80° C., more preferably 50° C. to 80° C. A drying temperature of 30° C. or higher allows a sufficient drying speed. A drying temperature of 80° C. or lower allows deposition of a porous film having good appearance.

The following description discusses an example in which fine particles containing PVDF-based resin are used as a second porous layer. A method for producing a separator includes (i) a coating step of applying, to one surface or both surfaces of a first porous layer, an aqueous dispersion containing (a) fine particles containing PVDF-based resin and (b) a filler containing at least one of an organic compound and an inorganic compound; and (ii) a drying step of drying the aqueous dispersion which has been thus applied.

In a case where the method for producing the separator is thus configured, it is possible to produce the nonaqueous secondary battery separator of the present invention by evaporating a solvent in the aqueous dispersion. This makes it unnecessary to provide facilities for handling organic solvents such as acetone which is generally used for production of separators, and therefore allows for a reduction in production cost for the separators. Therefore, it is possible to produce separators with a high level of productivity.

[Coating Step]

In the coating step, an aqueous dispersion is applied to one surface or both surfaces of a first porous layer so that an amount of fine particles per layer is 0.1 $g/m^2$ to 6.0 $g/m^2$, said aqueous dispersion (i) containing (a) the fine particles containing PVDF-based resin and (b) a filler containing at least one of an organic compound and an inorganic compound and (ii) being configured such that the filler is contained at a proportion of 20% or more by mass and 80% or less by mass with respect to a total mass of the fine particles and the filler.

[Aqueous Dispersion]

The aqueous dispersion is prepared by dispersing, suspending, or emulsifying, in/with a solvent, each of (i) fine particles containing PVDF-based resin and (ii) a filler containing at least one of an organic compound and an inorganic compound, while the fine particles and the filler are each in a solid state. The aqueous dispersion thus obtained is to become a coating solution to be applied to a first porous layer. The aqueous dispersion may be an emulsion or a suspension.

The solvent for preparing the aqueous dispersion is at least water, and can further include a solvent other than water.

The solvent other than water is not particularly limited, provided that the solvent does not dissolve the PVDF-based resin or the filler but allows each of the PVDF-based resin and the filler to be dispersed, suspended, or emulsified while being in a solid state. Examples of the solvent include organic solvents such as: alcohols such as methanol, ethanol, and 2-propanol; acetone; tetrahydrofuran; methyl ethyl ketone; ethyl acetate; N-methylpyrrolidone; dimethylacetamide; dimethylformamide; and dimethylformamide.

An aqueous emulsion according to the present invention is an emulsion obtained by emulsifying, with water or with a mixture of water and the organic solvent, (i) fine particles containing PVDF-based resin and (ii) a filler.

From environmental, safety, and economical viewpoints, it is preferable to use an aqueous emulsion obtained by emulsifying, with water or with a mixture of water and alcohol, (i) fine particles containing PVDF-based resin and (ii) a filler.

In terms of composition, the aqueous dispersion only needs to contain water, fine particles, and a filler. However, the aqueous dispersion preferably contains them such that (i) a filler content is 20% or more by mass and 80% or less by mass with respect to a total mass of the fine particles and the filler or (ii) a volume of the filler is 15% or more by volume and 90% or less by volume with respect to a total volume of a volume of the fine particles and a volume of the filler.

A publicly known thickening agent can be further contained, provided that a viscosity suitable for coating can be ensured. A publicly known surface active agent can also be contained for improving dispersibility of the fine particles and the filler in the aqueous dispersion.

The amount of the fine particles containing PVDF-based resin, which fine particles are contained in the aqueous dispersion, is preferably 1% by mass to 50% by mass with respect to a total mass of the aqueous dispersion. By adjusting fine particle concentrations, it is possible to adjust the mass of the fine particles containing PVDF-based resin, which fine particles are present in a nonaqueous secondary battery separator.

The aqueous dispersion may be applied to a first porous layer (for example, polyolefin microporous film) through a conventional coating method, for example, with use of a Meyer bar, a die coater, a reverse roll coater, a gravure coater, a micro-gravure coater, or a spray coat (spray coater). In a case where the fine particles containing PVDF-based resin are fixed onto front and back surfaces of a first porous layer, the aqueous dispersion may be applied to one surface at a time and then dried. However, from the viewpoint of productivity, the aqueous dispersion is preferably applied simultaneously to both the surfaces of the first porous layer and then dried.

[Drying Step]

In the drying step, the aqueous dispersion, which has been applied to the first porous layer in the coating step, is dried.

By drying the aqueous dispersion which has been applied to at least one surface of the first porous layer (for example, polyolefin microporous film), a functional layer, which contains (i) an aggregate of fine particles containing PVDF-based resin and (ii) a filler, is formed while the solvent in the aqueous dispersion is evaporated.

The fine particles containing PVDF-based resin, which fine particles are included in the functional layer after the drying step is taken, preferably retain a particle shape. As a result of the drying step being taken, the fine particles containing PVDF-based resin serve as a binder, so that an entire portion of the functional layer is integrally formed on the first porous layer such as a polyolefin microporous film.

[4. Nonaqueous Secondary Battery]

A nonaqueous secondary battery of the present invention achieves an electromotive force through doping and dedoping with lithium. The nonaqueous secondary battery of the present invention only needs to include a cathode, an anode, and the above-described separator, and is not particularly limited in other arrangements. The nonaqueous secondary battery includes (i) a battery element made of a structure (a) including the anode and the cathode facing each other via the above-described separator and (b) containing the electrolyte solution and (ii) an exterior member including the battery element. The nonaqueous secondary battery is suitably applicable to a nonaqueous electrolyte secondary battery, and is particularly applicable to a lithium ion secondary battery. Note that the doping means storage, support, absorption, or insertion, and means a phenomenon in which lithium ions enter an active material of the electrode (e.g., the cathode). A nonaqueous secondary battery produced so as to include the above-described separator excels in handling easiness of the separator, and thus has a high production yield.

The cathode may be achieved as an active material layer which (i) is formed on a current collector and (ii) includes a cathode active material and a binder resin. The active material layer may further include a conductive auxiliary agent.

Examples of the cathode active material include a lithium-containing transition metal oxide, specific examples of which include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin include a PVDF-based resin. Examples of the conductive auxiliary agent include carbon materials such as acetylene black, Ketjenblack, and graphite powder.

Examples of the current collector include aluminum foil, titanium foil, and stainless steel foil each having a thickness of 5 μm to 20 μm.

The anode may be achieved as an active material layer which (i) is formed on a current collector and (ii) includes an anode active material and a binder resin. The active material layer may further include a conductive auxiliary agent. Examples of the anode active material include a material capable of electrochemical storage of lithium. Specific examples of such a material include a carbon material; and an alloy of (i) lithium and (ii) silicon, tin, aluminum, or the like.

Examples of the binder resin include a PVDF-based resin and styrene-butadiene rubber. The separator of the present invention is able to ensure sufficient adhesion to the anode even if the anode includes styrene-butadiene rubber as the anode binder. Examples of the conductive auxiliary agent include carbon materials such as acetylene black, Ketjenblack, and graphite powder.

Examples of the current collector include copper foil, nickel foil, and stainless steel foil each having a thickness of 5 μm to 20 μm. Instead of the anode described above, metallic lithium foil may be employed as the anode.

The electrolyte solution is a solution made of a nonaqueous solvent in which a lithium salt is dissolved. Examples of the lithium salt include $LiPF_6$, $LiBF_4$, and $LiClO_4$.

Examples of the nonaqueous solvent include cyclic carbonate such as ethylene carbonate, propylene carbonate, fluoroethylene carbonate, and difluoroethylene carbonate; chain carbonate such as dimethyl carbonate, diethyl carbonate, ethyl methyl carbonate, and fluorine substituents thereof; and cyclic ester such as γ-butyrolactone and γ-valerolactone. The present invention may use only (i) one kind of solvent or (ii) two or more kinds of solvents in combination selected from the above.

The electrolyte solution is preferably the one obtained by (i) preparing a mixture through mixing of cyclic carbonate and chain carbonate at a mass ratio (cyclic carbonate/chain carbonate) of 20/80 to 40/60 and (ii) dissolving in the mixture a lithium salt at a concentration of 0.5M to 1.5M.

Examples of the exterior member include a metal can and a pack which is made of an aluminum-laminated film. Examples of the shape of the battery include a polygon, a cylinder, a coin shape.

It is possible to produce the nonaqueous secondary battery by, for example, (i) causing the electrolyte solution to permeate the laminated body including the cathode, the anode, and the above-described separator which is disposed between the cathode and the anode, (ii) causing the laminated body to be accommodated in the exterior member (e.g., the pack made of the aluminum-laminated layer film), and (iii) pressing the laminated body via the exterior member.

In a case where the PVDF-based resin is employed as the separator, such a separator can be bonded to the electrode by stacking the separator onto the electrode. Thus, although the above pressing is not an essential step for battery production in this case, it is preferable to perform the pressing in order to enhance adhesion between the electrode and the separator. It is preferable to perform the pressing while the separator and the electrode are heated (hot pressing) in order to further enhance adhesion between the electrode and the separator.

A manner how the separator is disposed between the cathode and the anode may be (i) a manner (so-called stack system) in which at least one cathode, at least one separator, and at least one anode are stacked in this order or (ii) a manner in which a cathode, a separator, an anode, and a separator are stacked in this order and the stack thus obtained is rolled up in a direction along a length of the stack.

Fourth Embodiment: Aspect 4 of Present Invention

The description below deals with a fourth embodiment of the present invention. The present invention is, however, not limited to such an embodiment. Further, the present invention is not limited to the description of the arrangements below, but may be altered in various ways by a skilled person within the scope of the claims. Any embodiment based on a proper combination of technical means disclosed in different embodiments is also encompassed in the technical scope of the present invention. In the present specification, any numerical range expressed as "A to B" means "not less than A and not greater than B" unless otherwise stated.

[1. Nonaqueous Secondary Battery Separator]

The nonaqueous secondary battery separator is provided between a cathode and an anode of a nonaqueous secondary battery, and includes (i) a filmy porous base material containing a polyolefin as a main component and (ii) a porous layer laminated on at least one surface of the porous base material.

Furthermore, in another embodiment of the present invention, the nonaqueous secondary battery separator may have, in addition to the porous layer, a heat-resistant layer made of heat-resistant resin. The heat-resistant layer is preferably a layer containing aromatic polyamide.

The following discusses the porous base material and the porous layer which constitute the nonaqueous secondary battery separator of the present invention.

[1-1. Porous Base Material]

The porous base material only needs to be made of a porous and filmy base material containing a polyolefin as a main component (a polyolefin-based porous base material), and is preferably a microporous film. Namely, the porous base material is preferably a porous film that (i) contains a polyolefin as a main component, (ii) has inside itself pores connected to one another, and (iii) allows a gas, a liquid, or the like to pass therethrough from one surface to the other. Also, the porous base material can be arranged such that, in a case where the battery generates heat, the porous base material is melted so as to make a non-aqueous secondary battery separator non-porous. Thus, the porous base material can impart to the non-aqueous secondary battery separator a shutdown function. The porous base material can be made of a single layer or a plurality of layers.

The porous base material has a porosity (D) of preferably 0.2 to 0.8 (20 to 80% by volume), more preferably 0.3 to 0.75 (30 to 75% by volume), in order to allow the separator to (i) retain a larger amount of electrolyte solution and (ii) achieve a function of reliably preventing (shutting down) the flow of an excessively large current at a lower temperature. The porous base material has pores each having a pore size of preferably 3 μm or less, more preferably 1 μm or less, in order to, in a case where the porous base material is used as a separator, achieve sufficient ion permeability and prevent particles from entering the cathode and the anode. Further, the porous base material has pores having an average pore size (hereinafter referred to also as "average pore diameter (C)"), the average pore diameter (C) and porosity (D) of the porous base material satisfying the relation (C)/(D)≤0.13, preferably satisfying the relation (C)/(D)≤0.10. The average pore diameter (C) of the porous base material has a value in μm indicative of the mean value of respective sizes of pores in the porous base material. The porosity (D) of the porous base material has a value indicative of the proportion ((E)/(F)) of the volume (F) of void in the actual porous base material with reference to the volume (E) of the porous film when the porous base material is assumed to have no void.

The average pore diameter (C) of the porous base material is measured with use of a palm porometer available from PMI Co., Ltd. (model: CFP-1500A). The measurement involves, as a test liquid, GalWick (product name) available from PMI Co., Ltd., and is made of the following curves (i) and (ii) for the porous base material:

(i) Pressure-flow rate curve for the porous base material as immersed in the test liquid (ii) Pressure-flow rate curve, which is half the flow rate measured for the dry porous base material The average pore diameter (C) of the porous base material is calculated by Formula (1) below on the basis of the value of a pressure P corresponding to the point of intersection of the curves (i) and (ii).

$$(C)=4\cos\theta r/P \quad (1)$$

In Formula (1) above, (C) represents the average pore diameter (μm), r represents the surface tension (N/m) of the test liquid, P represents the above-mentioned pressure (Pa) corresponding to the point of intersection, and θ represents the angle (°) of contact between the laminated body and the test liquid.

The porosity (D) of the porous base material is measured through the following method: A square piece with a 10 cm side is cut out from the porous base material. The weight W (g) and thickness E (cm) of the piece cut out are then measured. The porosity (D) of the porous film is calculated by Formula (2) below on the basis of (i) the weight (W) and thickness (E) measured above and (ii) the true specific gravity ρ (g/cm³) of the porous base material.

$$\text{Porosity } (D)=1-\{(W/\rho)\}/(10\times10\times E) \quad (2)$$

The average pore diameter (C) of the porous base material is controlled through, for example, a method of, in a case of reducing the pore diameter, (i) uniformizing the dispersion state of a pore forming agent such as an inorganic filler or of a phase separating agent during production of the porous base material, (ii) using, as a pore forming agent, an inorganic filler having smaller particle sizes, (iii) drawing the porous base material in a state where the porous base material contains a phase separating agent, or (iv) drawing the porous base material at a low extension magnification. The porosity (D) of the porous base material is controlled through, for example, a method of, in a case of producing a porous base material having a high porosity, (i) increasing the amount of a pore forming agent such as an inorganic filler or of a phase separating agent relative to the resin such as a polyolefin, (ii) drawing the porous base material after the phase separating agent has been removed, or (iii) drawing the porous base material at a high extension magnification.

The above average pore diameter (C)/porosity (D) of the porous base material should be a dominant factor in ease of infiltration of an electrolyte solution into the polyolefin base material of a nonaqueous electrolyte secondary battery separator including the porous base material.

A decrease in the value of (C)/(D) means (i) a decrease in the average pore diameter (C) of the porous base material and/or (ii) an increase in the porosity (D) of the porous base material.

A decrease in the average pore diameter (C) of the porous base material should increase the capillary force, which is presumed to serve as a driving force for introducing the electrolyte solution into pores inside the polyolefin base material. Furthermore, smaller average pore diameter (C) can subdue generation of dendrites of lithium metal.

Further, an increase in the porosity (D) of the porous base material should decrease the volume of a portion of the polyolefin base material which portion contains a polyolefin that cannot be permeated by the electrolyte solution. This should be the reason why a decrease in the value of (C)/(D) described above increases the ease of infiltration of an electrolyte solution into the polyolefin base material of a nonaqueous electrolyte secondary battery separator including the porous base material.

Specifically, in a case where, as described above, (C)/(D)≤0.13, desirably (C)/(D)≤0.10, it can increase the ease of infiltration of an electrolyte solution into the polyolefin base material of a nonaqueous electrolyte secondary battery separator with the porous base material so that the ease of infiltration is sufficiently high for the separator to be in actual use as a nonaqueous electrolyte secondary battery separator. Since the porous base material of the present invention has pores, the average pore diameter (C) of the porous film is larger than 0. Accordingly, the value of (C)/(D) is larger than 0, too.

It is essential that the porous base material contains a polyolefin component at a proportion of 50% or more by volume with respect to whole components contained in the porous base material. Such a proportion of the polyolefin component is preferably 90%, or more by volume, and more preferably 95% or more by volume. The porous base material preferably contains, as the polyolefin component, a high molecular weight component having a weight-average molecular weight of $5\times10^5$ to $15\times10^6$. The porous base material particularly preferably contains, as the polyolefin component, a polyolefin component having a weight-average molecular weight of 1,000,000 or more. This is because that (i) a porous base material containing such a polyolefin component and (ii) the whole of a nonaqueous secondary battery including such a porous base material achieve higher strength.

Examples of the polyolefin include high molecular weight homopolymers or copolymers produced through polymerization of ethylene, propylene, 1-butene, 4-methyl-1-pentene, 1-hexene, and/or the like. The porous base material can be a layer containing only one of these polyolefins and/or a layer containing two or more of these polyolefins. Among these, a high molecular weight polyethylene containing ethylene as a main component is particularly preferable. Note that the porous base material can contain other component which is not a polyolefin, as long as the other component does not impair the function of the porous base material.

The porous base material has an air permeability normally in a range of 30 to 500 sec/100 cc, and preferably in a range of 50 to 300 sec/100 cc, in terms of Gurley values. A porous base material having an air permeability within such a range achieves sufficient ion permeability in a case where the porous base material is used in the separator.

A thickness of the porous base material is selected as appropriate in view of the number of layers in the nonaqueous secondary battery. Particularly in a case where the porous layer is formed on one surface (or both surfaces) of the porous base material, the porous base material has a thickness of preferably 4 to 40 μm, and more preferably a thickness of 7 to 30 μm.

The porous base material has a weight of normally 4 to 20 $g/m^2$, and preferably 5 to 12 $g/m^2$. This is because a porous base material having such a weight is possible to provide suitable strength, thickness, handling easiness, and weight of the laminated body and is also possible to enhance a weight energy density and/or a volume energy density in a case where the porous base material is used in the separator of the nonaqueous secondary battery.

Suitable examples of such a porous base material include a porous polyolefin layer disclosed in Japanese Patent Application Publication, Tokukai, No. 2013-14017 A, a polyolefin porous film disclosed in Japanese Patent Application Publication, Tokukai, No. 2012-54229 A, and a polyolefin base material porous film disclosed in Japanese Patent Application Publication, Tokukai, No. 2014-040580 A.

The porous base material may be produced, through any publicly-known technique, and is not particularly limited to any specific method. For example, as disclosed in Japanese Patent Application Publication, Tokukaihei, No. 7-29563 A (1995), the porous base material may be produced through a method of (i) adding a plasticizing agent to a thermoplastic resin to shape the thermoplastic resin into a film and then (ii) removing the plasticizing agent with use of an appropriate solvent.

Specifically, in a case of, for example, producing a porous base material with use of a polyolefin resin containing (i) an ultra high molecular weight polyethylene and (ii) a low molecular weight polyolefin having a weight-average molecular weight of 10,000 or less, such a porous base material is, in terms of production cost, preferably produced through the method including the steps of:

(1) kneading (i) 100 parts by weight of the ultra high molecular weight polyethylene, (ii) 5 to 200 parts by weight of the low molecular weight polyolefin having a weight-average molecular weight of 10,000 or less, and (iii) 100 to 400 parts by weight of an inorganic filler of calcium carbonate or the like to produce a polyolefin resin composition, (2) shaping the polyolefin resin composition into a sheet, (3) removing the inorganic filler from the sheet produced in the step (2), and (4) drawing the sheet produced in the step (3) to produce an A layer.

Alternatively, the porous base material, may be produced through any of the methods explained in the above-described Patent Literatures.

The porous base material may alternatively be a commercially available product having the above physical properties.

[1-2. Porous Layer]

The porous layer of the present invention contains polyvinylidene fluoride-based resin (PVDF-based resin). The porous layer (i) has inside itself pores connected to one another, and (ii) allows a gas or a liquid to pass therethrough from one surface to the other. Also, in the present embodiment, the porous layer is provided on one surface of the porous base material to be an outermost layer of the separator and to be a layer capable of contacting an electrode.

The inventors of the present invention have diligently studied and found that in a case where the porous layer is immersed, at 25° C. for 24 hours, in an electrolyte solution obtained by dissolving $LiPF_6$ with a concentration of 1.0 mol/liter in a mixed solvent of ethylmethyl carbonate, diethylcarbonate, and ethylenecarbonate in a volume ratio of 50:20:30, and then the volume of the porous layer (resin having absorbed the electrolyte solution) per one square meter of the porous layer is controlled to be 0.05 to 5.00 $cm^3$, it is possible to subdue a decrease in cycle characteristics while maintaining adhesiveness between the porous layer and an electrode.

In particular, the inventors of the present invention have found that by combining (i) the porous base material satisfying the relation of average pore diameter (C)/porosity (D)≤0.13 with (ii) the porous layer in which after immersion of the porous layer in the electrolyte solution, the resin having absorbed the electrolyte solution has a volume of 0.05 to 5.00 $cm^3$ per square meter of the porous layer, it is possible to subdue a decrease in cycle characteristics while maintaining adhesiveness between the separator and an electrode. That is, in a case of a nonaqueous electrolyte secondary battery separator having a structure in which a polyolefin-based porous base material and a porous layer containing polyvinyldene fluoride-based resin are laminated, by satisfying the conditions of (i) average pore diameter (C)/porosity (D)≤0.13 and (ii) the resin having a volume of 0.05 to 5.00 $cm^3$ per square meter of the porous layer after being immersed in the electrolyte solution, the nonaqueous electrolyte secondary battery separator can subdue the decrease in cycle characteristics while maintaining adhesiveness between the nonaqueous electrolyte secondary battery separator and an electrode.

Furthermore, by combining (i) the porous base material satisfying the relation of average pore diameter (C)/porosity (D)≤0.13 with (ii) the porous layer in which after immersion of the porous layer in the electrolyte solution, the resin having absorbed the electrolyte solution has a volume of 0.05 to 5.00 $cm^3$ per square meter of the porous layer, it is possible to further subdue generation of dendrides and increase a shutdown property.

As described above, by setting the average pore diameter (C) of the porous base material to be smaller so as to satisfy the relation of $(C)/(D) \leq 0.13$, it is possible to subdue generation of dendrites in the porous base material due to lithium metal. Furthermore, by using the porous layer whose volume of resin having absorbed the electrolyte solution is not more than 5.00 cm$^3$, the resin (gel) constituting the porous layer can maintain suitable hardness when the resin absorbs the electrolyte solution, thereby subduing generation of dendrites. In a case where the resin having absorbed the electrolyte solution has a volume of more than 5.00 cm$^3$, the gel constituting the porous layer becomes excessively soft, making it difficult to subdue generation of dendrites. As described above, in the present embodiment, both of the porous base material and the porous layer allow subduing generation of dendrites. Furthermore, since the resin (gel) which constitutes the porous layer and which has absorbed the electrolyte solution maintains suitable hardness, the gel is less likely to enter into pores of the porous base material satisfying the relation of $(C)/(D) \leq 0.13$. This can prevent the shutdown property from decreasing due to the gel entering into pores of the porous base material. This allows improving the shutdown property.

Herein, the electrolyte solution obtained by dissolving LiPF$_6$ of 1.0 mol/liter in concentration in a mixed solvent of ethylmethyl carbonate, diethylcarbonate, and ethylenecarbonate in a volume ratio of 50:20:30 is an example of an electrolyte solution used in a nonaqueous secondary battery. Accordingly, the porous layer immersed in the electrolyte solution at 25° C. for 24 hours simulates the porous layer built in the nonaqueous secondary battery.

Furthermore, the resin having absorbed the electrolyte solution is in a state where the resin constituting the porous layer is swollen due to the electrolyte solution, i.e. a state where the resin is gelatinized.

Furthermore, the volume (basis volume) of resin having absorbed the electrolyte solution per square meter of the porous layer was measured as follows.

1) Calculation of Weight Increased after Swelling Due to Electrolyte Solution

Polyvinylidene fluoride-based resin was applied to an aluminum cup, and was dried in a vacuum at 120° C. for 8 hours. The filmy non-porous polyvinylidene fluoride-based resin thus obtained was cut into a piece having a size of 2 cm$^2$, and a weight W1 of the sample was measured. The sample was immersed, at 25° C. for 24 hours, in an electrolyte solution obtained by dissolving LiPF$_6$ with a concentration of 1.0 mol/liter in a mixed solvent of ethylmethyl carbonate, diethylcarbonate, and ethylenecarbonate in a volume ratio of 50:20:30. Then, the sample was taken out and a weight W2 thereof was measured. A weight increased after swelling of the sample was calculated based on the formula below.

Weight increased after swelling $W2'=W2-W1$ where W1 represents the weight of the sample before it was immersed, and W2 represents the weight of the sample after immersion of 24 hours.

2) Calculation of Degree of Swelling in Volume of Resin Having Swollen Due to Electrolyte Solution The degree of swelling in volume of polyvinylidene fluoride-based resin having swollen due to electrolyte solution was calculated based on the formula below.

The degree of swelling in volume=$(W1/\rho 1 + W2'/\rho 2)/(W1/\rho 1)$ where $\rho 1$ represents specific gravity of PVDF-based resin at 25° C., and $\rho 2$ represents specific gravity of an electrolyte solution obtained by dissolving LiPF$_6$ with a concentration of 1.0 mol/liter in a mixed solvent of ethylmethyl carbonate, diethylcarbonate, and ethylenecarbonate in a volume ratio of 50:20:30.

3) Calculation of Basis Volume of Porous Layer after Swelling Due to Electrolyte Solution Basis weight (weight per 1 square meter) Wd of the porous layer in a dried state was measured and the basis weight was divided by the specific gravity of the PVDF-based resin at 25° C., so that basis volume (volume per 1 square meter) Vd of the resin component of the porous layer in a dried state was measured.

The basis volume Vd of the resin component of the porous layer in a dried state is multiplied by the degree of swelling in volume of the resin after swelling due to the electrolyte solution, so that basis volume Vw of the porous layer after swelling due to the electrolyte solution (i.e. volume of resin having absorbed the electrolyte solution per square meter of the porous layer) can be obtained.

By controlling the resin having absorbed the electrolyte solution per square meter of the porous layer immersed in the electrolyte solution to have a volume of 0.05 cm$^3$ or more, it is possible to secure adhesiveness between the porous layer and the electrode. That is, in a case where in the porous layer after being immersed in the electrolyte solution, the resin having absorbed the electrolyte solution has a volume of less than 0.05 cm$^3$ per square meter of the porous layer, the amount of gelatinized resin is small and consequently it is difficult to maintain adhesiveness between the porous layer and the electrode. In contrast, in a case where the resin having absorbed the electrolyte solution per square meter of the porous layer has a volume of not less than 0.05 cm$^3$, it is possible to secure adhesiveness between the porous layer and the electrode. The resin having absorbed the electrolyte solution per square meter of the porous layer more preferably has a volume of not less than 0.25 cm$^3$.

Furthermore, by controlling the resin having absorbed the electrolyte solution per square meter of the porous layer immersed in the electrolyte solution to have a volume of not more than 5.00 cm$^3$, it is possible to improve the cycle characteristics of the nonaqueous secondary battery including the porous layer. That is, in a case where the resin having absorbed the electrolyte solution per square meter of the porous layer has a volume of more than 5.00 cm$^3$, the gelatinized porous layer has an increased resistance in transmissivity of ions. In contrast, in a case where the resin having absorbed the electrolyte solution has a volume of not more than 5.00 cm$^3$ per square meter of the porous layer, it is possible to subdue a decrease in mobility of ions in the gelatinized porous layer and to subdue an increase in charging time. Consequently, it is possible to subdue oxidation and decomposition of the electrolyte solution at a cathode side and deposition of metal at an anode side, thereby improving the cycle characteristics.

The resin having absorbed the electrolyte solution per square meter of the porous layer more preferably has a volume of not more than 1.50 cm$^3$.

Furthermore, the porous layer of the present invention after being immersed in the electrolyte solution at 25° C. for 24 hours preferably has a porosity of 0.5 to 55.0%.

Here, the porosity of the porous layer after being immersed in the electrolyte solution for 24 hours can be calculated as follows. First, a volume A of the porous layer after being immersed in the electrolyte solution for 24 hours and including voids is measured. Then, a weight of the porous layer after being immersed in the electrolyte solution for 24 hours is measured, and the weight is divided by true density of resin having absorbed the electrolyte solution, so as to obtain a volume B of resin (resin gelatinized by the electrolyte solution) itself. Then, the porosity is calculated in accordance with porosity=100×(A−B)/A.

In a case where the nonaqueous secondary battery includes the porous layer and the porous layer gets gelatinized due to the electrolyte solution, the electrolyte solution in the gel has smaller dispersion ratio. Consequently, in a case where the electrolyte solution is dried up locally in the porous layer due to some influence, it is impossible to supply the electrolyte solution to the portion where the electrolyte solution is dried up. This maintains a state where the electrolyte solution is dried up, thereby causing a decrease in the cycle characteristics.

However, by controlling the porous layer after being immersed in the electrolyte solution for 24 hours to have a porosity of 0.005 (0.5% by volume) or more, the porous layer built in the nonaqueous secondary battery has the electrolyte solution in the form of a liquid in voids of the porous layer. Accordingly, even if the electrolyte solution is dried up locally, the electrolyte solution in a neighboring void is supplied to the portion where the electrolyte solution is dried up. This prevents a state where the electrolyte solution is dried up from being maintained, thereby subduing a decrease in the cycle characteristics.

Furthermore, by controlling the porous layer after being immersed in the electrolyte solution for 24 hours to have a porosity of 0.55 (55% by volume) or less, it is possible to maintain strength of the gelatinized porous layer and secure an area of the gelatinized porous layer which contacts an electrode when built in the nonaqueous secondary battery. This allows preventing a decrease in adhesiveness between the porous layer and the electrode. This allows preventing a decrease in capacity due to an increase in distance between a cathode and an anode in a charge/discharge cycle.

Furthermore, the porous layer of the present invention preferably has an average pore diameter of 0.8 to 95.0 nm after the porous layer is immersed in the electrolyte solution at 25° C. for 24 hours.

The average pore diameter of the porous layer after being immersed in the electrolyte solution for 24 hours can be measured with a scanning probe microscope (SPM).

In the nonaqueous secondary battery, there is a possibility that a slight amount of water content having entered the nonaqueous secondary battery generates an inorganic solid. When such an inorganic solid clogs pores in the porous layer, the capacity of the battery decreases.

However, by controlling the porous layer after being immersed in the electrolyte solution for 24 hours to have an average pore diameter of 0.8 nm or more, it is possible to reduce a probability of such an inorganic solid clogging the pores, thereby preventing a decrease in capacity of the battery.

Furthermore, by controlling the porous layer after being immersed in the electrolyte solution for 24 hours to have an average pore diameter of 95.0 nm or less, it is possible to maintain strength of the gelatinized porous layer and secure an area of the gelatinized porous layer which contacts an electrode when built in the nonaqueous secondary battery. This allows maintaining adhesiveness between the porous layer and the electrode. This allows preventing a decrease in capacity due to an increase in distance between a cathode and an anode in a charge/discharge cycle.

It is preferable that the resin constituting the porous layer contains polyvinylidene fluoride-based resin and has a structure in which skeletons with a diameter of 1 µm or less are connected with each other to form a three-dimensional network.

Examples of the polyvinylidene fluoride-based resin include homopolymers of vinylidene fluoride (i.e., polyvinylidene fluoride); copolymers (e.g., polyvinylidene fluoride copolymer) of vinylidene fluoride and other monomer(s) polymerizable with vinylidene fluoride; and mixtures of these polymers. Examples of the monomer polymerizable with vinylidene fluoride include hexafluoropropylene, tetrafluoroethylene, trifluoroethylene, trichloroethylene, and vinyl fluoride. The present invention can use (i) one kind of monomer or (ii) two or more kinds of monomers selected from above. The polyvinylidene fluoride-based resin can be synthesized through emulsion polymerization or suspension polymerization.

The polyvinylidene fluoride-based resin preferably contains vinylidene fluoride at a proportion of 95 mol % or more (more preferably, 98 mol % or more). A polyvinylidene fluoride-based resin containing vinylidene fluoride at a proportion of 95 mol % or more is more likely to allow the porous layer to achieve a mechanical strength and a heat resistance against a pressure or heat occurred in battery production.

The porous layer preferably contains two kinds of polyvinylidene fluoride-based resins (a first resin and a second resin below) that are different from each other in a content of hexafluoropropylene.

The first resin is (i) a vinylidene fluoride-hexafluoropropylene copolymer containing hexafluoropropylene at a proportion of more than 0 mol % and 1.5 mol % or less or (ii) a vinylidene fluoride homopolymer (containing hexafluoropropylene at a proportion of 0 mol %).

The second resin is a vinylidene fluoride-hexafluoropropylene copolymer containing hexafluoropropylene at a proportion of more than 1.5 mol %.

The porous layer containing the two kinds of polyvinylidene fluoride-based resins is adhered to the electrode more favorably, as compared with a porous layer not containing one of the two kinds of polyvinylidene fluoride-based resins. Further, the porous layer containing the two kinds of polyvinylidene fluoride-based resins has improved adhesiveness to the porous base material and is separated from the porous base material more favorably, as compared with a porous layer not containing one of the two kinds of polyvinylidene fluoride-based resins. The first resin and the second resin are preferably mixed at a mixing ratio (mass ratio, first resin:second resin) of 15:85 to 85:15.

The polyvinylidene fluoride-based resin has a weight-average molecular weight of preferably 300,000 to 3,000,000. A polyvinylidene fluoride-based resin having a weight-average molecular weight of 300,000 or more allows the porous layer to attain a mechanical property with which the porous layer can endure a process for adhering the porous layer to the electrode, thereby allowing the porous layer and the electrode to adhere to each other sufficiently. Meanwhile, a polyvinylidene fluoride-based resin having a weight-average molecular weight of 3,000,000 or less does not cause the coating solution, which is to be applied in order to shape the porous layer, to have a too high viscosity, which allows the coating solution to have excellent shaping easiness. The weight-average molecular weight of the polyvinylidene fluoride-based resin is more preferably 300,000 to 2,000,000, and further preferably 500,000 to 1,500,000.

The polyvinylidene fluoride-based resin has a fibril diameter of preferably 10 nm to 1000 nm, in terms of the cycle characteristic.

The porous layer may contain other resin which is not the polyvinylidene fluoride-based resin. Examples of the other resin include styrene-butadiene copolymer; homopolymers or copolymers of vinyl nitriles such as acrylonitrile and methacrylonitrile; and polyethers such as polyethylene oxide and polypropylene oxide.

Further, the porous layer may contain a filler made of inorganic matter or organic matter. A porous layer containing the filler can improve slidability and/or heat resistance of the separator. The filler may be an organic filler or an inorganic filler each of which is stable in a nonaqueous electrolyte solution and is electrochemically stable. The filler preferably has a heat-resistant temperature of 150° C. or more to ensure safety of the battery.

Examples of the organic filler include crosslinked high molecule fine particles such as crosslinked polyacrylic acid, crosslinked polyacrylic acid ester, crosslinked polymethacrylic acid, crosslinked polymethacrylic acid ester, crosslinked polymethyl methacrylate, crosslinked polysilicone, crosslinked polystyrene, crosslinked polydivinyl benzene, a crosslinked product of a styrene-divinylbenzene copolymer, polyimide, a melamine resin, a phenol resin, a benzoguanamine-formaldehyde condensate; and heat-resistant high molecule fine particles such as polysulfone, polyacrylonitrile, polyaramid, polyacetal, and thermoplastic polyimide.

A resin (high molecule) contained in the organic filler may be a mixture, a modified product, a derivative, a copolymer (a random copolymer, an alternating copolymer, a block copolymer, or a graft copolymer), or a crosslinked product of any of the molecules listed above as examples.

Examples of the inorganic filler include metal hydroxides such as aluminum hydroxide, magnesium hydroxide, calcium hydroxide, chromium hydroxide, zirconium hydroxide, nickel hydroxide, and boron hydroxide; metal oxides such as alumina and zirconia; carbonates such as calcium carbonate and magnesium carbonate; sulfates such as barium sulfate and calcium sulfate; clay minerals such as calcium silicate and talc. Among these, the inorganic filler is preferably a metal hydroxide, in terms of achievement of fire retardance and/or electricity removal effects.

The present invention may use (i) only a single filler or (ii) two or more of fillers in combination.

The filler has a volume average particle size of preferably 0.01 μm to 10 μm, in order to ensure (i) fine adhesion and fine slidability and (ii) shaping easiness of the separator. A lower limit of the volume average particle size is more preferably 0.1 μm or more, whereas an upper limit of the volume average particle size is more preferably 5 μm or less.

The filler is constituted by particles of any shape, which may be a sphere, an ellipse, a plate-shape, a bar-shape, or an irregular shape. In order to prevent a short circuit in the battery, the particles are preferably (i) plate-shaped particles or (ii) primary particles which are not aggregated.

The filler forms fine bumps on a surface of the porous layer, thereby improving the slidability. A filler constituted by (ii plate-shaped particles or (ii) primary particles which are not aggregated forms finer bumps on the surface of the porous layer, so that the porous layer is adhered to the electrode more favorably.

The porous layer contains the filler at a proportion of preferably 1% by mass to 30% by mass with respect to a total amount of the polyvinylidene fluoride-based resin and the filler. A porous layer containing the filler at a proportion of 1% or more by mass is likely to exhibit the effect of forming fine bumps on the surface of the porous layer so as to improve the slidability of the separator. From this viewpoint, the porous layer contains the filler more preferably at a proportion of 3% or more by mass. Meanwhile, a porous layer containing the filler at a proportion of 30% or less by mass allows the porous layer to maintain mechanical strength. With this arrangement, for example, during a process for producing an electrode body by rolling up a stack of the electrode and the separator, the separator is hardly cracked and/or the like. From this viewpoint, the porous layer contains the filler at a proportion of more preferably 20% or less by mass, and further preferably 10% or less by mass.

In order to prevent, in a process of slitting the separator, a slitted surface of the separator from becoming fibrous, bending, and/or permitting intrusion of scraps occurred as a result of the slitting, the porous layer contains the filler at a proportion of preferably 1% or more by mass, and more preferably 3% or more by mass, with respect to a total amount of the polyvinylidene fluoride-based resin and the filler.

In order to ensure adhesion to the electrode and a high energy density, the porous layer has, on one surface of the porous base material, an average thickness of preferably 0.5 μm to 10 μm, and more preferably 1 μm to 5 μm.

The porous layer is preferably made porous sufficiently, in terms of ion permeability. Specifically, the porous layer has a porosity of preferably 30% to 60%. The porous layer has an average pore size of 20 nm to 100 nm.

The porous layer has a surface roughness, in terms of a ten-point average roughness (Rz), of preferably 0.8 pin to 8.0 μm, more preferably 0.9 μm to 6.0 μm, and further preferably 1.0 μm to 3.0 μm. The ten-point average roughness (Rz) is a value measured by a method according to JIS B 0601-1994 (or Rzjis of JIS B 0601-2001). Specifically, "Rz" is a value measured by ET4000 (available from Kosaka Laboratory Ltd.) with a measurement length of 1.25 mm, a measurement rate of 0.1 mm/sec, and a temperature and humidity of 25° C./50% RH.

The porous layer has a coefficient of kinetic friction of preferably 0.1 to 0.6, more preferably 0.1 to 0.4, and further preferably 0.1 to 0.3. The coefficient of kinetic friction is a value measured by a method according to JIS K7125. Specifically, a coefficient of kinetic friction in the present invention is a value measured by Surface Property Tester (available from Heidon).

An applied amount of the porous layer is, on one surface of the porous base material, preferably 0.5 $g/m^2$ to 1.5 $g/m^2$ in terms of adhesion to the electrode and ion permeability.

[2. Method for Producing Nonaqueous Secondary Battery Separator]

A method for producing the nonaqueous secondary battery separator of the present invention is not limited to any particular one, but may be selected from various methods, provided that the nonaqueous secondary battery separator can be obtained.

The nonaqueous secondary battery separator is produced by forming, on a surface of a polyolefin resin fine porous film as a porous base material, a porous layer containing a polyvinylidene fluoride-based resin through, for example, any one of methods (1) to (3) below.

(1) Method of (i) applying to a surface of the porous base material a solution in which a resin for forming the porous layer is dissolved and then (ii) immersing the resulting porous base material into a deposition solvent as a poor solvent for the resin to deposit a porous layer containing the resin (2) Method of (i) applying to a surface of the porous base material a solution in which a resin for forming the porous layer is dissolved and then (ii) making the solution acidic with use of low-boiling organic acid to deposit a porous layer containing the resin (3) Method of (i) applying to a surface of the porous base material a solution in which a resin for forming the porous layer is dissolved and then (ii) evaporating the solvent in the solution by far infrared heating or freeze drying to deposit a porous layer containing the resin The methods (1) and (2) may each further involve a step of, after the porous layer has been deposited, drying the laminated body produced.

In a case where in any of the above methods, the resin for forming the porous layer is, for example, a PVDF-based resin, the solvent in which the resin is dissolved is preferably N-methylpyrrolidone.

In a case where in the method (1), the resin for forming the porous layer is, for example, a PVDF-based resin, the solvent for depositing the porous layer is preferably isopropyl alcohol or t-butyl alcohol.

Furthermore, the porous layer produced by the method (1) may be irradiated with an electron ray (EB: Electric Beam). This allows increasing crosslinked resin in the porous layer.

In the method (2), the organic acid is, for example, paratoluene sulfonic acid, acetic acid etc.

In the method (3), far infrared eating and freeze drying are advantageous over other drying methods (such as air drying) in that the respective shapes of pores in the porous layer are not easily changeable during the deposition.

In a case of producing a laminated body further including a heat-resistant layer, such a heat-resistant layer may be deposited through a method similar to the above method except that the resin for forming a porous layer is replaced with a resin for forming a heat-resistant layer.

To form a porous layer containing a filler, the filler may be dispersed in the solution in which the resin for forming the porous layer is dissolved.

In the present embodiment, in any of the methods (1) to (3), by varying an amount of resin in the solution in which the resin for forming the porous layer is dissolved, it is possible to adjust a volume of resin having absorbed the electrolyte solution per square meter of the porous layer after being immersed in the electrolyte solution.

Furthermore, by varying an amount of the solvent in which the resin for forming the porous layer is dissolved, it is possible to adjust a porosity and an average pore diameter of the porous layer after being immersed in the electrolyte solution.

[3. Nonaqueous Secondary Battery]

A nonaqueous secondary battery of the present invention achieves an electromotive force through doping and dedoping with lithium. The nonaqueous secondary battery of the present invention only needs to include a laminated body in which a cathode, an anode, and the above-described nonaqueous secondary battery separator of the present invention are laminated, and is not particularly limited in other arrangements. The nonaqueous secondary battery includes (i) a battery element made of a structure (a) including the anode and the cathode facing each other via the above-described nonaqueous secondary battery separator and (b) containing the electrolyte solution and (ii) an exterior member including the battery element. The nonaqueous secondary battery is suitably applicable to a nonaqueous electrolyte secondary battery, and is particularly applicable to a lithium ion secondary battery. Note that the doping means storage, support, absorption, or insertion, and means a phenomenon in which lithium ions enter an active material of the electrode (e.g., the cathode). A nonaqueous secondary battery produced so as to include the above-described nonaqueous secondary battery separator of the present invention excels in handling easiness of the separator, and thus has a high production yield.

The cathode may be achieved as an active material layer which (i) is formed on a current collector and (ii) includes a cathode active material and a binder resin. The active material layer may further include a conductive auxiliary agent.

Examples of the cathode active material include a lithium-containing transition metal oxide, specific examples of which include $LiCoO_2$, $LiNiO_2$, $LiMn_{1/2}Ni_{1/2}O_2$, $LiCo_{1/3}Mn_{1/3}Ni_{1/3}O_2$, $LiMn_2O_4$, $LiFePO_4$, $LiCo_{1/2}Ni_{1/2}O_2$, and $LiAl_{1/4}Ni_{3/4}O_2$.

Examples of the binder resin include a polyvinylidene fluoride-based resin. Examples of the conductive auxiliary agent include carbon materials such as acetylene black, Ketjenblack, and graphite powder.

Examples of the current collector include aluminum foil, titanium foil, and stainless steel foil each having a thickness of 5 μm to 20 μm.

The anode may be achieved as an active material layer which (i) is formed on a current collector and (ii) includes an anode active material and a binder resin. The active material layer may further include a conductive auxiliary agent. Examples of the anode active material include a material capable of electrochemical storage of lithium. Specific examples of such a material include a carbon material; and an alloy of (i) lithium and (ii) silicon, tin, aluminum, or the like.

Examples of the binder resin include a polyvinylidene fluoride-based resin and styrene-butadiene rubber. The separator of the present invention is able to ensure sufficient adhesion to the anode even if the anode includes styrene-butadiene rubber as the anode binder. Examples of the conductive auxiliary agent include carbon materials such as acetylene black, Ketjenblack, and graphite powder.

Examples of the current collector include copper foil, nickel foil, and stainless steel foil each having a thickness of 5 μm to 20 μm. Instead of the anode described above, metallic lithium foil may be employed as the anode.

The electrolyte solution is a solution made of a nonaqueous solvent in which a lithium salt is dissolved. Examples of the lithium salt include $LiPF_6$, $LiBF_4$, and $LiClO_4$.

Examples of the nonaqueous solvent include all solvents normally used in a nonaqueous secondary battery, and are not limited to the above mixed solvent (ethyl methyl carbonate, diethyl carbonate, and ethylene carbonate in volume ratio of 50:20:30)

Examples of the nonaqueous solvent include cyclic carbonate such as ethylene carbonate, propylene carbonate, fluoroethylene carbonate, and difluoroethylene carbonate; chain carbonate such as dimethyl carbonate, diethyl carbonate, ethyl methyl carbonate, and fluorine substituents thereof; and cyclic ester such as γ-butyrolactone and γ-valerolactone. The present invention may use only (i) one kind of solvent or (ii) two or more kinds of solvents in combination selected from the above.

The electrolyte solution is preferably the one obtained by (i) preparing a mixture through mixing of cyclic carbonate and chain carbonate at a mass ratio (cyclic carbonate/chain carbonate) of 20/80 to 40/60 (more preferably 30/70) and (ii) dissolving in the mixture a lithium salt at a concentration of 0.5M to 1.5M.

Examples of the exterior member include a metal can and a pack which is made of an aluminum-laminated film.

Examples of the shape of the battery include a square, a rectangular, a cylinder, a coin shape.

It is possible to produce the nonaqueous secondary battery by, for example, (i) causing the electrolyte solution to permeate the laminated body including the cathode, the anode, and the above-described separator which is disposed between the cathode and the anode, (ii) causing the laminated body to be accommodated in the exterior member (e.g., the pack made of the aluminum-laminated layer film), and (iii) pressing the laminated body via the exterior member.

In a case where the polyvinylidene fluoride-based resin is employed as the separator, such a separator can be bonded to the electrode by stacking the separator onto the electrode. Thus, although the above pressing is not an essential step for battery production in this case, it is preferable to perform the pressing in order to enhance adhesion between the electrode and the separator. It is preferable to perform the pressing while the separator and the electrode are heated (hot pressing) in order to further enhance adhesion between the electrode and the separator.

A manner how the separator is disposed between the cathode and the anode may be (i) a manner (so-called stack system) in which at least one cathode, at least one separator, and at least one anode are stacked in this order or (ii) a manner in which a cathode sheet, a separator, an anode sheet, and a separator are stacked in this order and the stack thus obtained is rolled up in a direction along a length of the stack.

Another Embodiment

The above description has dealt with a case where a nonaqueous secondary battery separator in which a porous layer is formed on a porous base material is produced, and a cathode sheet and an anode sheet are laminated between which the nonaqueous secondary battery separator is sandwiched, so that a laminate including the nonaqueous secondary battery separator and electrodes is produced. However, the method for producing the nonaqueous secondary battery of the present invention is not limited to this case.

For example, a porous layer may be formed by applying, to at least one surface of a cathode sheet or an anode sheet, a solution in which a resin for forming the porous layer is dissolved. This method for forming the porous layer may be one of the above methods (1) to (3). Then, the cathode sheet and the anode sheet are laminated between which a porous base material is sandwiched, and the resulting laminate is thermally pressed, so as to produce a laminate including a nonaqueous secondary battery separator and electrodes. In this case, the electrode sheet on which the porous layer is formed may be provided so that the porous layer faces the porous base material. This allows producing a laminate in which the electrode, the porous layer, the porous base material, (porous layer), and the electrode are laminated. Consequently, the porous layer is provided between the electrode and the porous base material, so that the cycle characteristics can be improved while maintaining adhesiveness between the porous base material and the electrode.

EXAMPLES

Examples of Aspect 1 of Present Invention (Average Pore Diameter (C) of Porous Film)

The average pore diameter C) was measured with use of a palm porometer available from PMI Co., Ltd. (model: CFP-1500A). The measurement involved, as a test liquid, GalWick (product name) available from PMI Co., Ltd. and was made of the following curves (i) and (ii) for the porous film:

(i) Pressure-flow rate curve for the porous film as immersed in the test liquid (ii) Pressure-flow rate curve, which is half the flow rate measured for the dry porous film The average pore diameter (C) of the porous film was calculated by Formula (3) below on the basis of the value of a pressure P corresponding to the point of intersection of the curves (i) and (ii).

$$(C)=4\cos\theta r/P \qquad (3)$$

In Formula (3) above, (C) represents the average pore diameter ($\mu$m), r represents the surface tension (N/m) of the test liquid, P represents the above-mentioned pressure (Pa) corresponding to the point of intersection, and $\theta$ represents the angle (°) of contact between the porous film and the test liquid.

(Porosity (D) of Porous Film)

A square piece with a 10 cm side was cut out from the porous film. The weight W (g) and thickness E (cm) of the piece cut out were then measured. The porosity (D) of the porous film was calculated by Formula (4) below on the basis of (i) the weight (W) and thickness (E) measured above and (ii) the true specific gravity $\rho$ (g/cm$^3$) of the porous film.

$$\text{Porosity }(D)=1-\{(W/\rho)\}/(10\times10\times E) \qquad (4)$$

Production of Separator

Example 1

A vinylidene fluoride-hexafluoropropylene (PVDF-HEP) copolymer was dissolved in N-methylpyrrolidone at a concentration of 7% by weight to prepare a coating solution. This coating solution was applied to one surface of a polyethylene porous film (base material) having a thickness of 17 $\mu$m and the average pore diameter (C) and porosity (D) shown in Table 1 below, where (C)/(D)=0.08. The polyethylene porous film was then immersed in isopropyl alcohol to deposit a porous layer containing a polyvinylidene fluoride-based resin (PVDF-HEP copolymer). The polyethylene porous film, on a surface of which the porous layer was deposited, was then dried to produce a laminated body including (i) a polyethylene porous film and (ii) a porous layer on a surface of the polyethylene porous film, the porous layer containing a polyvinylidene fluoride-based resin (PVDF-HEP copolymer).

Example 2

An operation was conducted as in Example 1 except that the PVDF-HEP copolymer was replaced with a polyvinylidene fluoride (PVDF) resin to produce a laminated body including (i) a polyethylene porous film and (ii) a porous layer on a surface of the polyethylene porous film, the porous layer containing PVDF.

Example 3

An operation was conducted as in Example 1 except that the PVDF-HEP copolymer was replaced with CHEMIPEARL W401, a polyolefin aqueous dispersion available from Mitsui Chemicals, Inc. to produce a laminated body including (i) a polyethylene porous film and (ii) a porous layer on a surface of the polyethylene porous film, the porous layer containing CHEMIPEARL W401, a polyolefin aqueous dispersion available from Mitsui Chemicals, Inc.

Example 4

An operation was conducted as in Example 1 except that the polyethylene porous film in which (C)/(D)=0.08 was replaced as a base material with a polyethylene porous film having the average pore diameter (C) and porosity (D) shown in Table 1 below, where (C)/(D)=0.13, to produce a laminated body including (i) a polyethylene porous film and (ii) a porous layer on a surface of the polyethylene porous film, the porous layer containing a PVDF-HEP copolymer.

Comparative Example 1

An operation was conducted as in Example 1 except that the polyethylene porous film in which (C)/(D)=0.08 was replaced as a base material with a polyethylene porous film having the average pore diameter (C) and porosity (D) shown in Table 1 below, where (C)/(D)=0.18, to produce a laminated body including (i) a polyethylene porous film and (ii) a porous layer on a surface of the polyethylene porous film, the porous layer containing a PVDF-HEP copolymer.

Comparative Example 2

An operation was conducted as in Example 1 except that the PVDF-HEP copolymer was replaced with carboxymethyl cellulose (CMC) to produce a laminated body including (i) a polyethylene porous film and (ii) a porous layer on a surface of the polyethylene porous film, the porous layer containing CMC.

Comparative Example 3

An operation was conducted as in Example 1 except that the PVDF-HEP copolymer was replaced with CHEMIPEARL S300, a polyolefin aqueous dispersion available from Mitsui Chemicals, Inc. to produce a laminated body including (i) a polyethylene porous film and (ii) a porous layer on a surface of the polyethylene porous film, the porous layer containing CHEMIPEARL S300, a polyolefin aqueous dispersion available from Mitsui Chemicals, Inc.

Comparative Example 4

An operation was conducted as in Example 1 except that the PVDF-HEP copolymer was replaced with CHEMIPEARL S600, a polyolefin aqueous dispersion available from Mitsui Chemicals, Inc. to produce a laminated body including (i) a polyethylene porous film and (ii) a porous layer on a surface of the polyethylene porous film, the porous layer containing CHEMIPEARL S600, a polyolefin aqueous dispersion available from Mitsui Chemicals, Inc.

Comparative Example 5

An operation was conducted as in Example 1 except that the polyethylene porous film in which (C)/(D)=0.08 was replaced as a base material with a polyethylene porous film having the average pore diameter (C) and porosity (D) shown in Table 1 below, where (C)/(D)=0.16, to produce a laminated body including (i) a polyethylene porous film and (ii) a porous layer on a surface of the polyethylene porous film, the porous layer containing a. PVDF-HEP copolymer.

(Critical Surface Tension Test)

For each of the laminated bodies produced in Examples 1 to 6 and Comparative Examples 1 to 5, the measurement was made at 25° C. of respective contact angles θ of pure water and propylene carbonate as solvents with respect to the outermost surface of the porous layer (coating layer) of the laminated body. The measurement involved use of Drop Master 500, a contact angle measuring device available from Kyowa Interface Science Co., Ltd. The critical surface tension (A) was calculated on the basis of a Zisman plot of the measurement results. Another calculation was made through a similar method of the critical surface tension (B) over a surface of the porous film (base material) remaining after the porous layer (coating layer) had been peeled from the laminated body from which surface the porous layer (coating layer) had been peeled.

(Electrolyte Solution Permeation Test)

Figure 2:
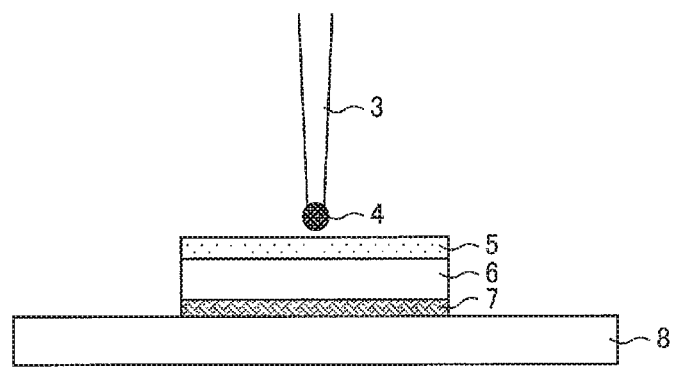
FIG. 2 is a diagram (Aspect 1 of the present invention) schematically illustrating a method of an electrolyte solution permeation test involving a laminated body of the present invention.
Figure 3:
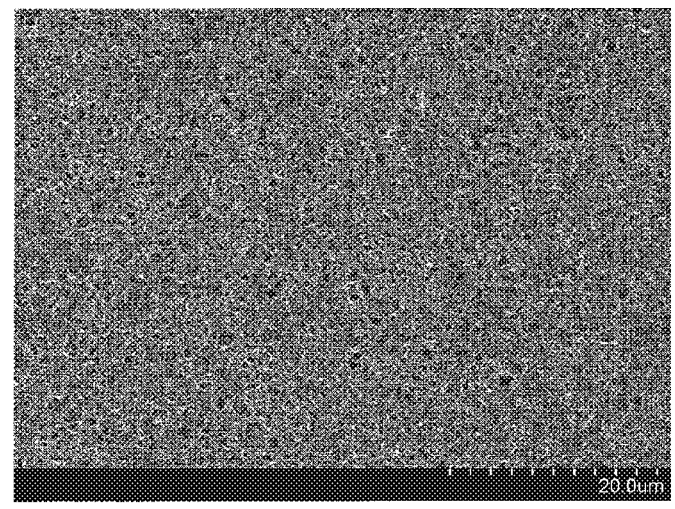
FIG. 3 is an image (Aspect 3 of the present invention) captured under a scanning electron microscope of a surface of a second porous layer of a laminated body of the present invention.
Figure 3:
Figure 3:
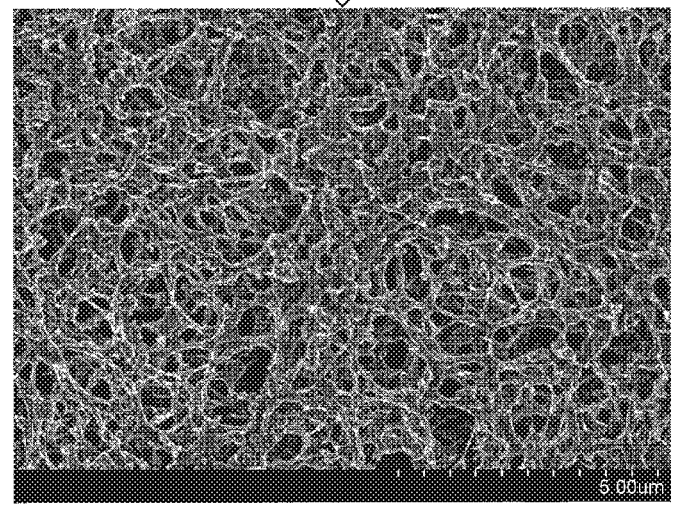
Figure 4:
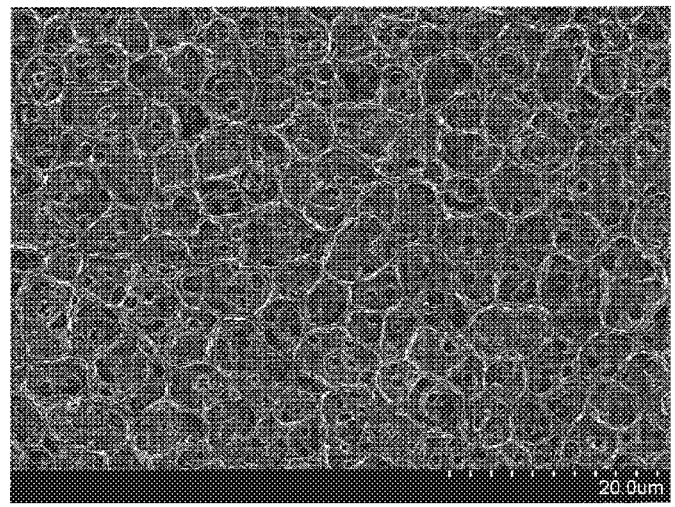
FIG. 4 is an image (Aspect 3 of the present invention) captured under a scanning electron microscope of a surface of a second porous layer of a conventional laminated body (Comparative Example 4).
Figure 4:
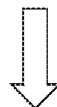
Figure 4:
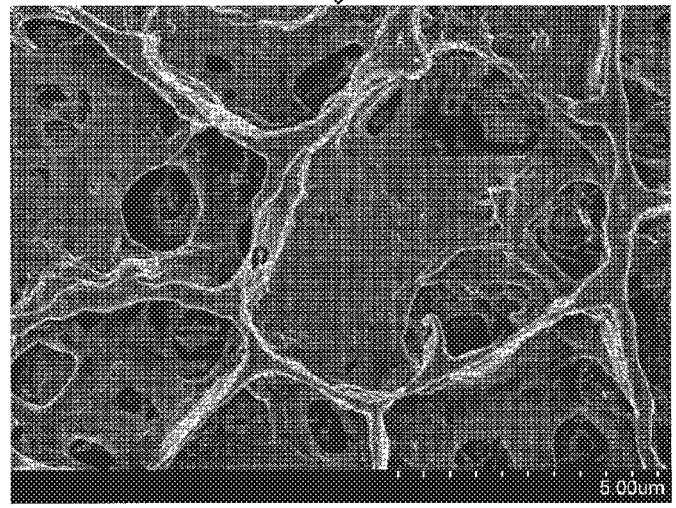

For each of the laminated bodies produced in Examples 1 to 4 and Comparative Examples 1 to 5, the laminated body was, as illustrated in FIG. 2, fixed to a glass plate with use of a double-sided tape with the porous layer at the top, and 2 μl of an electrolyte solution (diethyl carbonate (DEC)) was dropped onto the porous layer with use of a pipet at a dew point of −20° C. Then, a time period from the drop to disappearance of gloss over the surface of the liquid dropped was measured as a time period (hereinafter referred to as "time period of permeation") necessary for the electrolyte solution dropped to permeate through the inside of the laminated body.

(Measurement Results)

Table 1 shows, for each of the laminated bodies produced in Examples 1 to 4 and Comparative Examples 1 to 5, (i) the average pore diameter (C) and porosity (D) of the base material (porous film) used, (ii) the average pore diameter (C)/porosity (D), (iii) the critical surface tension (A) and critical surface tension (B) of the laminated body produced, (iv) the difference therebetween ((A)−(B)), and (v) the results of measurement of the time period of permeation.

TABLE 1

Properties of the base material (porous film) and laminated body, and the results of the permeation test

| | Base material (porous film) | | | Critical surface tension γe (mN/m) | | | Permeation test |
|---|---|---|---|---|---|---|---|
| | Average pore diameter (C) (μm) | Porosity (D) | Average pore diameter (C)/ porosity (D) | Coating layer (A) | Base material (B) after peel of coating layer | Difference (A) − (B) | Time period (s) of permeation |
| Example 1 | 0.035 | 0.44 | 0.08 | 40 | 27.8 | 12.2 | 21 |
| Example 2 | 0.035 | 0.44 | 0.08 | 40.2 | 35.3 | 4.9 | 21 |
| Example 3 | 0.035 | 0.44 | 0.08 | 29.7 | 14.3 | 15.4 | 22 |
| Example 4 | 0.040 | 0.30 | 0.13 | 39 | 20.1 | 18.9 | 28 |

TABLE 1-continued

Properties of the base material (porous film) and laminated body, and the results of the permeation test

| | Base material (porous film) | | | Critical surface tension γe (mN/m) | | | Permeation test |
|---|---|---|---|---|---|---|---|
| | Average pore diameter (C) (μm) | Porosity (D) | Average pore diameter (C)/ porosity (D) | Coating layer (A) | Base material (B) after peel of coating layer | Difference (A) − (B) | Time period (s) of permeation |
| Comparative Example 1 | 0.096 | 0.54 | 0.18 | 40.2 | 15.4 | 24.8 | 57 |
| Comparative Example 2 | 0.035 | 0.44 | 0.08 | 14.1 | 15.9 | −1.8 | 297 |
| Comparative Example 3 | 0.035 | 0.44 | 0.08 | 21.9 | 25.8 | −8.9 | 140 |
| Comparative Example 4 | 0.035 | 0.44 | 0.08 | 20.4 | 24.1 | −3.7 | 380 |
| Comparative Example 5 | 0.063 | 0.39 | 0.16 | 38.8 | 16.3 | 22.5 | 51 |

The laminated bodies produced in Examples 1 to 4 each satisfy the relation represented by the following Formula (1):

$$0 \text{ mN/nm} \leq (A)-(B) \leq 20 \text{ mN/m} \tag{1}$$

The laminated bodies produced in Comparative Examples 1 to 5, on the other hand, each fail to satisfy the relation represented by Formula (1) above.

The laminated bodies produced in Examples 1 to 4 and Comparative Examples 2 to 4 each satisfy the relation represented by the following Formula (2):

$$(C)/(D) \leq 0.13 \tag{2}$$

The laminated bodies produced in Example 6 and Comparative Examples 1 and 5, on the other hand, each fail to satisfy the relation represented by Formula (2) above.

Comparison between (i) the time period of permeation for each of the laminated bodies produced in Examples 1 to 4 and (ii) the time period of permeation for each of the laminated bodies produced in Comparative Examples 1 to 5 shows that the time period of permeation is shorter for each of the laminated bodies produced in Examples 1 to 4. This indicates that a laminated body that satisfies Formula (1) above is permeated more easily by an electrolyte solution than a laminated body that fails to satisfy Formula (1) above.

Comparison between (i) the time period of permeation for the laminated body produced in Example 1 and (ii) the time period of permeation for each of the laminated bodies produced in Example 4 and Comparative Examples 1 and 5, in each of which the porous film had (C)/(D) different from that of the porous film in Example 1 and in each of which the porous layer included a material identical to that of the porous layer in Example 1 indicates that in a case where the average pore diameter (C)/porosity (D) of the porous film has a smaller value, the time period of permeation is shorter, and the permeation of an electrolyte solution is easier.

Examples of Aspect 2 of Present Invention (Average Pore Diameter (C) of Porous Film)

The average pore diameter (C) was measured with use of a palm porometer available from PMI Co., Ltd. (model: CFP-1500A). The measurement involved, as a test liquid, GalWick (product name) available from PMI Co., Ltd. and was made of the following curves (i) and (ii) for the porous film:

(i) Pressure-flow rate curve for the porous film as immersed in the test liquid (ii) Pressure-flow rate curve, which is half the flow rate measured for the dry porous film The average pore diameter (C) of the porous film was calculated by Formula (3) below on the basis of the value of a pressure P corresponding to the point of intersection of the curves (i) and (ii).

$$(C)=4 \cos \theta r/P \tag{3}$$

In Formula (3) above, (C) represents the average pore diameter (μm), r represents the surface tension (N/m) of the test liquid, P represents the above-mentioned pressure (Pa) corresponding to the point of intersection, and θ represents the angle (°) of contact between the porous film and the test liquid.

(Porosity (D) of Porous Film)

A square piece with a 10 cm side was cut out from the porous film. The weight W (g) and thickness E (cm) of the piece cut out were then measured. The porosity (D) of the porous film was calculated by Formula (4) below on the basis of (i) the weight (W) and thickness (E) measured above and (ii) the true specific gravity ρ (g/cm$^3$) of the porous film.

$$\text{Porosity } (D)=1-\{(W/\rho)\}/(10 \times 10 \times E) \tag{4}$$

Production of Separator

Example 5

A fully aromatic polyamide (aramid resin) was dissolved in N-methylpyrrolidone at a concentration of 7% by weight, and alumina particles were dispersed therein to prepare a coating solution. This coating solution was applied to one surface of a polyethylene porous film (base material) having a thickness of 17 μm and the average pore diameter (C) and porosity (D) shown in Table 2 below, where (C)/(D)=0.08. The polyethylene porous film was then immersed in isopropyl alcohol to deposit a porous layer containing a resin in which alumina particles were dispersed in an aramid resin matrix. The polyethylene porous film, on a surface of which the porous layer was deposited, was then dried to produce a laminated body including (i) a polyethylene porous film and (ii) a porous layer on a surface of the polyethylene porous film, the porous layer containing a resin in which alumina particles were dispersed in an aramid resin matrix.

Example 6

An operation was conducted as in Example 5 except that the aramid resin and the alumina particle were replaced with a polyvinylidene fluoride-based resin (vinylidene fluoride-hexafluoropropylene (PVDF-HEP) copolymer) to produce a laminated body including (i) a polyethylene porous film and (ii) a porous layer on a surface of the polyethylene porous film, the porous layer containing a polyvinylidene fluoride-based resin (PVDF-HEP copolymer).

Example 7

An operation was conducted as in Example 6 except that the polyethylene porous film in which (C)/(D)=0.08 was replaced as a base material with a polyethylene porous film having the average pore diameter (C) and porosity (D) shown in Table 2 below, where (C)/(D)=0.13, to produce a laminated body including (i) a polyethylene porous film and (ii) a porous layer on a surface of the polyethylene porous film, the porous layer containing a polyvinylidene fluoride-based resin (PVDF-HEP copolymer).

Comparative Example 6

An operation was conducted as in Example 6 except that the polyethylene porous film in which (C)/(D)=0.08 was replaced as a base material with a polyethylene porous film having the average pore diameter (C) and porosity (D) shown in Table 2 below, where (C)/(D)=0.16, to produce a laminated body including (i) a polyethylene porous film and (ii) a porous layer on a surface of the polyethylene porous film, the porous layer containing a polyvinylidene fluoride-based resin (PVDF-HEP copolymer).

Comparative Example 7

An operation was conducted as in Example 6 except that the polyethylene porous film in which (C)/(D)=0.08 was replaced as a base material with a polyethylene porous film having the average pore diameter (C) and porosity (D) shown in Table 2 below, where (C)/(D)=0.18, to produce a laminated body including (i) a polyethylene porous film and (ii) a porous layer on a surface of the polyethylene porous film, the porous layer containing a polyvinylidene fluoride-based resin (PVDF-HEP copolymer).

Comparative Example 8

First, 25 parts by weight of alumina (AKP3000 available from Sumitomo Chemical Co., Ltd.) was added to 100 parts by weight of a sodium carboxymethylcellulose (CMC, Serogen 3H available from Dai-Ichi Kogyo Seiyaku Co., Ltd.) solution (CMC concentration: 0.70% by weight) prepared by dissolving CMC in 20% by weight of an ethanol aqueous solution and mixed therein to prepare a coating solution. This coating solution was applied to one surface of a polyethylene porous film (base material) having the average pore diameter (C) and porosity (D) shown in Table 2 below, where (C)/(D)=0.18, and was then dried to produce a laminated body including (i) a polyethylene porous film and (ii) a porous layer on a surface of the polyethylene porous film, the porous layer containing alumina and CMC.

Comparative Example 9

An operation was conducted as in Comparative Example 8 except that the polyethylene porous film in which (C)/(D) =0.18 was replaced as a base material with a polyethylene porous film having the average pore diameter (C) and porosity (D) shown in Table 2 below, where (C)/(D)=0.08, to produce a laminated body including (i) a polyethylene porous film and (ii) a porous layer on a surface of the polyethylene porous film, the porous layer containing alumina and CMC.

(Dielectric Strength Test)

For each of the laminated bodies produced in Examples 5 to 7 and Comparative Examples 6 to 9, the respective dielectric strengths of the porous layer and the porous film were tested with use of IMP3800K, an impulse insulation tester available from Nippon Technart Inc., through the following procedure:

(i) Inserted a laminated body as a measurement target between an upper cylinder electrode with a diameter of $\phi 25$ mm and a lower cylinder electrode with a diameter of $\phi 75$ mm.

(ii) Stored electric charge in a capacitor inside the device to apply a voltage increasing linearly from 0 V to the laminated body between the upper and lower electrodes electrically connected to the inside capacitor.

(iii) Continued applying the voltage until a dielectric breakdown occurred (that is, until a voltage drop was detected), and measured, as a dielectric breakdown voltage, the voltage at which the voltage drop had been detected.

(iv) Plotted dielectric breakdown voltages with respect to the weight per unit area of the resin in the porous layer of the laminated body, and calculated the dielectric strengths from the inclination of a straight line as a result of linear approximation.

(Withstand Voltage Defect Count Determining Test)

For each of the laminated bodies produced in Examples 5 to 7 and Comparative Examples 6 to 9, the laminated body was cut into a 13 cm×13 cm piece, and a withstand voltage test was conducted on that piece with use of withstand voltage tester TOS-9201 available from Kikusui Electronics Corp. The withstand voltage test was conducted under the following conditions:

(i) Inserted a laminated body as a measurement target between an upper cylinder electrode with a diameter of $\phi 225$ mm and a lower cylinder electrode with a diameter of $\phi 75$ mm.

(ii) Raised the voltage between the electrodes at a voltage rise rate of 40 V/s to 800 V and kept the voltage (800 V) for 60 seconds.

(iii) Conducted a withstand voltage test at 25 positions in the same laminated body through a method similar to the method described in (i) and (ii).

(iv) Photographed the laminated body with use of a digital still camera after the withstand voltage test described in (iii).

(v) Inputted data on the photograph taken in (iv) into a personal computer and determined the count of withstand voltage defects with use of IMAGEJ, free image analysis software issued by the National Institutes of Health (NIH), to calculate the number of deficient portions.

(Measurement Results)

Table 2 shows, for each of the laminated bodies produced in Examples 5 to 7 and Comparative Examples 6 to 9, (i) the average pore diameter (C) and porosity (D) of the base material (porous film) used, (ii) the average pore diameter (C)/porosity (D), (iii) the dielectric strength (A) of the porous layer of the laminated body produced, (iv) the dielectric strength (B) of the porous film of the laminated body produced, and (v) the results of measurement of the withstand voltage defect count determining test.

TABLE 2

Properties of the base material (porous film) and laminated body, and the
results of the withstand voltage defect count determining test

| | Base material (porous film) | | | Dielectric strength test (V · m²/s) | | Withstand voltage test defect |
|---|---|---|---|---|---|---|
| | Average pore diameter (C) (μm) | Porosity (D) | Average pore diameter (C)/porosity (D) | Dielectric strength (A) of porous layer | Dielectric strength (B) of porous polyolefin film | Number of deficiencies |
| Example 5 | 0.035 | 0.44 | 0.08 | 690 | 176 | 3 |
| Example 6 | 0.035 | 0.44 | 0.08 | 270 | 176 | 5 |
| Example 7 | 0.040 | 0.30 | 0.13 | 270 | 175 | 22 |
| Comparative Example 6 | 0.063 | 0.39 | 0.16 | 270 | 176 | 36 |
| Comparative Example 7 | 0.096 | 0.54 | 0.18 | 270 | 254 | 77 |
| Comparative Example 8 | 0.096 | 0.54 | 0.18 | 21 | 254 | 200 |
| Comparative Example 9 | 0.035 | 0.44 | 0.08 | 21 | 176 | 46 |

Comparison between (i) Examples 6 and 7 and (ii) Comparative Examples 6 and 7 shows that among laminated bodies with respective dielectric strengths close to each other, a laminated body with a smaller value of (C)/(D) has fewer deficient portions during a withstand voltage test, in particular, a laminated body in which (C)/(D) returns 0.13 or less has 30 or less deficient portions, which falls within the preferable range.

Comparison between (i) Examples 5 to 7 and (ii) Comparative Examples 7 and 8 shows that a laminated body that satisfies Formula (1) below has fewer deficient portions than a laminated body that fails to satisfy Formula (1).

$$(A) > (B) \quad (1)$$

Comparison between (i) Example 5 and (ii) Examples 6 and 7 shows that the laminated body produced in Example 5 and satisfying (A)>2×(B) has far fewer deficient portions than the respective laminated bodies produced in Examples 6 and 7 and each failing to satisfy (A)>2×(B).

Examples of Aspect 3 of Present Invention

In Examples, Comparative Examples, and Reference Example below, physical properties such as moisture-absorption characteristics and curl characteristics of a laminated body were measured through the following method.

(1) Moisture-absorption characteristics of laminated body
Water content rate of laminated body:
A laminated body was cut into three square pieces each measuring 8 cm×8 cm, which were then allowed to remain, for one day, (i) at room temperature and (ii) with a dew point set to 20° C. and −30° C. Then, with use of a trace moisture measurement device (manufactured by Mitsubishi Chemical Analytech Co., Ltd.; CA-200, VA-230), the laminated body was heated to 150° C. at a flow rate of 200 mL/min under a nitrogen airflow. Then, a water content detected was measured. A proportion of the water content to a total weight of the laminated body before the heating at 150° C. was obtained as a water content rate (% by mass).

Water content rate difference:
A water content rate difference was defined as a value obtained by subtracting the water content rate at a dew point of −30° C. from the water content rate at a dew point of 20° C.

Water content difference at certain dew point between polyolefin porous film (first porous layer) and coating film (second porous layer):

A polyolefin weight or a coating film weight per square meter is integrated in each of the water content rate of the polyolefin porous film and the water content rate of the coating film at a dew point of 20° C., so that respective water content rates of the polyolefin porous film and of the coating film per square meter were calculated. Then, an absolute value of a difference between the respective water content rates was regarded as a water content difference between the polyolefin porous film and the coating film.

(2) Measurement of area of opening sections of surface of second porous layer, each of which opening sections is pore of 0.5 μm² or more
With use of a scanning electron microscope (manufactured by Hitachi High-Technologies Corporation, SU1510), a surface of the second porous layer was observed with a magnification of 2000. Then, with use of free image analysis software "IMAGEJ" developed by the National Institutes of Health (NIH: National Institutes of Health), the surface was divided at a luminance at which the pores were detectable. Luminance holes were filled so that all areas inside the pores were detectable as pore areas. Then, all pores, which fall in a measurement range and each of which has an area of 0.5 μm² or more, were detected, and a total area of the pores thus detected was calculated. Then, a proportion of the pores, each of which has an area of 0.5 μm² or more, with respect to all the area of the measurement range was calculated.

(3) Curl measurement
A laminated body was cut into a square piece measuring 8 cm×8 cm, and the square piece was allowed to remain, for one day, (i) at room temperature and (ii) with a dew point set to −30° C. Then, a height, by which end parts were lifted, was measured. An appearance was also assessed according to the following criteria. Note that a state C indicates a state in which the square piece was completely curled. States A and B are preferable, and the state A is most preferable.

A: No end parts were lifted.
B: Although the ends parts were lifted, a large part of the square piece other than the end parts was not lifted but was flat.
C: Both end parts were so close to each other that the square piece was rolled in so as to have a tubular form.

Example 8

A PVDF-based resin (manufactured by Arkema Inc.; product name "KYNAR2801") was stirred and dissolved in N-methyl-2-pyrrolidone (hereinafter also referred to as "NMP") at 65° C. for 30 minutes so that a solid content was 7% by mass. A resultant solution was applied as a coating solution to a polyethylene porous film (thickness 17 µm, porosity 36%) through a doctor blade method so as to weigh 1.0 g per square meter of PVDF-based resin in the coating solution. A laminated body, which was an applied material obtained, was immersed in 2-propanol while the coating film remained wet with NMP, and then was allowed to stand at 25° C. for 5 minutes, so that a deposited porous film (1-i) was obtained. While the deposited porous film (1-i) thus obtained was in an immersion solvent wet state, the deposited porous film (1-i) was further immersed in another 2-propanol, and then was allowed to stand at 25° C. for 5 minutes, so that a deposited porous film (1-ii) was obtained. The deposited porous film (1-ii) thus obtained was dried at 65° C. for 5 minutes, so that a coating separator (1) was obtained. The evaluation results of the coating separator (1) are shown in Table 3. Note that a second porous layer of the coating separator (1) had a structure in which skeletons each having a diameter of 1 µm or less are bonded to each other in a three-dimensional network.

Example 9

A coating separator (2) was obtained through a method similar to that employed in Example 8 except that a PVDF-based resin content per square meter in a coating solution was changed to 3.0 g. The evaluation results of the coating separator (2) are shown in Table 3. Note that a second porous layer of the coating separator (2) had a structure in which skeletons each having a diameter of 1 µm or less are bonded to each other in a three-dimensional network.

Comparative Example 10

To a mixture of 100 parts by weight of alumina fine particles (manufactured by Sumitomo Chemical Co., Ltd.; product name "AKP3000f") and 3 parts by weight of carboxymethyl cellulose (manufactured by Daicel Fine-Chem Ltd.; model No. 1110), water was added so that a solid content was 29% by mass. With use of a planetary centrifugal mixer "AWATORI RENTARO" (manufactured by Thinky Corporation;®), a resultant mixture was stirred and mixed twice at 2000 rpm for 30 seconds at room temperature. To a resultant mixture, 14 parts by mass of 2-propanol was added and mixed, so that a coating solution having 28% by mass of solid content was obtained. Through a doctor blade method, a resultant coating solution was applied to a polyethylene porous film (thickness 17 µm, porosity 36%), which has been subjected to a corona treatment at 20 W/(m²/minute), so that a weight sum of alumina fine particles in the coating solution and the carboxymethyl cellulose was 7.0 g per square meter. A laminated body, which was an applied material obtained, was dried at 65° C. for 5 minutes, so that a deposited porous film (3) was obtained. The evaluation results of the deposited porous film (3) thus obtained are shown in Table 3, Note that a second porous layer of the deposited porous film (3) did not have a structure in which skeletons each having a diameter of 1 µm or less are bonded to each other in a three-dimensional network.

Comparative Example 11

In a mixed solvent of dimethylacetamide and tripropylene glycol mixed at a ratio of 7/3 [WR], a PVDF-based resin (manufactured by Arkena Inc.; product name "KYNAR2801.") was stirred and dissolved at 65° C. for 30 minutes so that a solid content was 7% by mass. A resultant solution was applied as a coating solution to a polyethylene porous film (thickness 17 µm, porosity 36%) through a doctor blade method so as to weigh 1.0 g per square meter of the PVDF-based resin in the coating solution. A laminated body, which was an applied material obtained, was immersed, while the coating film remained in a mixed solvent wet state, in a mixture of water, dimethylacetamide, and tripropylene glycol mixed at a ratio of 57/30/13 [WR]. Then, the laminated body was allowed to stand at 25° C. for 5 minutes, so that a deposited porous film (2-i) was obtained. While the deposited porous film (2-i) thus obtained was in an immersion solvent wet state, the deposited porous film (2-i) was further immersed in another 2-propanol, and was allowed to stand at 25° C. for 5 minutes, so that a deposited porous film (2-ii) was obtained. The deposited porous film (2-ii) thus obtained was dried at 65° C. for 5 minutes, so that at a coating separator (4) was obtained. The evaluation results of the coating separator (4) thus obtained are shown in Table 3. Note that a second porous layer of the coating separator (4) had a structure in which skeletons each having a diameter of 1 µm or less are bonded to each other in a three-dimensional network.

Comparative Example 12

A coating separator (5) was obtained through a method similar to that employed in Comparative Example 11 except that a deposited porous film (2-ii) was dried at 65° C. for 1 hour. The evaluation results of the coating separator (5) thus obtained are shown in Table 3. Note that a second porous layer of the coating separator (5) had a structure in which skeletons each having a diameter of 1 µm or less are bonded to each other in a three-dimensional network.

Comparative Example 13

In a mixed solvent of acetone (good solvent), 2-propanol (poor solvent), and water mixed at a ratio of 130/10/5 [WR], a PVDF-based resin (manufactured by Arkema Inc.; product name "KYNAR2801") was stirred and dissolved at 40° C. for 30 minutes so that a solid content was 7% by mass. A resultant solution was applied as a coating solution to a polyethylene porous film (thickness 17 µm, porosity 36%) through a doctor blade method so as to weigh 1.0 g per square meter of the PVDF-based resin in the coating solution. A laminated body, which was an applied material obtained, was dried at 25° C. for 5 minutes in a box in which a humidity was adjusted to 40%, so that a coating separator (6) was obtained. The evaluation results of the coating separator (6) thus obtained are shown in Table 3.

Reference Example 1

The evaluation results of each of the polyethylene porous films used in Examples 8 and 9 and Comparative Examples 10, 11, and 12 are shown in Table 3.

TABLE 3

| | Separator water content rate (wtppm) | | Water content rate difference (wtppm) | Water content difference at dew point of 20° C. between first porous layer and second porous layer (mg/m²) | Proportion of pores, each of which has area of 0.5 μm² or more, with respect to surface of second porous layer | Curl |
|---|---|---|---|---|---|---|
| | dew point −30° C. | dew point 20° C. | | | | |
| Example 8 | 161 | 445 | 284 | 4 | 3% | A |
| Example 9 | 253 | 577 | 324 | 2 | 26% | A |
| Comparative Example 10 | 926 | 2632 | 1706 | 35 | — | C |
| Comparative Example 11 | 132 | 4946 | 4794 | 46 | — | C |
| Comparative Example 12 | 88 | 2215 | 2127 | 16 | — | B |
| Comparative Example 13 | 60 | 579 | 519 | 3 | 61% | B |
| Reference Example | 33 | 450 | 417 | — | — | A |

Examples of Aspect 4 of the Present Invention

<Production of Separator>

Nonaqueous secondary battery separators in accordance with Examples 10 through 13 and Comparative Examples 14 through 18 were produced as follows.

Example 10

A PVDF-based resin (manufactured by Arkema Inc.; product name "KYNAR2801") was stirred and dissolved in N-methyl-2-pyrrolidone (NMP) at 65° C. for 30 minutes so that a solid content was 7% by mass. A resultant solution was applied as a coating solution to a polyethylene porous base material (thickness 12 μm, porosity 0.44 (44% by volume), average pore diameter (C)/porosity (D)=0.08) through a doctor blade method so as to weigh 1.0 g per square meter of PVDF-based resin in the coating solution. An applied material obtained was immersed in 2-propanol while the coating film remained wet with NMP, and then was allowed to stand at 25° C. for 5 minutes, so that a laminated porous film (1-i) was obtained. While the laminated porous film (1-i) thus obtained was in an immersion solvent wet state, the laminated porous film (1-i) was further immersed in another 2-propanol, and then was allowed to stand at 25° C. for 5 minutes, so that a laminated porous film (1-ii) was obtained. The laminated porous film (1-ii) thus obtained was dried at 65° C. for 5 minutes, so that a nonaqueous secondary battery separator in accordance with Example 10 was obtained.

The nonaqueous secondary battery separator in accordance with Example 10 was immersed for 24 hours in an electrolyte solution at 25° C. which was obtained by dissolving $LiPF_6$ with a concentration of 1.0 mole per liter in a mixed solvent of ethyl methyl carbonate, diethyl carbonate, and ethylene carbonate in a volume ratio of 50:20:30. After the immersion for 24 hours, in the porous layer including the PVDF-based resin, the resin having absorbed the electrolyte solution had a volume of 0.8 cm³ per square meter of the porous layer.

Example 11

The nonaqueous secondary battery separator in accordance with Example 11 was obtained under the same conditions as those for Example 10 except that the porous base material in Example 10 was replaced with a different polyethylene porous base material (thickness 9 μm, porosity 0.35 (35% by volume), average pore diameter (C)/porosity (D)=0.13).

The nonaqueous secondary battery separator in accordance with Example 11 was immersed for 24 hours in an electrolyte solution at 25° C. which was obtained by dissolving $LiPF_6$ with a concentration of 1.0 mole per liter in a mixed solvent of ethyl, methyl carbonate, diethyl carbonate, and ethylene carbonate in a volume ratio of 50:20:30. After the immersion for 24 hours, in the porous layer including the PVDF-based resin, the resin having absorbed the electrolyte solution had a volume of 0.8 cm³ per square meter of the porous layer.

Example 12

A nonaqueous secondary battery separator in accordance with Example 12 was produced under the same condition as those for Example 10 except that the PVDF-based resin (manufactured by Arkema Inc.; product name "KYNAR2801") was replaced with another PVDF-based resin (manufactured by Arkema Inc.; product name "KYNAR2500").

The nonaqueous secondary battery separator in accordance with Example 12 was immersed for 24 hours in an electrolyte solution at 25° C. which was obtained by dissolving $LiPF_6$ with a concentration of 1.0 mole per liter in a mixed solvent of ethyl methyl carbonate, diethyl, carbonate, and ethylene carbonate in a volume ratio of 50:20:30. After the immersion for 24 hours, in the porous layer including the PVDF-based resin, the resin having absorbed the electrolyte solution had a volume of 1.3 cm³ per square meter of the porous layer.

Example 13

A nonaqueous secondary battery separator in accordance with Example 13 was produced under the same conditions as those for Example 10 except that the PVDF-based resin (manufactured by Arkema Inc.; product name "KYNAR2801") was replaced with a resin obtained by mixing the PVDF-based resin (manufactured by Arkema Inc.; product name "KYNAR2801") and ethylene-vinyl acetate copolymer-based resin in a ratio of 70:30.

The nonaqueous secondary battery separator in accordance with Example 13 was immersed for 24 hours in an electrolyte solution at 25° C. which was obtained by dissolving LiPF$_6$, with a concentration of 1.0 mole per liter in a mixed solvent of ethyl methyl carbonate, diethyl carbonate, and ethylene carbonate in a volume ratio of 50:20:30. After the immersion for 24 hours, in the porous layer including the PVDF-based resin and the ethylene-vinyl acetate copolymer-based resin, the resin having absorbed the electrolyte solution had a volume of 4.3 cm$^3$ per square meter of the porous layer.

Comparative Example 14

A nonaqueous secondary battery separator in accordance with Example 14 was produced under the same conditions as those for Example 10 except that the porous base material of Example 10 was replaced with a different polyethylene porous base material (thickness 16 μm, porosity 0.39 (39% by volume), average pore diameter (C)/porosity (D)=0.16).

The nonaqueous secondary battery separator in accordance with Comparative Example 14 was immersed for 24 hours in an electrolyte solution at 25° C. which was obtained by dissolving LiPF$_6$ with a concentration of 1.0 mole per liter in a mixed solvent of ethyl methyl carbonate, diethyl carbonate, and ethylene carbonate in a volume ratio of 50:20:30. After the immersion for 24 hours, in the porous layer including the PVDF-based resin, the resin having absorbed the electrolyte solution had a volume of 0.8 cm$^3$ per square meter of the porous layer.

Comparative Example 15

A nonaqueous secondary battery separator in accordance with Comparative Example 15 was produced under the same conditions as those for Example 10 except that the porous base material of Example 10 was replaced with a different polyethylene porous film (thickness 17 μm, porosity 0.54 (54% by volume), average pore diameter (C)/porosity (D)=0.18).

The non aqueous secondary battery separator in accordance with Comparative Example 15 was immersed for 24 hours in an electrolyte solution at 25° C. which was obtained by dissolving LiPF$_6$ with a concentration of 1.0 mole per liter in a mixed solvent of ethyl methyl carbonate, diethyl carbonate, and ethylene carbonate in a volume ratio of 50:20:30. After the immersion for 24 hours, in the porous layer including the PVDF-based resin, the resin having absorbed the electrolyte solution had a volume of 0.8 cm$^3$ per square meter of the porous layer.

Comparative Example 16

A nonaqueous secondary battery separator in accordance with Example 16 was produced under the same conditions as those for Example 10 except that the PVDF-based resin (manufactured by Arkema Inc.; product name "KYNAR2801") was replaced with a resin obtained by mixing the PVDF-based resin (manufactured by Arkema Inc.; product name "KYNAR2801") and ethylene-vinyl acetate copolymer-based resin in a ratio of 55:45.

The nonaqueous secondary battery separator in accordance with Comparative Example 16 was immersed for 24 hours in an electrolyte solution at 25° C. which was obtained by dissolving LiPF$_6$ with a concentration of 100 mole per liter in a mixed solvent of ethyl methyl carbonate, diethyl carbonate, and ethylene carbonate in a volume ratio of 50:20:30. After the immersion for 24 hours, in the porous layer including the PVDF-based resin and the ethylene-vinyl acetate copolymer-based resin, the resin having absorbed the electrolyte solution had a volume of 6 cm$^3$ per square meter of the porous layer.

Comparative Example 17

A nonaqueous secondary battery separator in accordance with Comparative Example 17 was produced under the same conditions as those for Example 10 except that the PVDF-based resin (manufactured by Arkema Inc.; product name "KYNAR2801") was replaced with ethylene-vinyl acetate copolymer-based resin.

The nonaqueous secondary battery separator in accordance with Comparative Example 17 was immersed for 24 hours in an electrolyte solution at 25° C. which was obtained by dissolving LiPF$_6$ with a concentration of 1.0 mole per liter in a mixed solvent of ethyl methyl carbonate, diethyl carbonate, and ethylene carbonate in a volume ratio of 50:20:30. After the immersion for 24 hours, in the porous layer including the ethylene-vinyl acetate copolymer-based resin, the resin having absorbed the electrolyte solution had a volume of 12 cm$^3$ per square meter of the porous layer.

Comparative Example 18

A nonaqueous secondary battery separator in accordance with Example 18 was produced under the same conditions as those for Example 1.0 except that solid content concentration of the PVDF-based resin (manufactured by Arkema Inc.; product name "KYNAR2801") was set to 0.3% by mass.

The nonaqueous secondary battery separator in accordance with Comparative Example 18 was immersed for 24 hours in an electrolyte solution at 25° C. which was obtained by dissolving LiPF$_6$ with a concentration of 1.0 mole per liter in a mixture solvent of ethyl methyl carbonate, diethyl carbonate, and ethylene carbonate in a volume ratio of 50:20:30. After the immersion for 24 hours, in the porous layer including the PVDF-based resin, the resin having absorbed the electrolyte solution had a volume of 0.03 cm$^3$ per square meter of the porous layer.

<Production of Nonaqueous Electrolyte Secondary Battery>

Next, using the nonaqueous secondary battery separators in accordance with Examples 10 through 13 and Comparative Examples 14 through 18 which were produced as above, nonaqueous secondary batteries were produced as follows.

(Cathode)

A commercially available cathode which was produced by applying LiNi$_{0.5}$Mn$_{0.3}$Co$_{0.2}$O$_2$/conductive material/PVDF (weight ratio 92/5/3) to an aluminum foil was used. The aluminum foil of the cathode was cut so that a portion of the cathode where a cathode active material layer was formed had a size of 40 mm×35 mm and a portion where the cathode active material layer was not formed, with a width of 13 mm, remained around that portion. The cathode active material layer had a thickness of 58 μm and density of 2.50 g/cm$^3$.

(Anode)

A commercially available anode produced by applying graphite/styrene-1,3-butadiene copolymer/carboxymethyl cellulose sodium (weight ratio 98/1/1) to a copper foil was used. The copper foil of the anode was cut so that a portion of the anode where an anode active material layer was formed had a size of 50 mm×40 mm, and a portion where the anode active material layer was not formed, with a width of 13 mm, remained around that portion. The anode active material layer had a thickness of 49 μm and density of 1.40 g/cm³.

(Assembly)

In a laminate pouch, the cathode, the nonaqueous secondary battery separator, and the anode were laminated (provided) in this order so as to obtain a nonaqueous electrolyte secondary battery member. In this case, the cathode and the anode were positioned so that a whole of a main surface of the cathode active material layer of the cathode was included in a range of a main surface (overlapped the main surface) of the anode active material layer of the anode.

Subsequently, the nonaqueous electrolyte secondary battery member was put in a bag made by laminating an aluminum layer and a heat seal layer, and 0.25 mL of a nonaqueous electrolyte solution was poured into the bag. The nonaqueous electrolyte solution was an electrolyte solution at 25° C. obtained by dissolving $LiPF_6$ with a concentration of 1.0 mole per liter in a mixed solvent of ethyl methyl carbonate, diethyl carbonate, and ethylene carbonate in a volume ratio of 50:20:30. The bag was heat-sealed while a pressure inside the bag was reduced, so that a nonaqueous secondary battery was produced.

The nonaqueous secondary battery could be produced by the above method using the nonaqueous secondary battery separators in accordance with Examples and Comparative Examples other than Comparative Example 18. However, in the case of the nonaqueous secondary battery separator in accordance with Comparative Example 18, the separator did not adhere to the electrode, and consequently the nonaqueous secondary battery could not be produced. As above, it was confirmed that the nonaqueous secondary battery separator in accordance with Comparative Example 18, in which in the porous layer after being immersed in the electrolyte solution, the resin having absorbed the electrolyte solution had a volume of less than 0.05 cm³, could not secure adhesiveness to the electrode. On the other hand, it was confirmed that in the cases of the nonaqueous secondary battery separators in accordance with Examples 10 through 13 and Comparative Examples 14 through 17 other than Comparative Example 18, in the porous layer after being immersed in the electrolyte solution, the resin having absorbed the electrolyte solution had a volume of not less than 0.05 cm³ per square meter of the porous layer, and consequently the nonaqueous secondary battery separators in accordance with Examples 10 through 13 and Comparative Examples 14 through 17 could secure adhesiveness to the electrode.

<Cyclic Test>

A new nonaqueous secondary battery which had not been subjected to any cycle of charge/discharge was subjected to 4 cycles of initial charge/discharge. Each cycle of the initial charge/discharge was performed under conditions that the temperature was 25° C., the voltage range was 4.1 to 2.7 V, and the current value was 0.2 C (1 C is defined as a value of a current at which a rated capacity based on a discharge capacity at 1 hour rate is discharged for 1 hour. The same is applied hereinafter).

Subsequently, an initial battery characteristic maintaining ratio at 55° C. was calculated in accordance with a formula below.

Initial battery characteristic maintaining ratio (%)= (discharge capacity at 20 C/discharge capacity at 0.2 C)×100

Subsequently, the nonaqueous secondary battery was subjected to 100 cycles of charge/discharge. Each cycle of the charge/discharge was performed under conditions that the temperature was 55° C., charge/discharge started from a 50% charge state, constant currents were a charge current value of 1.0 C and a discharge current value of 10 C, and a charge/discharge capacity was 4 mAh. Then, a battery characteristic maintaining ratio after 100 cycles was calculated in accordance with a formula below.

Battery characteristic maintaining ratio (%)=(discharge capacity at 20 C at 100th cycle/discharge capacity at 0.2 C at 100th cycle)×100

The result is shown in Table 4.

TABLE 4

| | Volume of resin having absorbed electrolyte solution per square meter of porous layer after being immersed in electrolyte solution (cm³) | Average pore diameter (C)/ Porosity (D) of porous base material | Initial battery characteristic maintaining ratio (%) | Battery characteristic maintaining ratio (%) after 100 cycles |
|---|---|---|---|---|
| Example 10 | 0.8 | 0.08 | 73 | 65 |
| Example 11 | 0.8 | 0.12 | 64 | 54 |
| Example 12 | 1.3 | 0.08 | 76 | 73 |
| Example 13 | 4.3 | 0.08 | 64 | 62 |
| Comparative Example 14 | 0.8 | 0.16 | 46 | 31 |
| Comparative Example 15 | 0.8 | 0.18 | 59 | 40 |
| Comparative Example 16 | 6 | 0.08 | 33 | 27 |
| Comparative Example 17 | 12 | 0.08 | 37 | 31 |

As shown in Table, it was confirmed that the nonaqueous secondary batteries using the nonaqueous secondary battery separators in accordance with Comparative Examples 16 and 17, in which in the porous layer after being immersed in the electrolyte solution, the resin having absorbed the electrolyte solution per square meter of the porous layer had a volume of more than 5.00 cm³, had low initial battery characteristic maintaining ratio of less than 60% and low battery characteristic maintaining ratio after 100 cycles of not more than 40%. Furthermore, it was confirmed that the nonaqueous secondary batteries using the nonaqueous secondary battery separators in accordance with Comparative Examples 14 and 15 in which the porous base material had an average pore diameter (D)/porosity (C) of more than 0.13 had lower initial battery characteristic maintaining ratio of less than 37% and lower battery characteristic maintaining ratio after 100 cycles of not more than 31%.

In contrast, the nonaqueous secondary batteries using the nonaqueous secondary battery separators in accordance with Examples 10 through 13, in which in the porous layer after being immersed in the electrolyte solution, the resin having absorbed the electrolyte solution had a volume of 0.05 to 5.00 cm$^3$ per square meter of the porous layer and the porous base material had average pore diameter (D)/porosity (C) of not more than 0.13, had initial battery characteristic maintaining ratio of not less than 60% and battery characteristic maintaining ratio after 100 cycles of not less than 50%, and thus could subdue a decrease in the cycle characteristics.

INDUSTRIAL APPLICABILITY

Aspect 1 of Present Invention

The present invention relates to a laminated body and a nonaqueous electrolyte secondary battery separator including the laminated body. The nonaqueous electrolyte secondary battery separator of the present invention has improved liquid injection easiness for an electrolyte solution during assembly of a nonaqueous electrolyte secondary battery, and shortens the time period of a step of injecting an electrolyte solution into the battery. The nonaqueous electrolyte secondary battery separator of the present invention therefore requires a shorter time period for assembly of a battery, and allows a nonaqueous electrolyte secondary battery to be produced with excellent productivity.

Aspect 2 of Present Invention

The porous layer for the present invention and a laminated body including the porous layer may each be used broadly in the field of production of a nonaqueous electrolyte secondary battery.

Aspect 3 of the Present Invention

The present invention may be used broadly in the field of production of a nonaqueous electrolyte secondary battery.

Aspect 4 of the Present Invention

The present invention may be used broadly in the field of production of a nonaqueous secondary battery.

REFERENCE SIGNS LIST 1 porous layer containing a resin
2 porous film containing a polyolefin as a main component
3 pipet
4 electrolyte solution
5 porous layer
6 porous film
7 double-sided tape
8 glass plate

The invention claimed is:

1. A separator for a nonaqueous electrolyte lithium secondary battery which separator is disposed between a cathode and an anode both for the nonaqueous electrolyte lithium secondary battery and which separator is used in an electrolytic solution containing a solvent prepared by mixing cyclic carbonate and chain carbonate at a mass ratio within a range of 20:80 to 40:60,
the cyclic carbonate being ethylene carbonate, propylene carbonate, fluoroethylene carbonate, difluoroethylene carbonate, or a mixture of two or more thereof,
the chain carbonate being dimethyl carbonate, diethyl carbonate, ethyl methyl carbonate, a fluorine substituent thereof, or a mixture of two or more thereof,
the separator comprising:
a porous base material containing a polyolefin as a main component; and
a porous layer laminated on at least one surface of the porous base material, the porous layer containing a polyvinylidene fluoride-based resin,
the separator satisfying $(C)/(D) \leq 0.13$, where
(C) represents an average pore diameter of the porous base material, the average pore diameter (C) having a value in μm indicative of a mean value of respective sizes of pores in the porous base material, and
(D) represents a porosity of the porous base material, the porosity (D) having a value indicative of a proportion ((F)/(E)) of a volume (F) of void in the actual porous base material with reference to a volume (E) of the porous base material assumed to have no void,
the polyvinylidene fluoride-based resin accounting for 70% or more by mass of a resin component of the porous layer,
the polyvinylidene fluoride-based resin containing vinylidene fluoride at a proportion of 95 mol % or more in terms of structure units,
an applied amount of the porous layer on one surface of the porous base material being within a range of 0.5 to 1.5 g/m$^2$,
in the porous layer after being immersed for 24 hours in an electrolyte solution having a temperature of 25° C. in which electrolyte solution LiPF$_6$ having a concentration of 1.0 mole per liter is dissolved in a mixed solvent containing ethyl methyl carbonate, diethyl carbonate, and ethylene carbonate at a volume ratio of 50:20:30, the resin having absorbed the electrolyte solution having a volume of 0.25 to 1.50 cm$^3$ per square meter of the porous layer,
the porous layer after being immersed for 24 hours in the electrolyte solution having a porosity of 0.5 to 55.0% and an average pore diameter of 0.8 to 95.0.

2. A laminated body, comprising:
a separator according to claim 1; and
an electrode sheet.

3. A method for producing a laminated body according to claim 2, the method comprising the step of
applying, to the porous base material or the electrode sheet, a solution in which the resin for the porous layer is dissolved.

4. A nonaqueous secondary battery, comprising:
a separator according to claim 1; and
an electrode sheet.

* * * * *